(12) United States Patent
Shinohara et al.

(10) Patent No.: US 6,337,948 B1
(45) Date of Patent: *Jan. 8, 2002

(54) DIGITAL SIGNAL RECORDING APPARATUS WHICH UTILIZES PREDETERMINED AREAS ON A MAGNETIC TAPE FOR MULTIPLE PURPOSES

(75) Inventors: Junko Shinohara; Sadayuki Inoue; Tatsuo Yamasaki; Ken Onishi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/583,164

(22) Filed: May 30, 2000

Related U.S. Application Data

(62) Division of application No. 08/554,723, filed on Nov. 7, 1995, now Pat. No. 6,141,485.

(30) Foreign Application Priority Data

Nov. 11, 1994 (JP) ............................................. 6-277824
Mar. 15, 1995 (JP) ............................................. 7-55862

(51) Int. Cl.[7] ................................................ H04N 5/91
(52) U.S. Cl. ............................ 386/68; 386/80; 386/124
(58) Field of Search ............................. 386/6, 7, 8, 33, 386/68, 81, 98, 95, 109, 111–112, 78–80, 124; 348/423.02; H04N 5/76, 5/92, 5/783

(56) References Cited

U.S. PATENT DOCUMENTS

| 5,335,117 A | | 8/1994 | Park et al. |
| 5,377,051 A | * | 12/1994 | Lane et al. .................... 386/81 |
| 5,434,716 A | | 7/1995 | Sugiyama et al. |
| 5,499,106 A | | 3/1996 | Arano et al. |
| 5,574,570 A | * | 11/1996 | Ohkuma et al. ............ 386/103 |
| 5,583,650 A | | 12/1996 | Lane et al. |
| 5,587,803 A | | 12/1996 | Inoue et al. |
| 5,587,806 A | | 12/1996 | Yamada et al. |
| 5,596,581 A | | 1/1997 | Saeijs et al. |
| 5,623,344 A | * | 4/1997 | Lane et al. .................... 386/81 |
| 5,648,960 A | | 7/1997 | Sakazaki et al. |
| 5,649,047 A | | 7/1997 | Takahashi et al. |
| 5,675,696 A | | 10/1997 | Ishimoto et al. |
| 5,684,915 A | | 11/1997 | Ueda et al. |
| 5,684,917 A | | 11/1997 | Yanagihara et al. |
| 5,696,774 A | | 12/1997 | Inoue et al. |
| 5,740,306 A | | 4/1998 | Shinohara et al. |
| 6,141,485 A | * | 10/2000 | Shinohara et al. ............ 386/68 |

FOREIGN PATENT DOCUMENTS

| DE | 4402870 | 8/1994 |
| EP | 0556816 | 8/1993 |
| EP | 0606857 | 7/1994 |
| GB | 2265046 | 9/1993 |
| GB | 2265047 | 9/1993 |
| GB | 2288942 | 11/1995 |

OTHER PUBLICATIONS

"A Recording Method of ATV Data on a Consumer Digital VCR," Int'l.Workshop on DHTV '93, vol. II—Oct. 16–28, 1993 in Ottawa, Canada.

* cited by examiner

Primary Examiner—Thai Tran

(57) ABSTRACT

A signal which is to be used in high-speed playback is recorded in a predetermined region of a track. An error correcting check code region for recording an error correcting check code is formed at a position adjacent to the predetermined region. In accordance with the usage, an error correcting check code for high-speed playback, an error correcting check code for normal playback, or predetermined fixed data is recorded in the error correcting check code region. In a digital VTR which records and plays back data at plural kinds of data rates, trick playback data are recorded so that a head scans a subcode area or a VAUX area in high-speed playback at a predetermined tape running speed in each record mode. An area for recording an error correcting check code is used as an area for, in addition to an error correcting check code for normal playback, recording an error correcting check code for trick playback, normal playback data, or trick playback data.

1 Claim, 55 Drawing Sheets

HEAD A

FIG. 4
PRIOR ART
(NORMAL PLAYBACK)
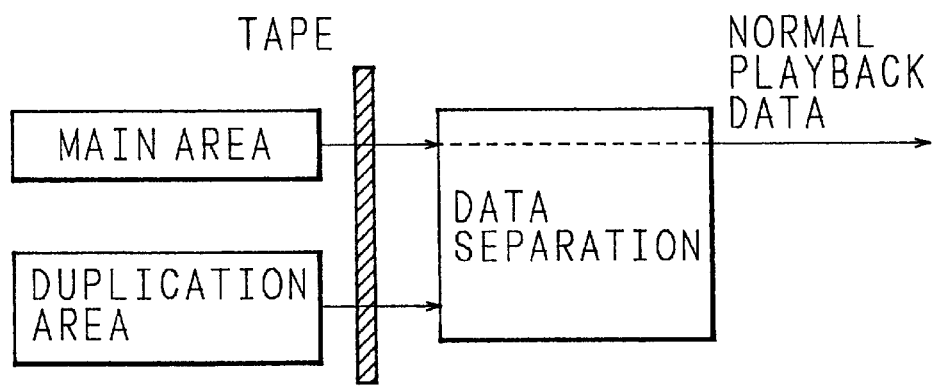
(HIGH-SPEED PLAYBACK)
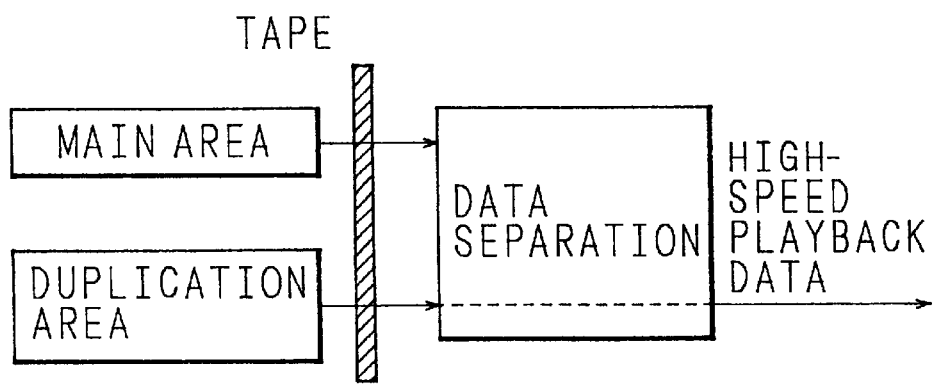

FIG. 6
PRIOR ART
<4-TIMES SPEED>
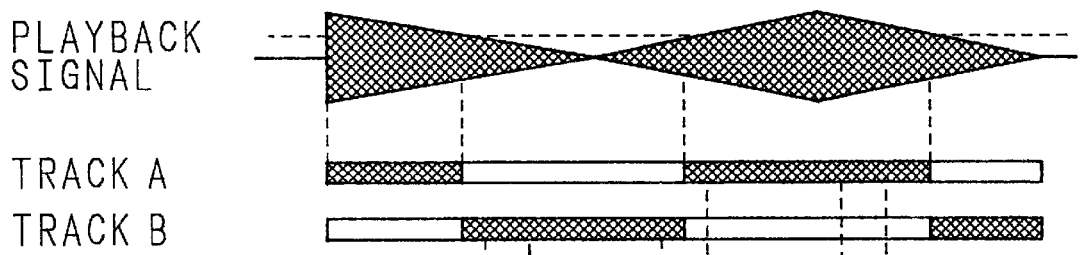
<9-TIMES SPEED>
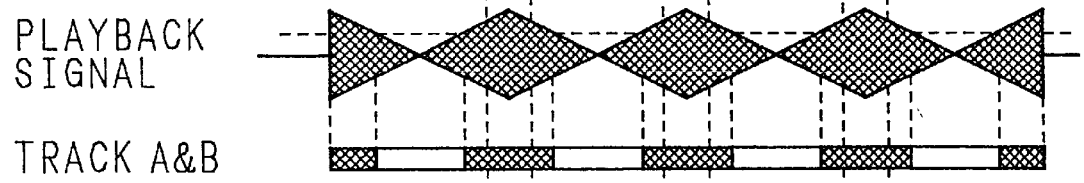
<17-TIMES SPEED>
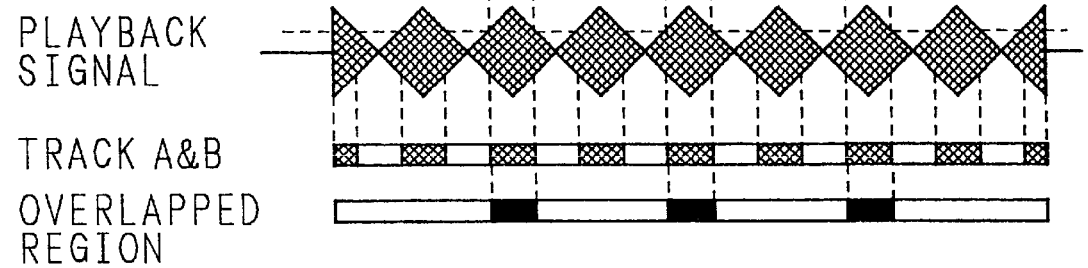

FIG. 8
PRIOR ART
(CASE 1)
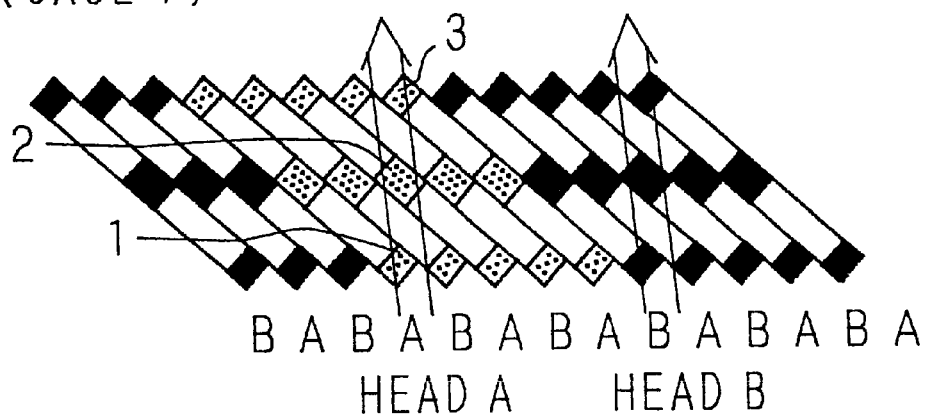
(CASE 2)
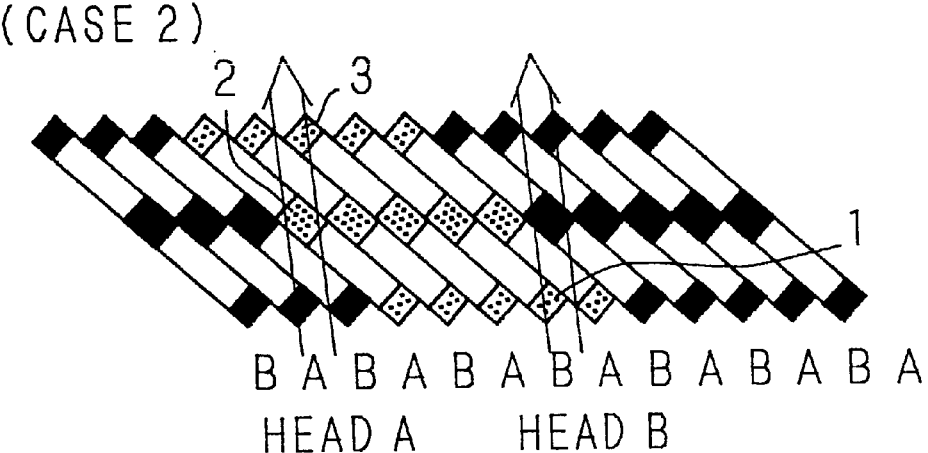

FIG. 16

|  | TWICE | 4-TIMES | 8-TIMES | 16-TIMES |
|---|---|---|---|---|
| 9000rpm SYSTEM | 186SB | 62SB | 26SB | 12SB |

SB: SYNC BLOCK

SB:SYNC BLOCK

SB: SYNC BLOCK

FIG. 22A  FIG. 22B  FIG. 22C  FIG. 22D  FIG. 22E
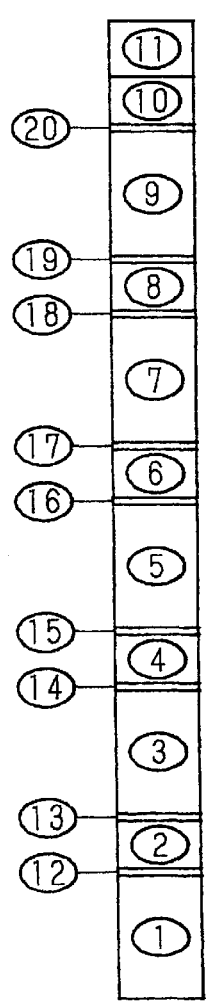
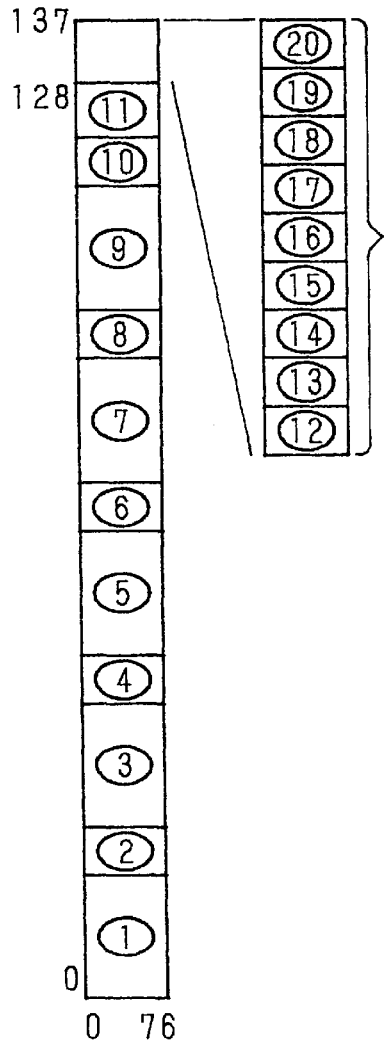
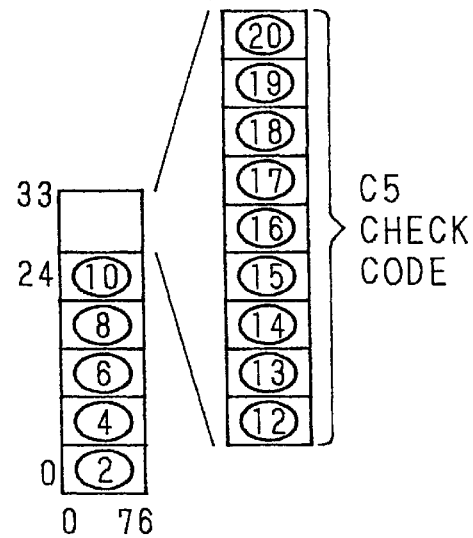

(D[0,0,0],D[1,1,1],D[2,2,2],⋯,D[i mod 10,i,i mod 77],

⋯,D[8,128,51],D[9,129,52],⋯,D[7,137,60])

| DATA SYMBOL | C4 CHECK SYMBOL |

X mod Y : REMAINDER WHEN INTEGER X
          IS DIVIDED BY Y

FIG. 25A   FIG. 25B   FIG. 25C   FIG. 25D
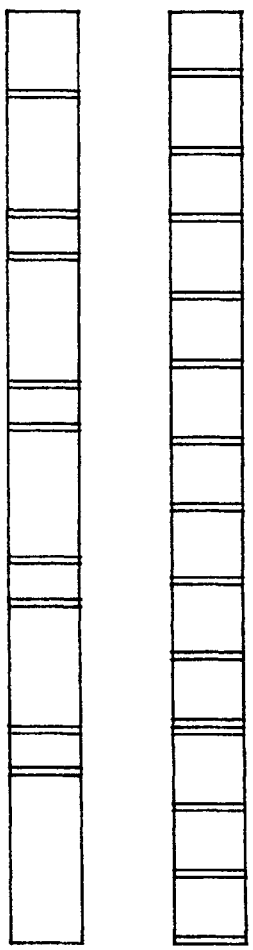
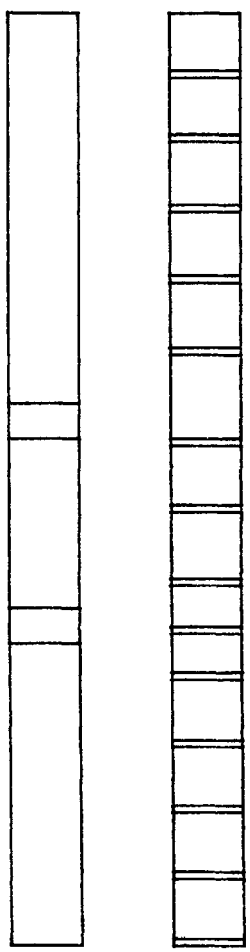
MAXIMUM CORRECTION NUMBER TO BURST ERROR 87SB
MAXIMUM CORRECTION NUMBER TO BURST ERROR 89SB

FIG. 38

| SYSTEM MODE | 25 Mbps | 12.5Mbps | 6.25Mbps |
|---|---|---|---|
| TAPE RUNNING SPEED IN NORMAL RECORD/ PLAYBACK * | 1 | 1/2 | 1/4 |

*:TAPE RUNNING SPEED IN 25 Mbps IS 1

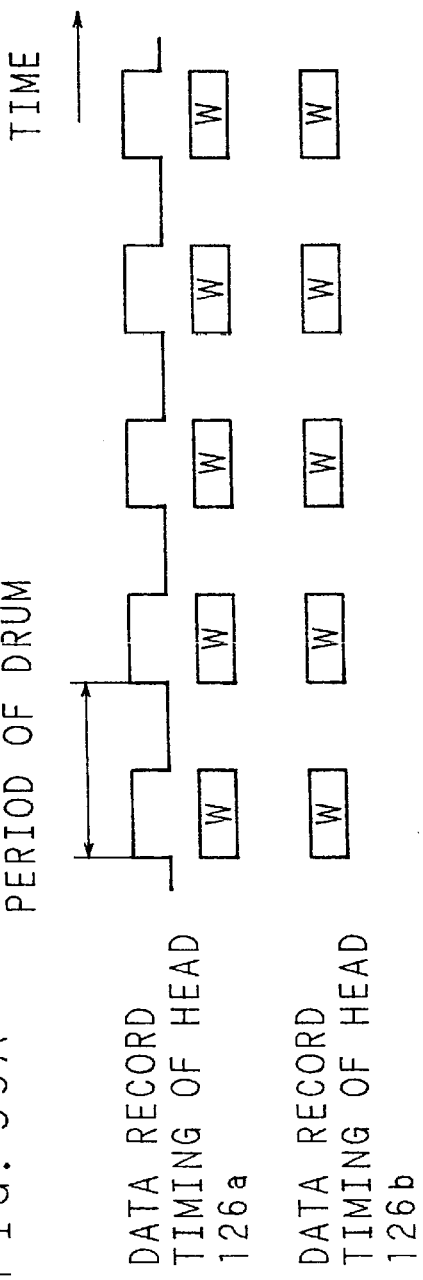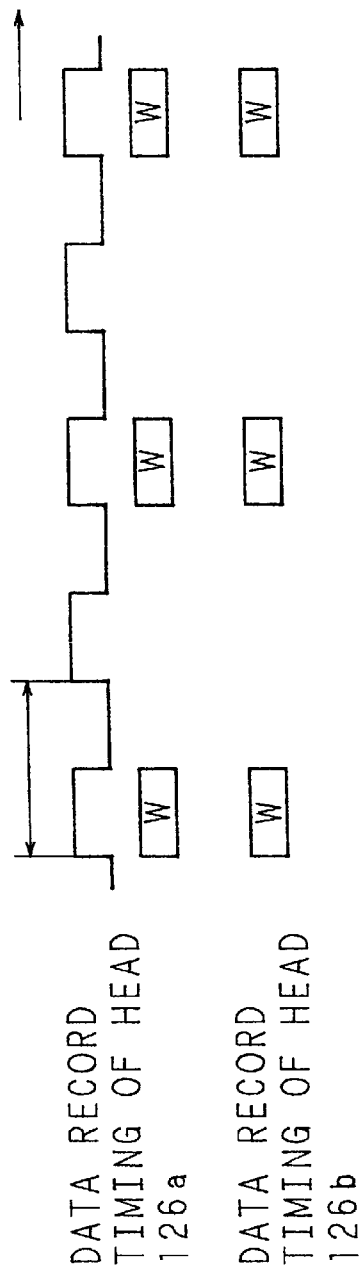

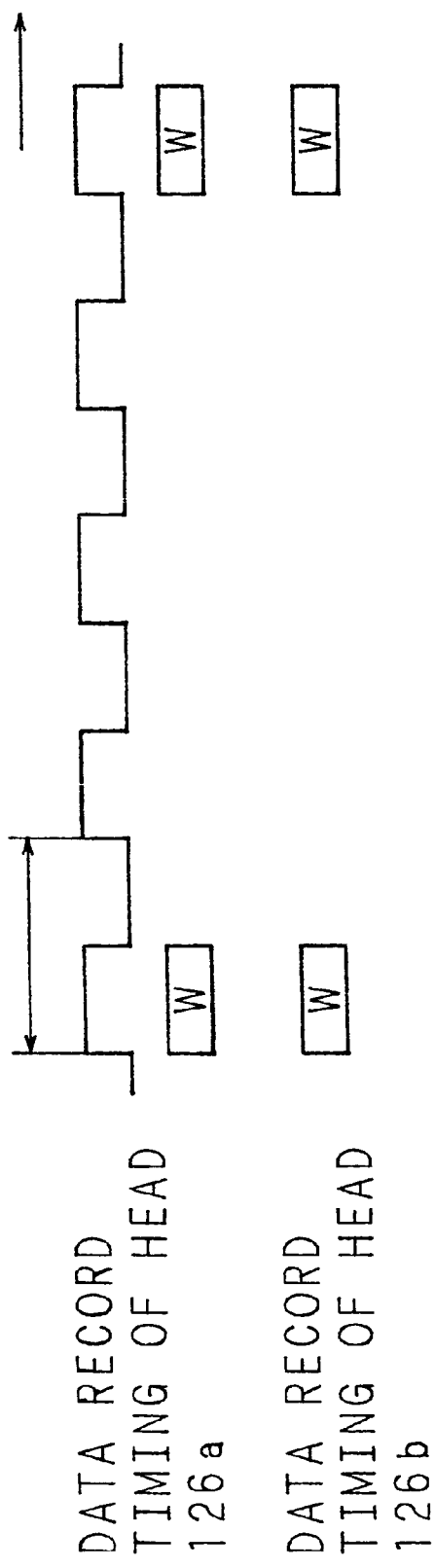

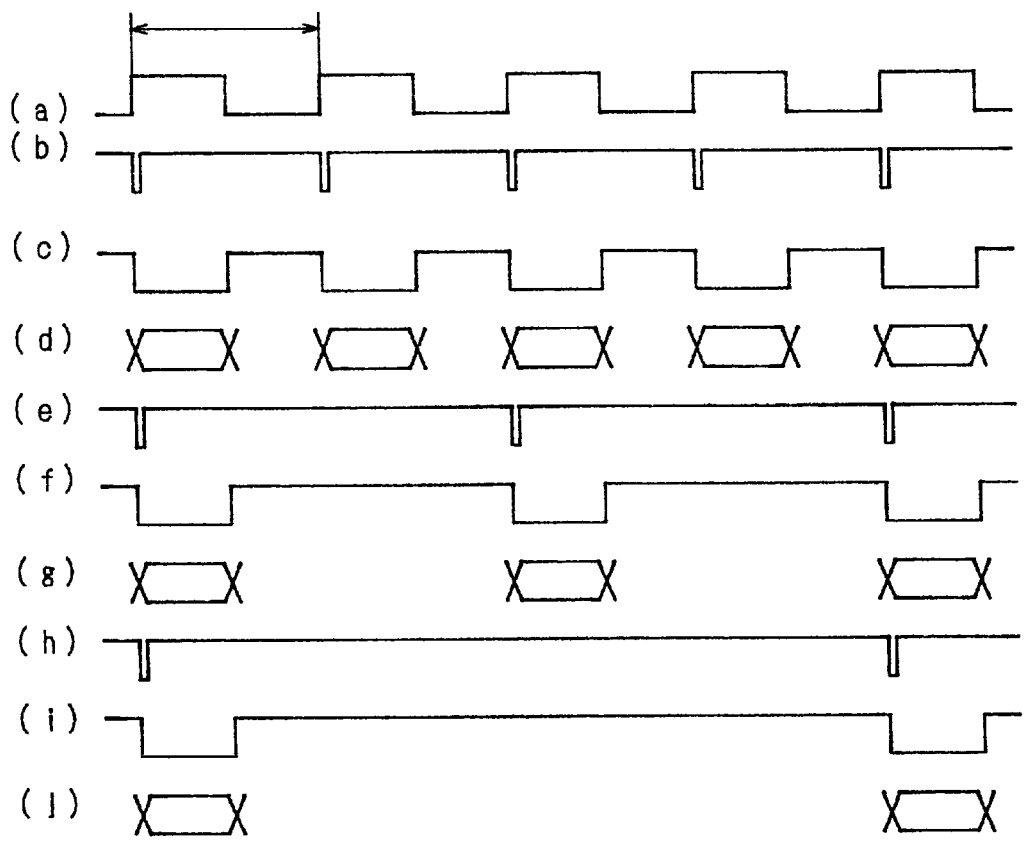

FIG. 42

| RECORD MODE \ AREA | 4-TIMES SPEED AREA | 18-TIMES SPEED AREA |
|---|---|---|
| 25Mbps (STANDARD) | 4<br>62 | 18<br>10.94 |
| 12.5Mbps (HALF) | 4<br>124 | 9<br>46.5 |
| 6.25Mbps (QUARTER) | 8<br>106.29 | 18<br>43.76 |

UPPER COLUMN : PLAYBACK SPEED
LOWER COLUMN : NUMBER OF OBTAINED SYNC BLOCKS

DIGITAL SIGNAL RECORDING APPARATUS WHICH UTILIZES PREDETERMINED AREAS ON A MAGNETIC TAPE FOR MULTIPLE PURPOSES

This application is a continuation divisional of application Ser. No. 08/554,723, filed on Nov. 7, 1995 now U.S. Pat. No. 6,141,485, the entire contents of which are hereby incorporated by reference.

BACKGROUND OF THE INVENTION

1. Field of the Invention

The present invention relates to a digital signal record apparatus which is useful in a digital video tape recorder (hereinafter, referred to as "a digital VTR"), a digital disk player, or the like having a track format that records digital video and audio signals in respective predetermined areas in a slant track, and which receives digital video and audio signals in the form of a bitstream and records the bitstream, and also to a digital signal playback apparatus which plays back a record medium on which recording was conducted by the digital signal record apparatus.

2. Description of Related Art

FIG. 1 is a diagram showing a track pattern employed in a common home digital VTR of the prior art. As shown, slant tracks are formed on a magnetic tape, and each track is divided into two areas, a video area for recording a digital video signal and an audio area for recording a digital audio signal.

There are two methods to record video and audio signals on such home digital VTRs. One is the so-called baseband recording method in which the video and audio signals are inputted in analog form, and recorded in digital form after performing a high-efficiency coding to reduce data rate; the other is the so-called transparent recording method in which bitstreams transmitted in digital form are recorded.

For recording of the Advanced Television (ATV) signal currently under consideration in the United States, or the Digital Video Broadcasting (DVB) signal currently under investigation in Europe, the latter method, i.e., the transparent recording method, is suitable. Major reasons are that the ATV signal or the DVB signal is already digital-compressed and does not require high-efficiency encoders or decoders, and that there occurs no degradation in picture quality since the signal is recorded directly. On the other hand, the major drawback is inferior picture quality in trick playback modes such as high-speed playback, still-motion playback, and slow motion playback. In particular, by simply recording bitstreams directly on slant tracks, useful pictures cannot be reproduced in high-speed playback.

One digital VTR method for recording the ATV signal was proposed in a technical report "A Recording Method of ATV data on a Consumer Digital VCR" presented at "International Workshop on HDTV '93" held from October 26 to 28 in Ottawa, Canada. This report will be used as the prior art in the following description.

According to the basic specification of a prototype home digital VTR, assuming the recording rate of the digital video signal is 25 Mbps and the field frequency is 60 Hz, one video frame is recorded in video areas on 10 tracks in standard definition (SD) mode. Here, if the data rate of the ATV signal is 17 to 18 Mbps. transparent recording of the ATV signal is possible in this SD mode.

FIGS. 2A and 2B are diagrams showing head scan paths in normal playback and high-speed playback on a digital VTR. As shown, adjacent slant tracks are recorded alternately across the tape by rotary heads having different azimuth angles. In normal playback, the tape transport speed is the same as in recording, so that the rotary heads precisely trace the recorded tracks as shown in FIG. 2A. In high-speed playback, on the other hand, since the tape speed is different, the heads move across several tracks, each head thus being able to play back only fragments of the same azimuth tracks. FIG. 2B shows an example in fast forward playback at the speed five times the normal speed.

In MPEG2 bitstreams (bitstreams of the ATV signal and the DVB signal are substantially compatible with MPEG2 bitstreams), only intracoded blocks can be decoded independently without referencing other frames. If an MPEG2 bitstream is recorded on tracks in successive order, in high-speed playback, intra-coded data is taken out of a playback signal by intermittent playback and an image is reconstructed only by the intra-coded data. In this case, on the screen the reproduced areas will be non-continuous, and fragments of blocks will be dispersed across the screen. Furthermore, since the bitstream is variable-length encoded, there is no guarantee that the whole screen will be updated periodically, and there is a possibility that some portions may remain undated for long periods of time. As a result, the picture quality in high-speed playback will not be sufficient and unacceptable for a home digital VTR.

FIG. 3 is a block diagram showing a bitstream recording apparatus of the prior art capable of performing a high-speed playback. Here, the video area on each track is divided into a main area, where the whole bitstream of the ATV signal is recorded, and a duplication area, where portions of the bitstream critical for image reconstruction in high-speed playback are recorded (such portions are hereinafter referred to as High Priority (HP) data). Since only intra-coded blocks are valid in high-speed playback, intra-coded blocks are recorded in the duplication area; to further reduce the data amount, low-frequency components are extracted from all the intra-coded blocks and recorded as HP data. In FIG. 3, reference numeral 301 is a bitstream input terminal, 302 is a bitstream output terminal, 303 is an HP data output terminal, 304 is a variable-length decoder, 305 is a counter, 306 is a data extraction circuit, and 307 is an EOB (end of block) appending circuit.

An MPEG2 bitstream is inputted via the input terminal 301 and outputted unprocessed via the output terminal 302 for recording successively in the main area. The bitstream inputted via the input terminal 301 is also fed to the variable-length decoder 304, which analyzes the syntax of the MPEG2 bitstream and detects an intra-image; in response, the counter 305 generates the timing at which the data extraction circuit 306 extracts the low-frequency components of each block of the intra-image. Then, the EOB appending circuit 307 appends an EOB to construct HP data which is recorded in the duplication area.

FIG. 4 is a diagram conceptually showing normal playback and high-speed playback in a prior art digital VTR. In normal playback, the whole bitstream recorded in the main area is reproduced and supplied to an MPEG2 decoder external to the digital VTR. The HP data is discarded. On the other hand, in high-speed playback, only the HP data recorded in the duplication area is selected and sent to the decoder, while the bitstream from the main area is discarded.

Next, the arrangement of the main area and duplication area on each track will be described. FIG. 5 is a diagram showing an example of the scan path of the rotary head in common high-speed playback. If the tape speed is an integral multiple of the normal speed and phase-lock controlled, the head scanning is synchronized with the tracks with the same azimuth, reproducing data always from the same positions. In FIG. 5, if portions of the reproduced signal whose output levels are higher than −6 dB are played back, hatched regions will be played back by one head. FIG. 5 shows an example of high-speed playback 9 times the normal speed. At this 9-times playback speed, it is guaranteed that the signal will be read from the hatched regions. It can therefore be seen that the HP data should be recorded in these areas. However, at other fast playback speeds, there is no guarantee that the signal will be read; the regions need to be set so that the signal can be read at different tape speeds.

FIG. 6 is a diagram showing overlapped areas in plural types of conventional high-speed playback, and it shows examples of scan areas of three types of tape speed in which the rotary head is synchronized with the same azimuth track. Some of the regions scanned at various tape speeds overlap. Duplication areas are selected from among these regions to guarantee HP data reading at different tape speeds. Shown in FIG. 6 are examples of fast playback 4, 9, and 17 times the normal speed. The scan areas shown are the same as those that will be selected for fast playback −2, −7, and −15 times the normal speed.

It is not possible for the rotary head to trace exactly the same regions at different tape speeds, because the number of tracks that the rotary head crosses Is different at different tape speeds. Furthermore, it is required that the scan areas be traced from any of the same azimuth tracks. FIG. 7 is a diagram showing examples of scan paths of the rotary head in 5-times speed and 9-times speed in a prior art digital VTR. In FIG. 7, regions 1, 2 and 3 are selected from among the overlapped regions between 5-times and 9-times speeds, By repeating the same HP data on nine tracks, the HP data can be read at both 5-times and 9-times speeds.

FIG. 8 is a diagram showing examples of scan paths of two rotary heads in 5-times speed playback in the prior art digital VTR. As can be seen from the figure, by repeating the same HP data over the same number of tracks as the speed expressed as a multiple of the normal speed, the HP data can be read by the rotary head synchronized with the same azimuth tracks. As a result, by duplicating the HP data over the same number of tracks as the maximum tape speed in high-speed playback expressed as a multiple of the normal speed, reading of the duplicate HP data can be guaranteed at different tape speeds in both forward and reverse directions.

FIG. 9 shows a track format employed in the prior art digital VTR; shown here is an example of a main and duplication area layout. In a home digital VTR, the video area on each track consists of 135 sync blocks; in the example shown, the main area consists of 97 sync blocks and the duplication area consists of 32 sync blocks. This duplication area is made up of the overlapped areas between the 4-times, 9-times, and 17-times speeds shown in FIG. 6. In this case, the data rate of the main area is about 17.46 Mbps, and that of the duplication area is about 338.8 kbps since identical data is recorded 17 times.

In a prior art home digital VTR which is configured as described above, trick playback data are recorded several times in an overlap manner in a duplication area. Consequently, there arises a problem in that the record rate of trick playback data is very low and, particularly in slow motion playback or high-speed playback, a played back image fails to have a sufficient picture quality. When intra-frame is 2 frames per second, for example, the data amount with respect to only intra-frame coding of the ATV signal is estimated to be about 3 Mbps. In the prior art example, however, the amount of data which can be recorded is as small as about 340 kbps, so that the picture quality of a played back image is extremely degraded.

FIGS. 10A and 10B are data format diagrams showing the configuration of error correcting codes in a video signal area and an audio signal area in 1 track of a digital VTR according to the SD standard defined by the SD mode. According to the SD standard, as the error correcting code in the video signal area, (85, 77, 9) Reed-Solomon code (hereinafter, referred to as "C1 check code") is used in the recording direction, and (149, 138, 12) Reed-Solomon code (hereinafter, referred to as "C2 check code") is used in the vertical direction. As the error correcting code in the audio signal area., (85, 77, 9) Reed-Solomon code (C1 check code) same as that for a video signal is used in the recording direction, and (14, 9, 6) Reed-Solomon code (hereinafter, referred to as "C3 check code") is used in the vertical direction.

One sync block according to the SD standard is shown in FIG. 11. According to the SD standard, as shown in FIG. 11, data of 1 sync block are configured by 90 bytes. In the block, a sync pattern and an ID signal are recorded in the first 5 bytes, and an error correcting code (C1 check code) is recorded in the last 8 bytes.

The ATV signal is subjected to data compression by using a compression method based on motion compensative predication. The compressed data are configured by intra-data (intrafield or intra-frame coding) which allow an image to be reconstructed by using only playback data, and inter-data (interfield or inter-frame coding) which allow an image to be reconstructed by using data of the reference field (or frame) and playback data. In the ATV signal, therefore, when an error occurs in playback data, the error propagates over plural fields or frames, resulting in a playback image which is visually very inferior. When a digital VTR according to the SD standard is to be used as a storage medium for storing data, program, etc. for a computer system or the like, it is desired to append a stronger error correcting code in order to reconstruct (error-correct) data which were not played back by a drop-out due to a scratch on a magnetic tape, dust adhering to the magnetic tape, or the like.

In trick playback such as high-speed playback, slow motion playback, or still-motion playback, the rotary head obliquely crosses record tracks so that signals are intermittently played back from the tracks. In trick playback, therefore, it is impossible to configure an error correcting block (video data) such as shown in FIG. 10A. In trick playback, consequently, only the error correction due to the C1 check code is conducted on playback data.

In the case where only the error correction due to the C1 check code is conducted, when the symbol error rate is 0.01, the probability of error detection is $1.56 \times 10^{-3}$, or one error is detected in every about 8 sync blocks. In trick playback, particularly, it is often that the symbol error rate is 0.01 or higher because the playback output level is not stabilized Recorded data have undergone variable-length coding. When an error once occurs, therefore, it is impossible to use subsequent playback data, thereby degrading the picture quality of a played back image. Furthermore, the residual error rate is as high as $7.00 \times 10^{-8}$ and the error occurrence frequency is very high.

In the DVB signal, the record rate is varied depending on programs. Specifically, when the picture quality similar to that of the PAL system or the SECAM system which is currently used is to be attained, the record rate is set to be about 5 to 5.5 Mbps, and, when the picture quality similar to "studio quality" is to be attained, the record rate is set to be about 9 Mbps. When a record signal having plural record rates is recorded into a conventional digital VTR, there arise the following problems. In the case where a program of 9 Mbps is recorded into a conventional digital VTR, for example, nothing is recorded in an area of about 8.5 Mbps because the record rate of the main area is 17.46 Mbps as described above, resulting in a very low usage efficiency of a magnetic tape.

SUMMARY OF THE INVENTION

It is an object of the invention to provide a digital signal record apparatus and a digital signal playback apparatus in which the error correcting ability for correcting an error occurring in normal playback or trick playback such as slow motion playback, still-motion playback, or high-speed playback can be enhanced so as to improve the picture quality of a played back image.

It is another object of the invention to provide a digital signal record apparatus in which a restricted area for recording high-speed playback data can effectively be used so as to improve the reliability of playback data in high-speed playback and the picture quality, and a record signal of multirates can efficiently be recorded on a record medium, and also a digital signal playback apparatus which plays back the record medium.

In the digital signal record apparatus of the first invention, a signal which is taken out from a normal record signal and to be used in high-speed playback is recorded in a predetermined region of a track of a record medium, an error correcting check code region for recording an error correcting check code is formed in a region adjacent to the predetermined region for recording the signal which is to be used in high-speed playback, one of two kinds of signals, or an error correcting check code for high-speed playback and an error correcting check code for normal playback is at least recorded in the error correcting check code region, and a signal indicating which one of the two kinds of signals is recorded in the error correcting check code region is recorded in a track.

In other words according to the digital signal record apparatus of the first invention, when a digital signal is to be recorded in a slant track formed on the surface of a magnetic tape by a rotary drum on which two heads of different azimuths are mounted, an area for recording at least a normal record signal, an area for recording high-speed playback data, and an area for recording an error correcting check code are disposed. On the other hand, a digital signal which is inputted in recording is recorded in the area for recording a normal record signal, a signal which is to be used in high-speed playback is taken out from the inputted digital signal, and the signal which is to be used in high-speed playback is recorded in an area for recording predetermined high-speed playback data in a track. The area for recording an error correcting check code is disposed in an area adjacent to the area for recording the signal which is to be used in high-speed playback, and one of two kinds of signals, or an error correcting check code for high-speed playback and an error correcting check code for normal playback is at last recorded in the error correcting check code region. Furthermore, a signal indicating which one of the two kinds of signals is recorded in the error correcting check code region is formed and recorded in a predetermined region of the track.

According to the digital signal record apparatus of the first invention, therefore, a region can commonly be used as that for recording the error correcting check code for high-speed playback and that for recording the error correcting check code for normal playback, so that a restricted record area is effectively used and also the record rate of trick playback data is sufficiently ensured. Consequently, it is possible to obtain an excellent high-speed playback image.

In the digital signal record apparatus of the second invention, in the first invention, the signal for identifying the two kinds of signals is recorded by appending it to an ID signal of the record signal or a subcode area. Therefore, an error correcting check code for high-speed playback and that for normal playback can surely be discriminated by a simple circuit configuration.

In the digital signal record apparatus of the third invention, in the first or second invention, when the signal to be recorded in the error correcting check code region is the error correcting check code for high-speed playback, only the error correcting check code for high-speed playback and predetermined fixed data are recorded in the error correcting check code region. By contrast, when the signal to be recorded in the error correcting check code-region is the error correcting check code for normal playback, only the error correcting check code for normal playback is recorded in the error correcting check code region. The data of the area in which the fixed data are recorded are previously known in error correcting decoding. Particularly when the error correcting check code for high-speed playback is to be recorded in the region, therefore, it is not required to perform error correction on that portion, and hence the error correcting ability can be improved. Since the signal to be recorded is previously known, the system control particularly in playback is prevented from breaking down.

In the digital signal record apparatus of the fourth invention, in the first or second invention, when a predetermined region in which data to be used in high-speed playback are to be recorded exists in a track, the error correcting check code region is disposed at a position adjacent to the predetermined region. By contrast, when a predetermined region in which data to be used in high-speed playback are to be recorded does not exist in a track, the error correcting check code region is disposed in a region which is equal in height in a track with an error correcting check code region which is disposed in a track having the same azimuth as a track wherein a predetermined region in which data to be used in high-speed playback are to be recorded does not exist. Therefore, an error correcting check code can be discriminated and error correcting decoding can be performed by a simple circuit configuration.

In the digital signal playback apparatus of the fifth invention, a record medium is played back wherein a signal which is taken out from a normal record signal and to be used in high-speed playback is recorded in a predetermined region of a track, one of two kinds of signals, i.e., an error correcting check code for high-speed playback and an error correcting check code for normal playback is at least recorded in an error correcting check code region adjacent to the predetermined region, and also an identification signal for identifying the two kinds of signals is recorded. When such a record medium is to be played back, the signal which is to be used in high-speed playback, and an error correcting check code are separated from a playback signal in high-speed playback, and the identification signal is detected to identify the kind of the error correcting check code. If the error correcting check code for high-speed playback is recorded, the signal which is to be used in high-speed playback and the error correcting check code for high-speed playback are used, error correcting decoding is conducted on the signal which is to be used in high-speed playback, and a high-speed playback signal is outputted. If another type of signal is recorded, high-speed playback data are outputted without conducting error correcting decoding according to the recorded error correcting check code.

According to the digital signal playback apparatus of the fifth invention, therefore, compatibility is attained also when data recorded by another digital signal record apparatus are to be played back in compatible playback or the like, and hence high-speed playback can be performed satisfactorily. Furthermore, an error correcting check code which is recorded in a region common in high-speed playback and normal playback can be judged by a simple circuit configuration by using the identification signal, and subjected to error correction, thereby allowing high-speed playback and normal playback to be stably conducted.

In the digital signal playback apparatus of the sixth invention, a record medium is played back wherein a signal which is taken out from a normal record signal and to be used in high-speed playback is recorded in a predetermined region of a track, one of two kinds of signals, i.e., an error correcting check code for high-speed playback and an error correcting check code for normal playback is at least recorded in an error correcting check code region adjacent to the predetermined region, and also an identification signal for identifying the two kinds of signals is recorded. When such a record medium is to be played back, the region in which an error correcting check code is recorded is separated from a playback signal in normal playback, and the identification signal is detected to identify the kind of the error correcting check code. If the error correcting check code for normal playback is recorded, a playback signal and the error correcting check code for normal playback are used, error correcting decoding is conducted on the playback signal, and a normal playback signal is outputted. If another type of signal is recorded, a normal playback signal is outputted without conducting error correcting decoding according to the recorded error correcting check code.

Consequently, the digital signal playback apparatus of the sixth invention can attain the same effects as the fifth invention.

In the digital signal record apparatus of the seventh invention, the apparatus has plural record modes including at least a standard record mode, and a digital video signal which is inputted in the state of a transport packet and subjected to intra-frame or intra-field coding, or inter-frame or inter-field coding, and a digital audio signal are transparent-recorded on a record medium. First, the transmission rate of an input transport packet is judged. The record mode of the digital signal record apparatus is set on the basis of the judgment result. On the other hand, a digital video signal which is subjected to intra-frame or intra-field coding is separated from the inputted transport packet. The separated digital video signal which is subjected to intra-frame or intra-field coding is reconstructed and converted into trick playback data. In order to record the input transport packet, trick playback data, and an error correcting check code at a predetermined position of a track on the record medium, record data are configured. When the record data to be recorded on the record medium are to be formed, one of an error correcting code for normal playback, normal playback data, an error correcting check code for trick playback, and trick playback data is recorded in an area for recording an error correcting check code.

According to the digital signal record apparatus of the seventh invention, therefore, trick playback data can efficiently be recorded in each record mode, a restricted area for trick playback data can efficiently be used. The playback data rate in high-speed playback can be improved to the maximum degree, and the picture quality of a playback image can be improved. Furthermore, it is possible to improve the reliability of playback data in high-speed playback.

In the digital signal record apparatus of the eighth invention, when trick playback data are to be formed by using inputted intra-image data as in the seventh invention, the trick playback data are formed in the form of an input transport packet. When the trick playback data formed in the form of a transport packet are to be recorded on a record medium, the data are converted into those of a sync block format and then recorded in the same manner as input data. When a digital signal playback apparatus conducts high-speed playback, it is not required to use a circuit for forming a transport packet, and a circuit for converting a sync block format for normal playback into a transport packet can be used commonly. This can reduce the circuit scale particularly in a playback-only apparatus.

In the digital signal record apparatus of the ninth invention, when a sync block format is to be formed as in the seventh invention, data of 2 transport packets are converted into data of 5 sync blocks, and then recorded in a predetermined area for recording normal playback data and trick playback data. Therefore, data of a transport packet can efficiently be converted into those of a sync block format.

In the digital signal record apparatus of the tenth invention, when a record format is to be formed as in the seventh invention, trick playback data are arranged on scan paths on which a rotary head scans at a predetermined high-speed playback speed in each record mode. Consequently, trick playback data can efficiently be recorded in each record mode. Accordingly, a restricted area for trick playback data can efficiently be used, the playback data rate in high-speed playback can be improved to the maximum degree, and the picture quality of a playback image can be improved.

In the digital signal record apparatus of the eleventh invention, when a record format is to be formed as in the tenth invention, trick playback data are arranged on scan paths on which a rotary head scans a subcode area or a VAUX area at a predetermined high-speed playback speed in each record mode. In high-speed playback, therefore, the rotary head traces a subcode area or a VAUX area. Accordingly, additional functions such as that of finding the beginning of a program can be obtained by using a signal recorded in the subcode area.

In the digital signal playback apparatus of the twelfth invention, the apparatus plays back a record medium which has plural record modes including at least a standard record mode, and in which trick playback data separated from record data are recorded in a predetermined area. In playback, the record mode is detected from a playback signal. The tape running speed of the record medium is controlled on the basis of the detection result of the record mode. At this time, tracking is controlled so that a rotary head scans a subcode area or a VAUX area in high-speed playback at a predetermined tape running speed in the record mode.

According to the digital signal playback apparatus of the twelfth invention, since the rotary head traces a subcode area or a VAUX area in high-speed playback, additional functions such as that of finding the beginning of a program can be obtained by using a signal recorded in the subcode area or the VAUX area.

The above and further objects and features of the invention will more fully be apparent from the following detailed description with accompanying drawings.

BRIEF DESCRIPTION OF THE DRAWINGS

FIG. 4 is a diagram conceptually showing normal playback and high-speed playback in a prior art digital VTR;

FIG. 6 is a diagram illustrating overlapped areas in plural types of conventional high-speed playback;

FIG. 8 is a diagram showing head scan paths of two heads in 5-times speed playback in a prior art digital VTR;

FIG. 16 is a table showing the number of sync blocks which can be played back from 1 track at various high-speed playback speeds;

FIGS. 22A to 22E are diagrams showing the arrangement of data which are to be recorded in A track in the invention, and the configuration of an error correcting block in 1 track in the case where an error correcting check code to be appended to normal playback data and high-speed playback data is formed;

FIGS. 25A to 25D are diagrams illustrating the burst error correcting ability according to an error correcting check code for normal playback in the invention;

FIG. 38 is a table showing record modes of a digital VTR for recording multirate bitstreams;

FIGS. 39A to 39C are diagrams showing record timings of record data in various record modes;

FIG. 40 is a diagram showing timings of control signals outputted from a record timing generating circuit in various record modes;

FIG. 42 is a table showing the number of sync blocks which can be played back from 1 track under various high-speed playback speeds;

DESCRIPTION OF THE PREFERRED EMBODIMENTS

Hereinafter, the invention will be described in detail with reference to the drawings showing its embodiments.

Embodiment 1

Figure 12:
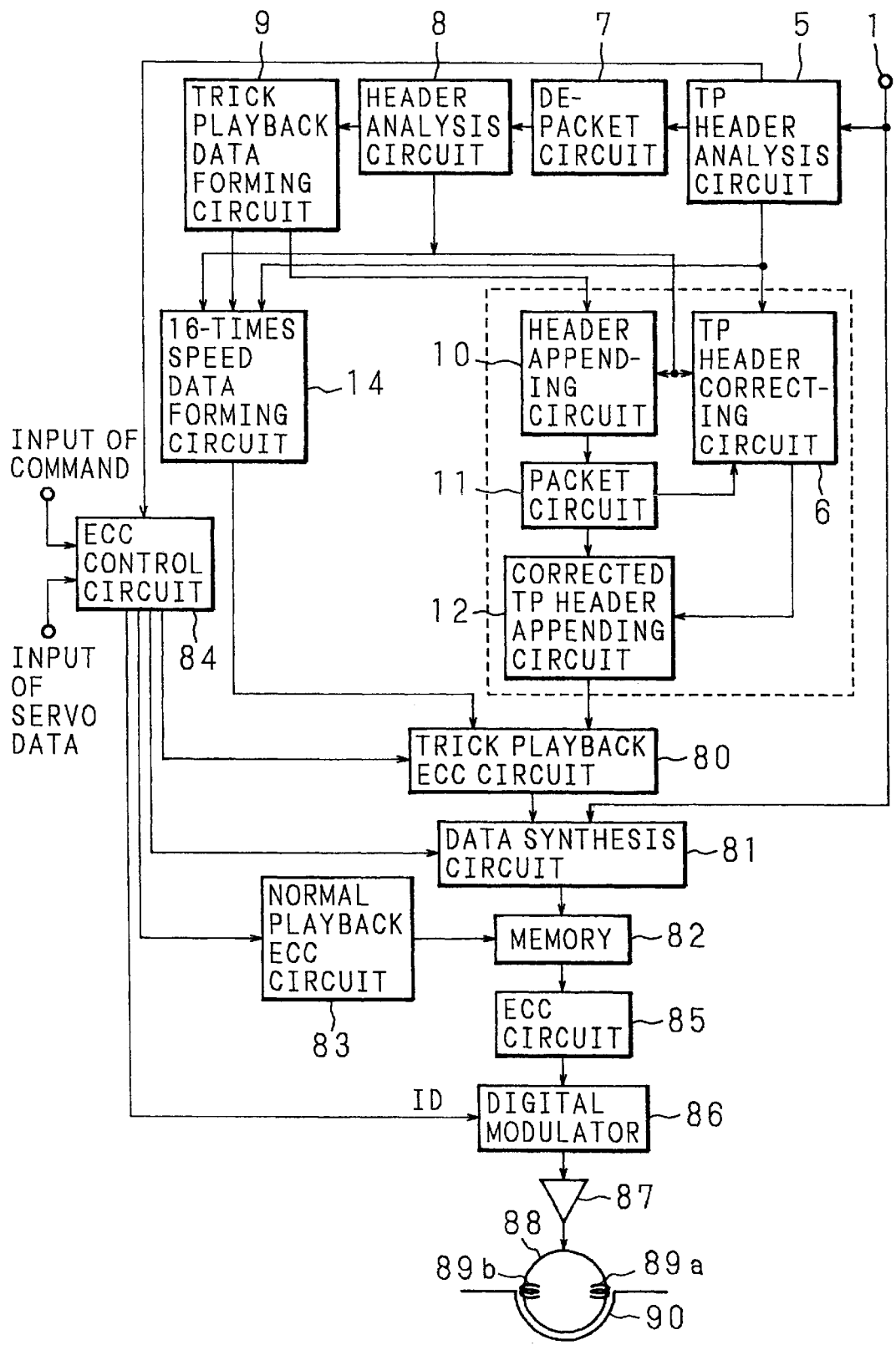
FIG. 12 is a block diagram showing the configuration of a record system of the digital VTR of the invention.

FIG. 12 is a block diagram showing the configuration of a record system of a digital VTR which is an embodiment of the invention. In the figure, 1 designates an input terminal for a transport packet. The reference numeral 5 designates a TP header analysis circuit which detects a transport header in a transport packet, 6 designates a TP header correcting circuit which corrects the transport header in the separated transport packet, 7 designates a de-packet circuit which converts the transport packet into a 1-bit bitstream, 8 designates a header analysis circuit which analyzes headers such as a sequence header, and a picture header contained in a bitstream, separates intra-frame or intra-field coded (hereinafter, referred to as "intra-coded", data, and outputs the detected headers to a header appending circuit 10 of a 4-times speed data forming circuit 13 and a 16-times speed data forming circuit 14, and 9 designates a trick playback data forming circuit which forms trick playback data for various high-speed playback speeds (in Embodiment 1, 4-times and 16-times speeds) from a bitstream of an image which has undergone intra-frame or intra-field coding (hereinafter, referred to as "intra-image"), and outputs the formed trick playback data.

The reference numeral 10 designates the header appending circuit which appends necessary data (e.g., header information such as a sequence header and a picture header, a coding mode, and a quantizing table information) out of headers outputted from the header analysis circuit 8, to 4-times speed data outputted from the trick playback data forming circuit 9, 11 designates a packet circuit which constitutes a transport packet of trick playback data by using data outputted from the header appending circuit 10, and 12 designates a corrected TP header appending circuit which appends a corrected transport header. The 4-times speed data forming circuit 13 is configured by the TP header correcting circuit 6, the header appending circuit 10, the packet circuit 11, and the corrected TP header appending circuit 12.

The reference numeral 14 designates the 16-times speed data forming circuit. The 16-times speed data forming circuit 14 has the same configuration as that of the 4-times speed data forming circuit 13, and hence the illustration of its detailed configuration in the block diagram is omitted.

Figure 15A:
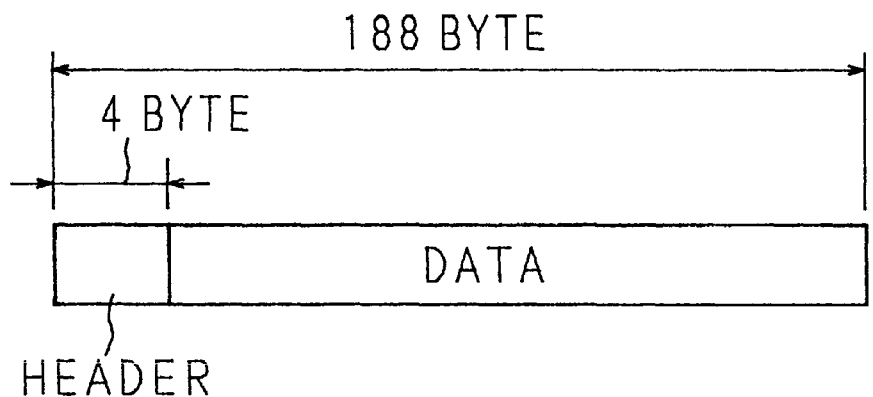
FIG. 15A is a diagram showing a transport packet of an input bitstream.
Figure 15B:
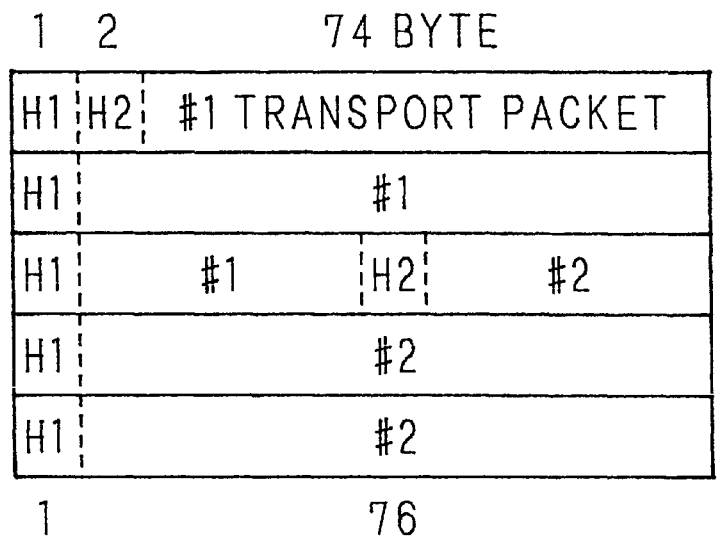
FIG. 15B is a diagram showing a record data packet which is to be recorded on a magnetic tape.

The reference numeral 80 designates a trick playback ECC circuit which converts 4-times speed and 16-times speed trick playback data inputted in the form of a transport packet into sync block formats as shown in FIG. 15 (described later in detail), and appends an error correcting check code for trick playback (hereinafter, referred to as "C5 check code" or merely as "C5 code") to the formats, and 81 designates a data synthesis circuit which converts a transport packet inputted through the input terminal 1 into a sync block format shown in FIG. 15B, synthesizes the sync block format with the data to which the error correcting check code is appended in the trick playback ECC circuit 80, and arranges sync block data in a predetermined sequence.

The reference numeral 82 designates a memory which temporarily stores an output of the data synthesis circuit 81, and 83 designates a normal playback ECC circuit which forms an error correcting check code for normal playback (hereinafter, referred to as "C4 check code" or merely as "C4 code"). The reference numeral 84 designates an ECC control circuit which, in accordance with an externally input command signal or a preset mode, judges whether the record mode of an error check code in recording is a trick playback ECC record mode or a normal playback ECC record mode, and outputs a control signal indicative of which error correcting code is to be recorded in an error correcting code record area (described later), to the trick playback ECC circuit 80, the data synthesis circuit 81, the normal playback ECC circuit 83, and a digital modulator 86. The reference numeral 85 designates an ECC circuit which appends an error correcting code according to the SD standard (see FIG. 10) to data outputted from the memory 82. The reference numeral 86 designates the digital modulator, 87 designates a record amplifier, 88 designates a drum, 89a and 89b designate rotary heads, and 90 designates a magnetic tape.

Figure 13:
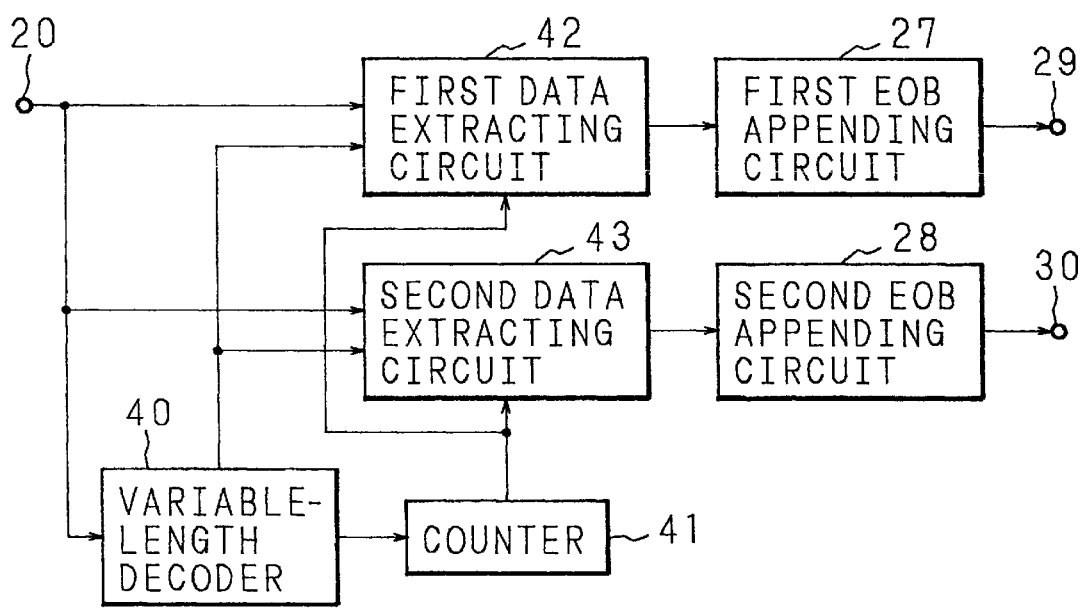
FIG. 13 is a block diagram showing the configuration of a trick playback data forming circuit used in the invention.

FIG. 13 is a block diagram showing a configuration of the trick playback data forming circuit 9 which is an embodiment of the invention. In the figure, 20 designates an input terminal to which a bitstream of intra-data is inputted, 40 designates a variable-length decoder which conducts variable-length decoding on the inputted bitstream, 41 designates a counter, 42 designates a first data extracting circuit which extracts 4-times speed data, and 43 designates a second data extracting circuit which extracts 16-times speed data. The reference numeral 27 designates a first EOB appending circuit which appends an EOB (End Of Block) code to 4-times speed trick playback data, and 28 designates a second EOB appending circuit which appends an EOB code to 16-times speed trick playback data. The reference numeral 29 designates an output terminal through which 4-times speed trick playback data are outputted, and 30 designates an output terminal through which 16-times speed trick playback data are outputted.

Figure 14A:
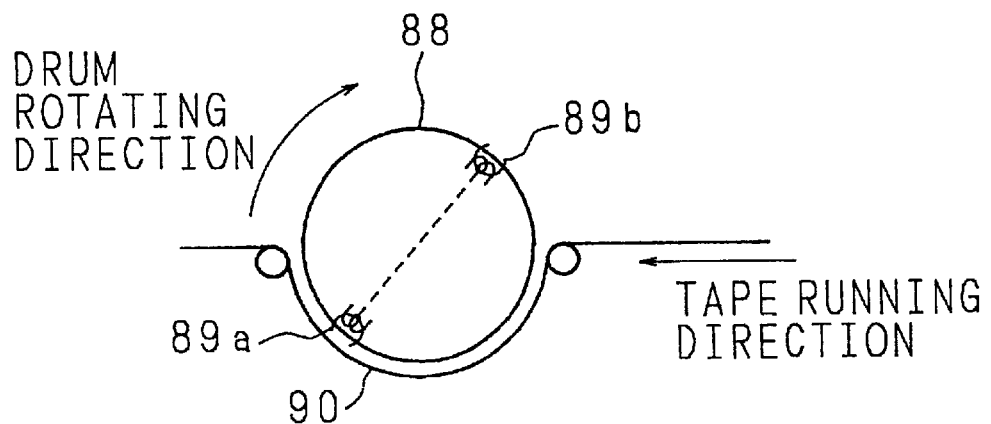
FIGS. 14A and 14B are diagrams showing the arrangement of heads for respective channels disposed on a typical rotary drum which is used in a digital VTR according to the SD standard.
Figure 14B:
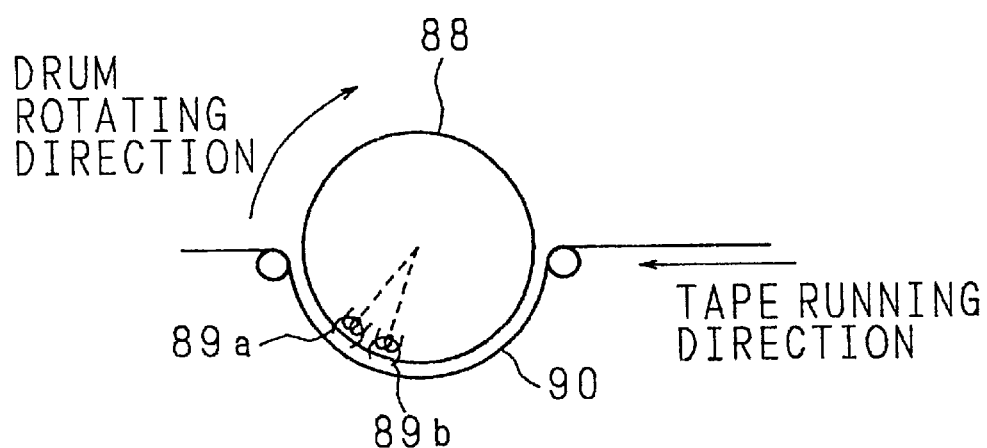

FIGS. 14A and 14B show the arrangement of the rotary heads 89a and 89b disposed on the typical rotary drum 88 which is used in the SD mode. Hereinafter, the arrangement of the rotary heads 89a and 89b shown in FIG. 14A is indicated by 1Ch×2, and that of the rotary heads 89a and 89b shown in FIG. 14B is indicated by 2Ch×1. FIG. 15 shows a data packet according to an embodiment of the invention, FIG. 15A is a diagram showing a transport packet contained in an input bitstream, and FIG. 15B is a diagram showing a record data packet which is to be recorded on the magnetic tape. A transport packet inputted through the input terminal 1 contains a digital video signal, a digital audio signal, and digital data relating to the video and audio signals. These signals and data are transported with being divided into transport packets shown in FIG. 15A. Each packet consists of a 4-byte header portion, and a 184-byte data portion.

Figure 11:
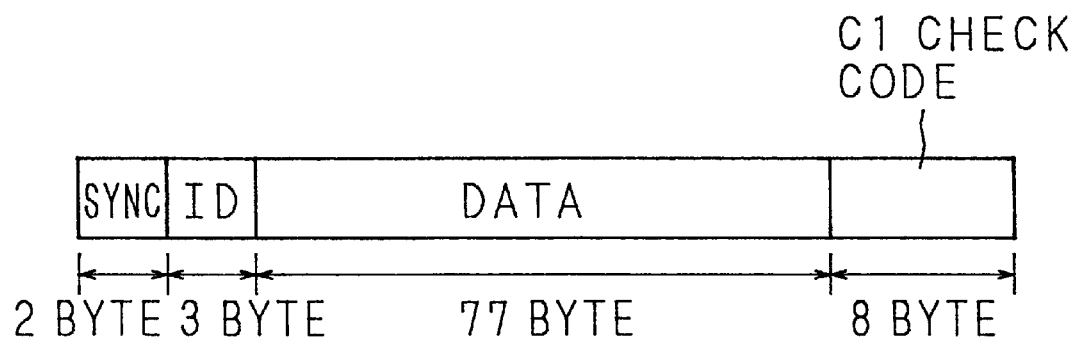
FIG. 11 is a diagram showing the configuration of 1 sync block according to the SD standard.

In Embodiment 1, in order to record input transport packets into a record track of the SD format, two transport packets are converted into record data blocks of 5 sync blocks as shown in FIG. 15B, and then recorded. In the figure, H1 designates a first header, and H2 designates a second header. In H1, data such as identification data indicative of the position of the respective block in the 5 sync blocks are recorded. As shown in FIG. 11, the data area of 1 sync block consists of data of 77 bytes. In H2, data such as identification data indicative of video data or audio data are recorded. In Embodiment 1, it is not required to record the sync byte which is appended to the top of the transport header appended to the top of a transport packet. In the following description of Embodiment 1, it is assumed that all data in a transport packet are recorded.

FIG. 16 is a table showing the number of sync blocks which can be obtained from 1 track at various high-speed playback speeds. The 9,000 rpm system is a system in which the heads are arranged in the manner shown in FIGS. 14A and 14B. Each value listed in FIG. 16 indicates the number of sync blocks which can be played back from one track at the respective high-speed playback speed in the case where trick playback is performed by using 10 μm rotary heads (the track pitch specified in the SD standard is 10 μm). The number of sync blocks was calculated under the assumption that 1 track (corresponding to 180 deg.) has 186 sync higher than −6 dB can be obtained in the same manner as the prior art example.

Figure 17:
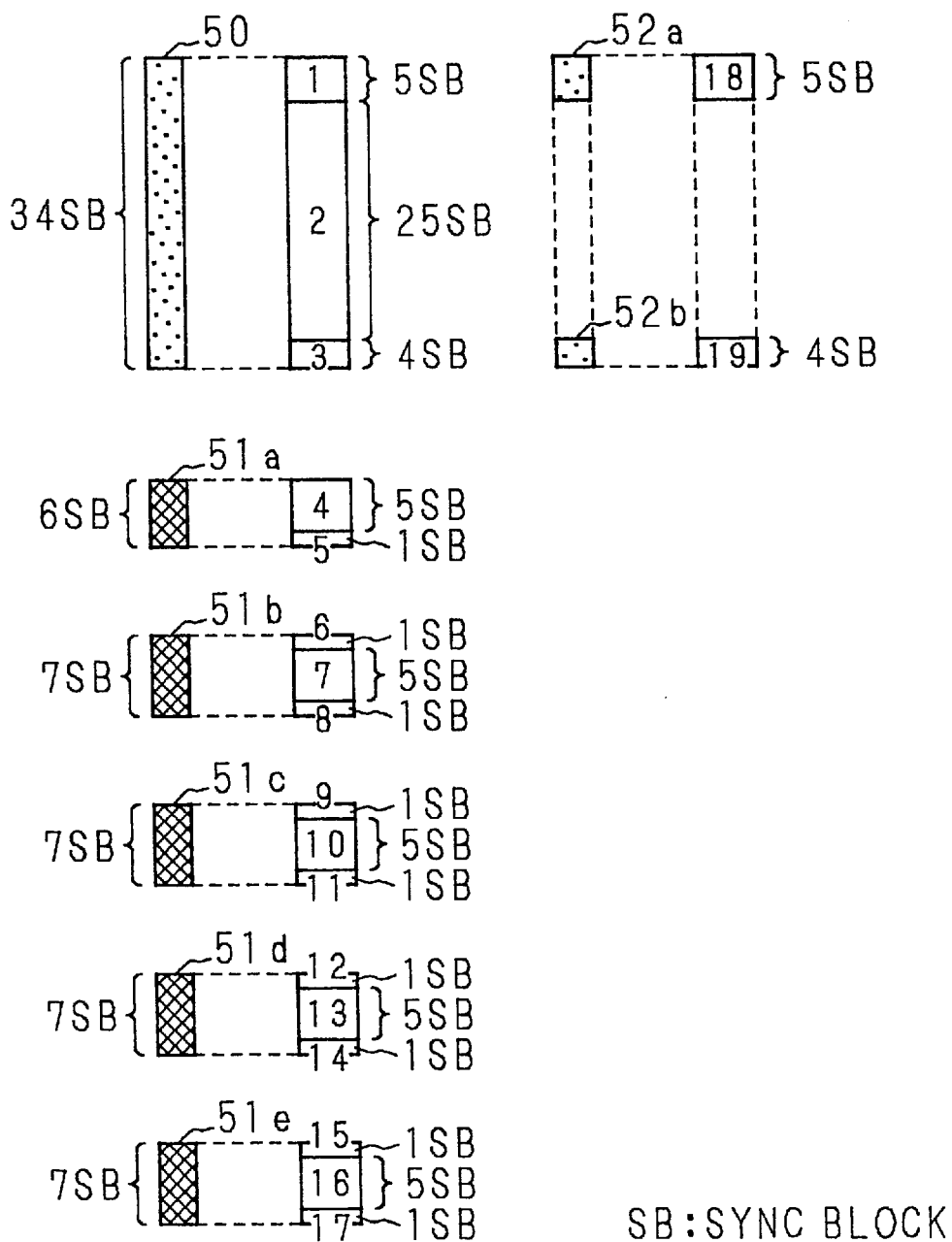
FIG. 17 is a diagram showing the configuration of trick playback data areas used in the invention.
Figure 18:
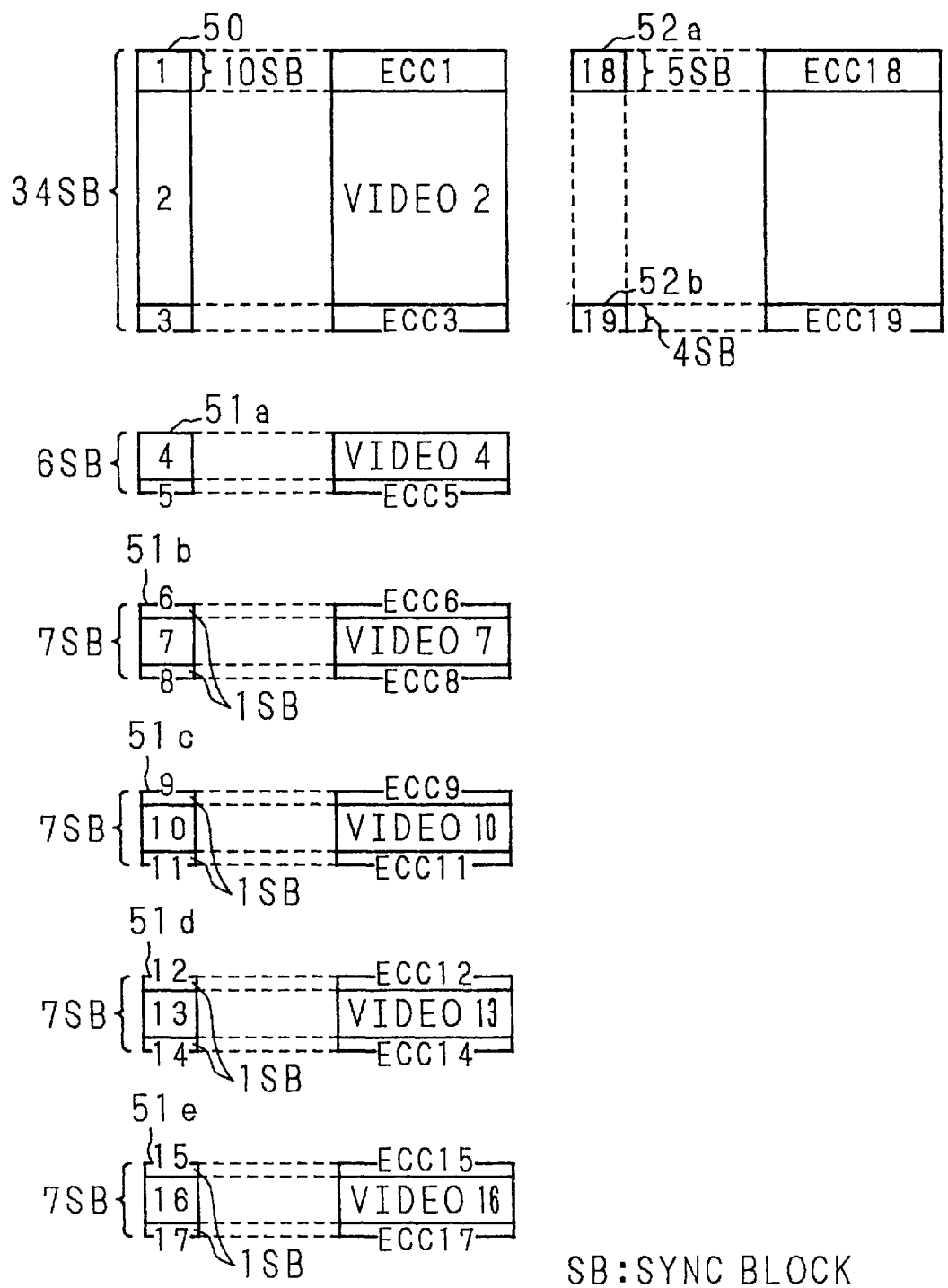
FIG. 18 is a diagram showing contents of data which are to be recorded in the trick playback data areas used in the invention.
Figure 19:
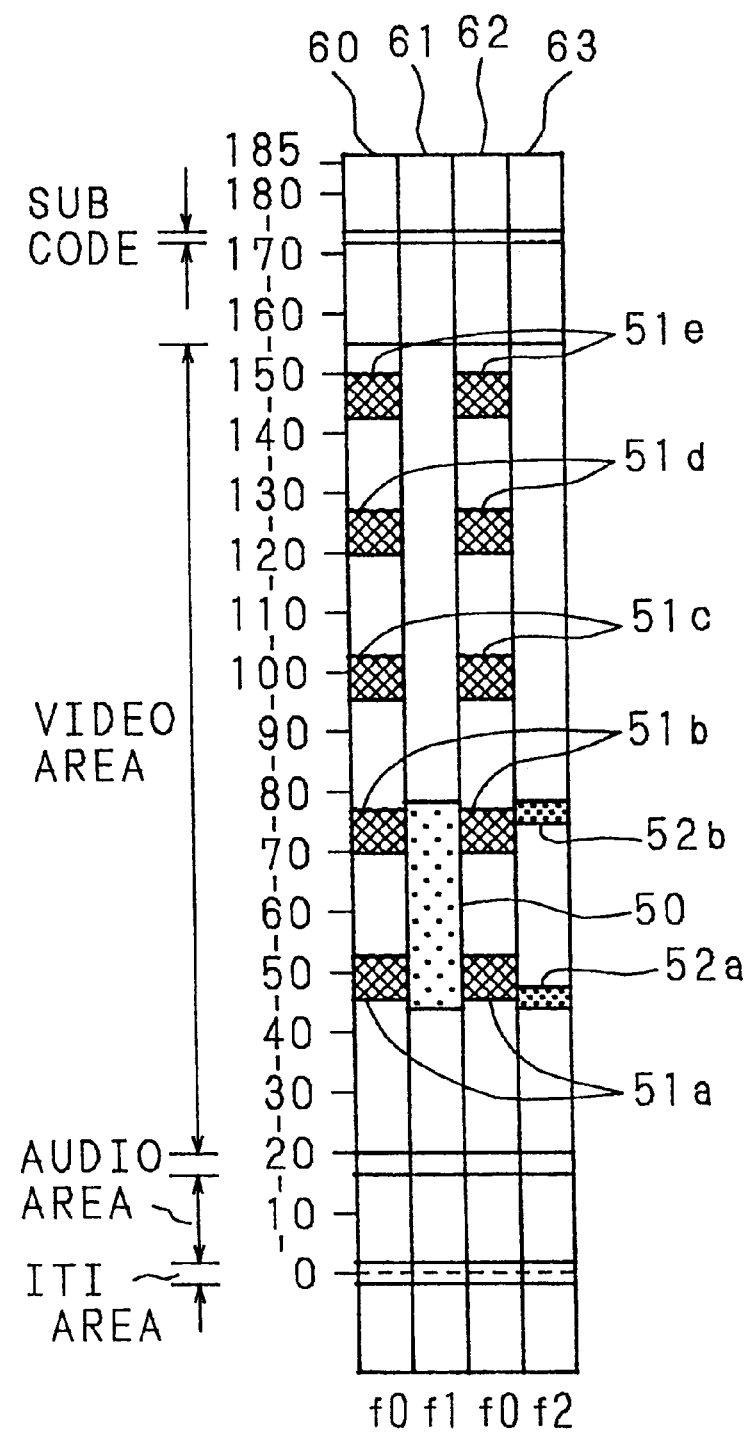
FIG. 19 is a diagram showing a track pattern of a 4-track period including the arrangement of the trick playback data areas used in the invention.
Figure 20:
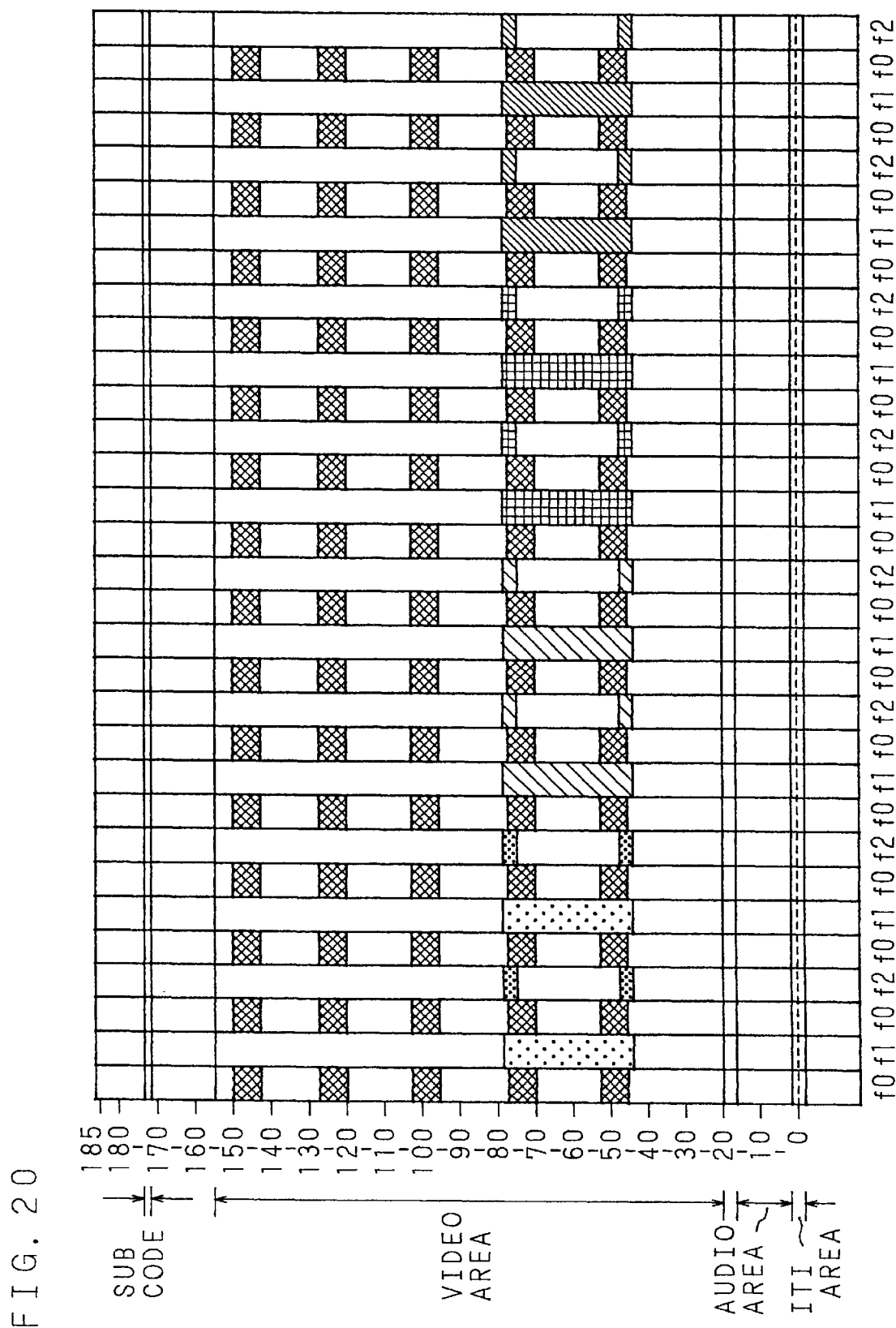
FIG. 20 is a diagram showing the arrangement of data of the 4-track period shown in FIG. 19 on a magnetic tape.

FIG. 17 is a diagram showing the configuration of trick playback data areas which is an embodiment of the invention. The areas will be described later in detail. FIG. 18 is a diagram showing contents of data which are to be recorded in a trick playback data area which is an embodiment of the invention, and shows specific data to be recorded in trick playback data areas (including an error correcting check code record area) of Embodiment 1. These areas will be described later in detail. FIG. 19 is a diagram showing a track pattern of a 4-track period including the arrangement of a trick playback data area which is an embodiment of the invention. The area will be described later in detail. FIG. 20 is a diagram showing the arrangement of data of the 4-track period shown in FIG. 19 on the magnetic tape 90.

Hereinafter, the record format used in Embodiment 1 will be described with reference to FIGS. 16 to 20. In FIG. 17, 50 designates a B-channel 4-times speed data record area (including an error correcting check code record area) where 4-times speed trick playback data obtained by the head for B channel are to be recorded, 51a to 51e designate A-channel 16-times speed data record areas (including an error correcting check code record area) where 16-times speed trick playback 52b designate B-channel error correcting check code record areas where an error correcting check code is to be recorded. Hereinafter, the track on which recording of the A-channel rotary head 89a is conducted is called A track, and that on which recording of the B-channel rotary head 89b is conducted is called B track.

The numerals 1 to 19 appended to the blocks of FIG. 17 indicate the area numbers in the record areas 50 to 52b. The detail of the data structure will be described later.

In FIG. 17, the record area 50 consists of 34 sync blocks, the record area 51a consists of 6 sync blocks, each of the record areas 51b to 51e consists of 7 sync blocks, the record area 52a consists of 5 sync blocks, and the data record area 52b consists of 4 sync blocks. The number of sync blocks allocated to the record areas were determined on the basis of the data shown in FIG. 16. According to FIG. 16, in the 9,000 rpm system, 4-times speed playback allows (32 sync blocks to be obtained from 1 track, and 16-times speed playback allows 12 sync blocks to be obtained from 1 track. The data structure which is based on the above and corresponds to the trick playback speeds is shown in FIG. 17.

FIG. 18 shows the details of contents of data which are to be recorded in data areas of FIG. 17. Among 4-times speed playback data consisting of 34 sync blocks in the record area 50, an error correcting check code record area 1 (referred to as "ECC1") of 5 sync blocks is disposed in area 1, a trick playback video data record area 2 (referred to as "VIDEO 2") of 25 sync blocks is disposed in area 2, and an error correcting check code record area 3 (referred to as "ECC3") of 4 sync blocks is disposed in area 3.

Among 16-times speed playback data consisting of 6 sync blocks in the record area 51a, a trick playback video data record area 4 (referred to as "VIDEO 4") is disposed in area 4, and an error correcting check code record area 5 (referred to as "ECC5") consisting of 1 sync block is disposed in area 5. Among 16-times speed playback data each consisting of 7 sync blocks in the record areas 51b to 51c, a trick playback video data record area 7 (referred to as "VIDEO 7"), a trick playback video data record area 10 (referred to as "VIDEO 10"), a trick playback video data record area 13 (referred to as "VIDEO 13"), and a trick playback video data record area 16 (referred to as "VIDEO 16") are disposed in areas 7, 10, 13, and 16 each consisting of 5 sync blocks, respectively in order. An error correcting check code record area 6 (referred to as "ECC6"), an error correcting check code record area 8 (referred to as "ECC8"), an error correcting check code record area 9 (referred to as "ECC9"), an error correcting check code record area 11 (referred to as "ECC11"), an error correcting check code record area 12 (referred to as "ECC12"), an error correcting check check code record area 15 (referred to as "ECC15"), and an error correcting check code record area 17 (referred to as "ECC17") are disposed in areas 6, 8, 9, 11, 12, 14, 15, and 17 each consisting of 1 sync block, respectively.

An error correcting check code record area 18 (referred to as "ECC18") consisting of 5 sync blocks is disposed in the record area 52a, and an error correcting check code record area 19 (referred to as "ECC19") consisting of 4 sync blocks is disposed in the record area 52b. With respect to the error correcting check codes (ECC1, and ECC3) recorded in the record area 50, the error correcting check codes (ECC5, ECC6, ECC8, ECC9, ECC11, ECC12, ECC14, ECC15, and ECC17) recorded in the record areas 51a to 51e, and the error correcting check codes (ECC18, and ECC19) recorded in the record areas 52a and 52b, the error correcting code to be recorded is switched by the control signal outputted from the ECC control circuit 84.

Hereinafter, the method of recording an error correcting code which is one important feature of the invention will be described. As described also in the prior art paragraph, the ATV signal is subjected to data compression by using a compression method based on motion compensative predication. In the ATV signal, therefore, when an error occurs in playback data, the error propagates over plural fields or When a digital VTR according to the SD standard is to be used as a storage medium for storing data, program, etc. for a computer system or the like, it is desired to append a stronger error correcting code in order to reconstruct data which were not to played back due to a drop-out caused by a scratch on a magnetic tape, or dust adhering to the magnetic tape, or the like.

Figure 10A:
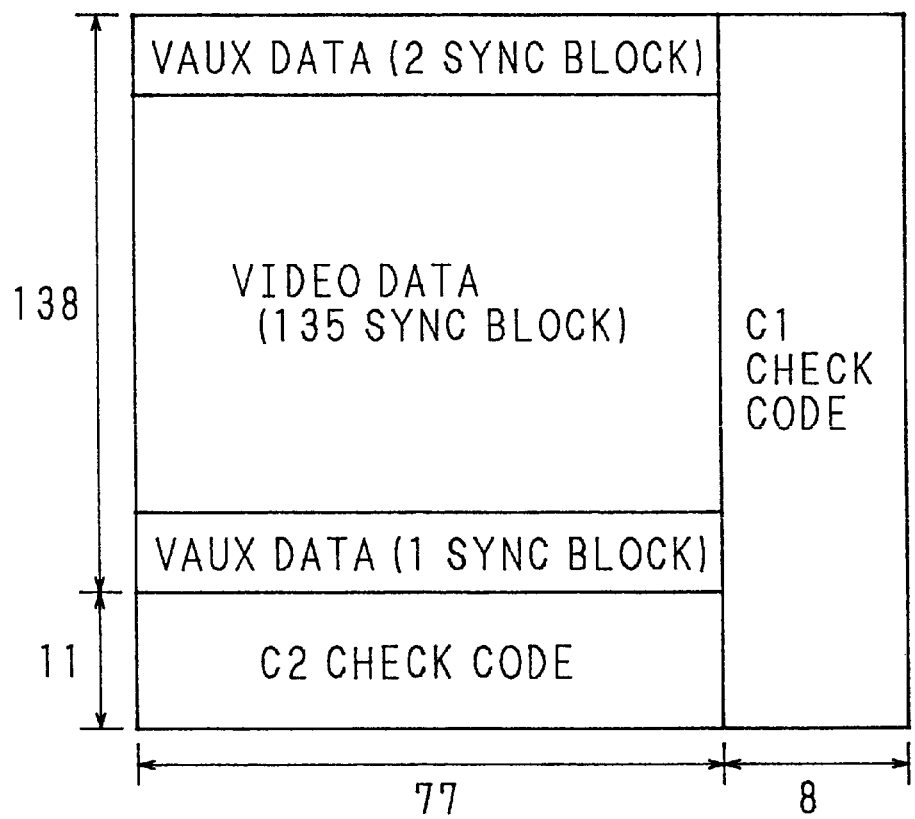
FIGS. 10A and 10B are diagrams showing data formats of record areas for video and audio signals in 1 track for a video signal according to the SD standard.

In a trick playback (high-speed playback, slow motion playback, still-motion playback, or the like), the rotary heads 89a and 89b obliquely cross record tracks so that playback signals are intermittently played back from the tracks. In trick playback, therefore, it is impossible to configure an error correcting block (video data) such as shown in FIG. 10A. In trick playback, consequently, only the error correction due to the C1 check code is conducted on playback data. In the case where the error correction due to the C1 check code is conducted, there arises a problem in that the error occurrence frequency is so high that a trick playback image is visually inferior.

On the other hand, as described also in the prior art paragraph, the amount of appended data which can be recorded on the magnetic tape 90 is limited. In Embodiment 1, in order to effectively use the restricted data area, the area to which an error correcting code is to be appended is disposed on the paths along which the rotary heads 89a and 89b scan in trick playback. Furthermore, when the user places importance on the picture quality of a normal playback image, data are formed so that an error correcting code is appended to normal playback data, and, when the user places importance on the picture quality of a trick playback image, data are formed so that an error correcting code is appended to trick playback data.

According to the above configuration, within a restricted data amount, an error correcting code can effectively be appended to desired data. When the digital VTR is to be used as a storage medium for a computer system or the like, it is possible to append a strong error correcting code with the same record format. In other words, an error correcting code for normal playback is written into an error correcting record area. In the error correcting check code record areas (ECC18, and ECG19) of the record areas 52a and 52b, when an error correcting code is to be appended to a normal playback data, an error correcting check code for normal playback (C4 code) is recorded, and, when an error correcting code is to be appended to trick playback data, a fixed value data (e.g., a data in which all bits are 0) is recorded. As far as a previously determined data is used, it is not necessary to use a fixed value data. According to this configuration, when a magnetic tape on which an error correcting code for trick playback is recorded is subjected to normal playback, in error correcting decoding in normal playback, the error correcting ability of the C2 code can be improved somewhat because the data recorded in the aforementioned areas are fixed value data. In C2-decoding, with respect to 9 symbols, it is possible to make errorless. Therefore, the error correcting ability can be improved.

FIG. 19 shows an example in which trick playback data areas are arranged in a track. Data record areas from the lower end to the upper end of a track according to the SD standard, and their contents are shown in the left end portion of the figure. An ITI area, an audio area, a video area, and a subcode area are arranged in this sequence starting from the lower end of the track. The scale shown in the figure indicates sync block addresses (sync block numbers). As described above, the length of one track (corresponding to 180 deg.) is configured by data corresponding to 186 sync blocks.

In FIG. 19, 60 designates a first track on which recording is conducted by the A-channel rotary head 89a, 61 designates a second track on which recording is conducted by the B-channel rotary head 89b, 62 designates a third track on which recording is conducted by the A-channel rotary head 89a, and 63 designates a fourth track on which recording is conducted by the B-channel rotary head 89b. In the record format used in Embodiment 1, data are recorded on the magnetic tape 90 with setting 4 tracks or the first fourth track 60 to 63 as one unit. In the figure, f0, f1, and f2 indicated below the tracks indicate the kinds of a pilot signal which is recorded in the respective tracks so as to be used as the reference signal for a tracking control in playback. In video areas of the tracks other than the record areas 50, 51a to 51e, 52a, and 52b, inputted transport packets are recorded. Hereinafter, these areas are referred to as "main area".

With respect to trick playback data (VIDEO 4, VIDEO 7, VIDEO 10, VIDEO 13, and VIDEO 16) to be recorded in the record areas 51a to 51e of the first and third tracks 60 and 62 among the four tracks, the same data are recorded in the areas designated by the same symbol. It is a matter of course that, when the areas for recording an error correcting code are used as areas for recording an error correcting check code for trick playback, the same data are recorded in the two tracks, and, when the areas for recording an error correcting code are used as areas for recording an error correcting check code for normal playback, the same data are not recorded in the two tracks. The 4-times speed record area 50 can be played back from one track by one scan of the rotary head 89b in 4-times speed playback. With respect to the 16-times speed record areas 51a to 51e, the 5 areas can be played back from 5 tracks by one scan of the rotary head 89a in 16-times speed playback.

When error correcting check codes recorded in the record areas 50, and 51a to 51e are data appended as error correcting codes for trick playback, error correction is conducted on trick playback data with using these error correcting check codes in trick playback. By contrast, when the error correcting check codes are data appended as error correcting codes for normal playback, the codes are ignored in trick playback. In normal playback, when the codes recorded in the areas are data appended as error correcting check codes for normal playback, error correction is conducted on playback data with using these error correcting check codes. By contrast, when the codes are data appended as error correcting check codes for trick playback, the data are ignored in normal playback. The method of configuring error correcting check codes for normal playback and trick playback will be described later in detail.

According to the data arrangement (record format) of one unit shown in FIG. 19, the rotary heads 89a and 89b scan the ITI area and the subcode area shown in the figure in 4-times speed playback and 16-times speed playback. This scan will be described later in detail in the description of the playback system. In other words, in trick playback, tracking can be controlled by using the pilot signals f0, f1, and f2 in the ITI area, and appended information such as time information, and music piece number information stored in the subcode area can be played back.

Data are recorded on the magnetic tape by repeatedly subjecting one unit shown in FIG. 19 to recording. FIG. 20 shows the record format on the magnetic tape. In FIG. 19, 4-times speed data which are to be recorded in VIDEO 2 are recorded 2 times (see FIG. 20), and 16-times speed data which are to be recorded in VIDEO 4, VIDEO 7, VIDEO 10, VIDEO 13, and VIDEO 16 are recorded 8 times. Specifically, for 16-times speed data, the same data are recorded in 2 tracks in one unit (4 tracks) so that the same data are repeatedly recorded 16 times as a whole. In the period of 32 tracks, 16-times speed trick playback data are switched over. Furthermore, for 4-times speed data, the same data are recorded 2 times. In the period of 8 tracks, 4-times speed -trick playback data are switched over.

When error correcting codes to be recorded in the error correcting check code record area are normal playback error correcting codes, as described above, the C4 check code for normal playback is recorded in an area in which an error correcting check code is to be recorded and which is shown at the both ends or one end of 4-times speed or 16-times speed trick playback data in FIG. 18. In this case, the C4 check code for normal playback is recorded 1 time for each area. In other words, in a mode of appending an error correcting check code for normal playback, with respect to the contents of an error check code for normal playback to be recorded in ECC1, ECC3, ECC5, ECC6, ECC8, ECC9, ECC11, ECC12, ECC14, ECC15, ECC17, ECC18, and ECC19 in FIG. 18, the same data are not repeatedly recorded or all the data are recorded only 1 time.

Figure 21:
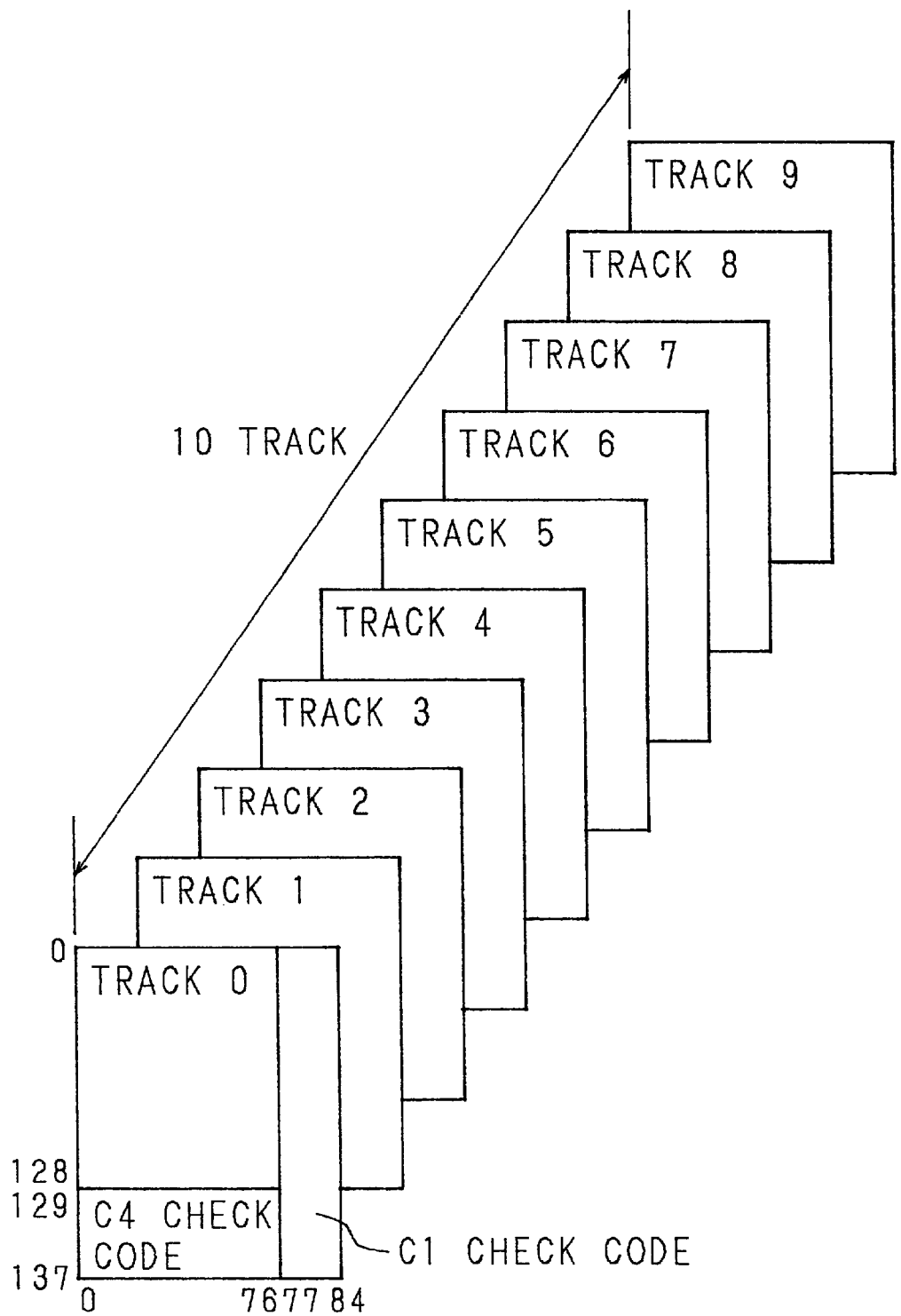
FIG. 21 is a diagram showing the structure of an error correcting check code which is to be appended to normal playback data in the invention.

Next, the structure of an error correcting code which is used in normal playback and trick playback will be described with reference to FIGS. 21 to 25. FIG. 21 is a diagram showing the structure of an error correcting check code which is to be appended to normal playback data and which is an embodiment of the invention. In Embodiment 1, in order to strengthen an error correcting code (C4 code) in normal playback, (138, 129, 10) Reed-Solomon code in which interleave has a depth of 10 tracks is used as the C4 code. In the figure, numerals which are vertically arranged indicate sync block addresses for generating the C4 code, and numerals which are horizontally arranged indicate data addresses in 1 sync block.

Figure 23A:
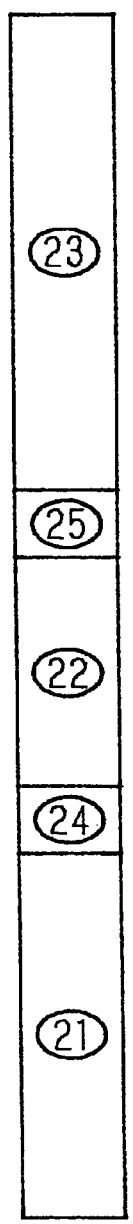
FIGS. 23A to 23C are diagrams showing the arrangement of data which are to be recorded in B track in the invention, and the configuration of an error correcting block in 1 track in the case where an error correcting check code to be appended to normal playback data and high-speed playback data is formed.
Figure 23B:
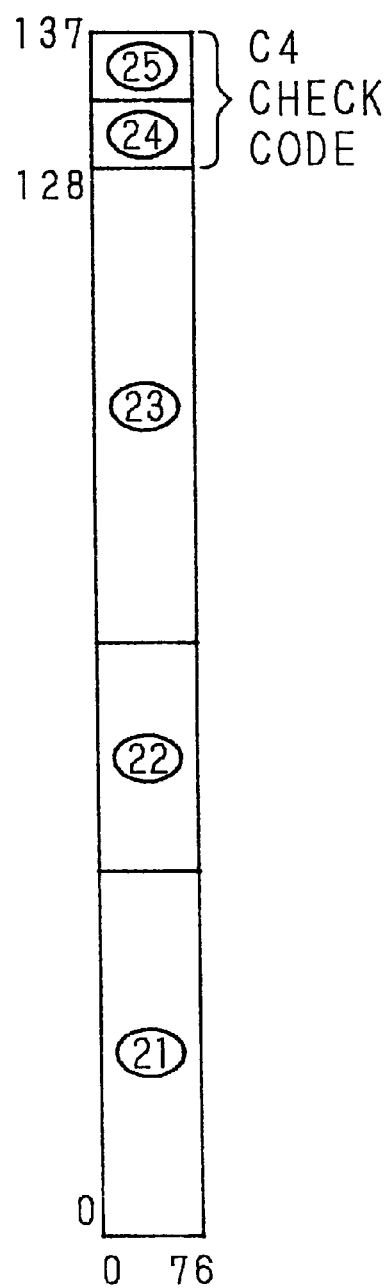
Figure 23C:
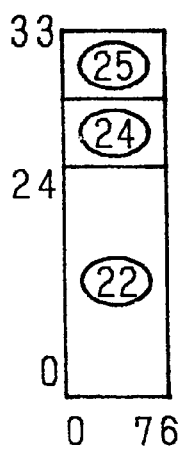

FIG. 22A shows the specific arrangement of the ATV data, trick playback data, and an error correcting check code (C4 check code or C5 check code) in A track. FIG. 22B shows the arrangement of the ATV data and the C4 check code in the case where the C4 code is generated. FIG. 22C shows the specific arrangement of the C4 check code. FIG. 22D shows the arrangement of trick playback data, and the C5 check code in the case where the C5 code is generated. FIG. 22E shows the specific arrangement of the C5 check code. Similarly, FIG. 23A shows the specific arrangement of the ATV data, trick playback data, and an error correcting check code (C4 check code or C5 check code) in B track. FIG. 23B shows the arrangement of the ATV data and the C4 check code in the case where the C4 code is generated. FIG. 23C shows the arrangement of trick playback data and the C5 check code in the case where the C5 code is generated.

In Embodiment 1, as described above, the C4 code is generated by subjecting data to interleave of a depth of 10 tracks. In the generation, the data synthesis circuit 81 converts a transport packet (FIG. 15A) inputted through the input terminal 1, into data in the unit of a sync block shown in FIG. 15B. By using the ATV signal which was converted in the unit of a sync block, and trick playback data outputted from the trick playback ECC circuit 80 (special playback data are previously converted into data in the unit of a sync block by the trick playback ECC circuit 80), blocks used in the generation of the C4 code shown in FIG. 22B or 23B are configured in the unit of a track. In this case, the C5 check code generated by the trick playback ECC circuit 80 is stored at a predetermined address of the memory 82.

The record data which have been configured in the unit of a track by the data synthesis circuit 81 are temporarily stored in the memory 82. When data for 10 tracks having the data structure shown in FIG. 22B or 23B are configured in the memory 82, the normal playback ECC circuit 83 starts the generation of the C4 code in which interleave has a depth of 10 tracks. Hereinafter, the method of generating the C4 code will be described with reference to FIG. 24.

Figure 24:
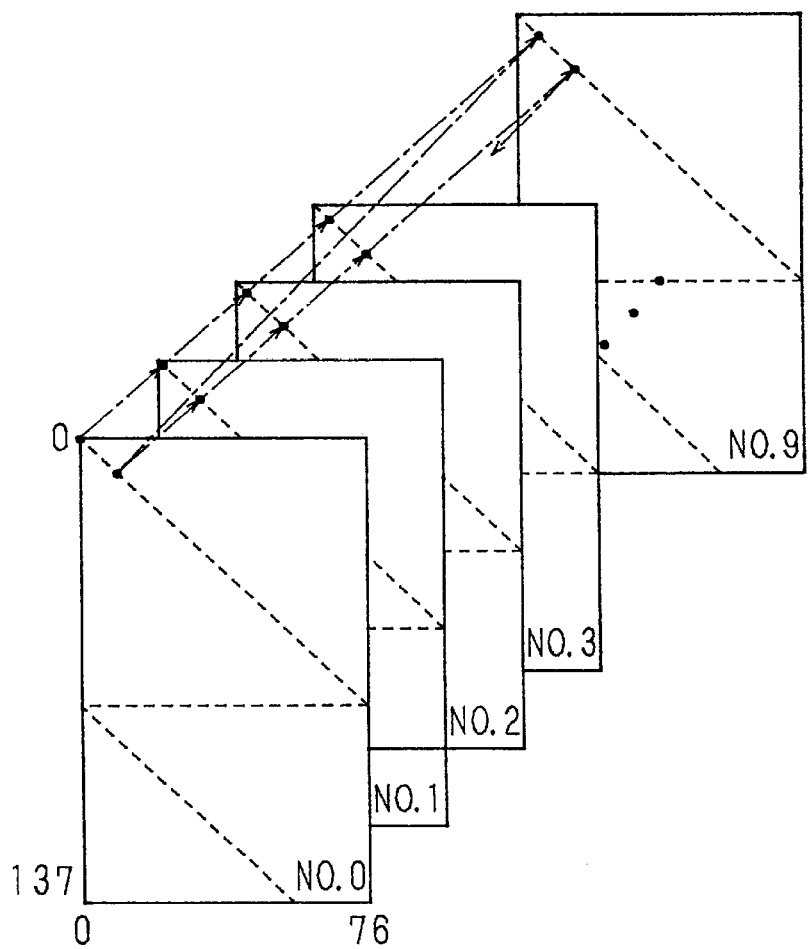
FIG. 24 is a diagram illustrating an interleave pattern of 10 tracks in the case where an error correcting check code for normal playback in the invention is formed.

FIG. 24 is a diagram conceptually showing interleave of data in Embodiment 1. The interleave method used in Embodiment 1 will be described. When a data in which the track number is Tn ($0 \leq Tn \leq 9$), the sync block number when the block structure shown in FIG. 22B or 23B is attained is SBn ($0 \leq SBn \leq 137$), and the data number in a sync block is Dn ($0 \leq Dn \leq 76$) is defined as D[Tn, SBn, Dn], an embodiment of shuffling shown in FIG. 24 is attained as follows:

(D[0, 0, 0], D[1, 1, 1], D[2, 2, 2], ..., D[(i mod 10), i, (i mod 77)], ..., D[7, 127, 50], D[8, 128, 51], D[9, 129, 52], ..., D[7, 137, 60]) In this case, the 129 bytes from D[0, 0, 0] to D[8, 128, 51] constitute a data symbol, and the 9 bytes from D[9, 129, 52] to D[7, 137, 60] constitute the C4 check code. FIG. 24 diagrammatically shows the shuffling operation. Regarding interleave, 10 tracks in the direction of the one-dot chain line is subjected to interleave. The broken lines indicate the interleave direction in the plane. In an actual operation, interleave is conducted for every 10 tracks so that 1 data is sampled for every 10 sync blocks.

The above-mentioned operation is conducted on all data in the top sync block of each track. Specifically, when the C4 code is to be generated with starting from a k-th data of the top sync block of a j-th track, the following is attained:

(D[j, 0, k], D[(j+1 mod 10), 1, (k+1 mod 77)], ..., D[(j+i mod 10), FIG., 1 designates an input terminal for a transport packet. The mod 10), 129, (k+129 mod 77)], ..., D[(j+137 mod 10), 137, (k+137 mod 77)]) Interleave is executed by changing k from 0 to 76 for 1 track and applying it to 10 tracks while changing j from 0 to 9, thereby generating the C4 check code. In FIG. 24 and the above expression, (X mod Y) means a remainder obtained when an integer X is divided by an integer Y. The data to which the interleave is conducted to generate the C4 code are read out from the memory 82 so as to be recorded in predetermined areas shown in FIGS. 22A and 23A. In the case where the mode of appending an error correcting check code is the one of appending an error correcting check code to trick playback data, the C5 check code is recorded in the error correcting check code record area, and the C4 code is discarded.

Next, the burst error correcting ability of the C4 code will be described with reference to FIG. 25. FIG. 25 is a diagram illustrating the burst error correcting ability according to an error correcting check code for normal playback which is an embodiment of the invention. FIG. 25A shows the record area for the C4 check code in A track, and FIG. 25B shows positions of data which are to be sampled from one A track when the error correction due to the C4 check code is conducted. Similarly, FIG. 25C shows the record area for the C4 check code in B track, and FIG. 25D shows positions of data which are to be sampled from one B track when the error correction due to the C4 check code is conducted. In both A and B tracks, data are sampled in every about 10 symbols in accordance with interleave of 10 tracks. In the data arrangement of FIG. 25, it is possible to correct burst errors of 87 or 89 sync blocks at the maximum. According to this configuration, even when data of 80 sync blocks are not played back in normal playback due to, for example, a drop-out, it is possible to reconstruct the data in accordance with the C4 code.

Figure 26:
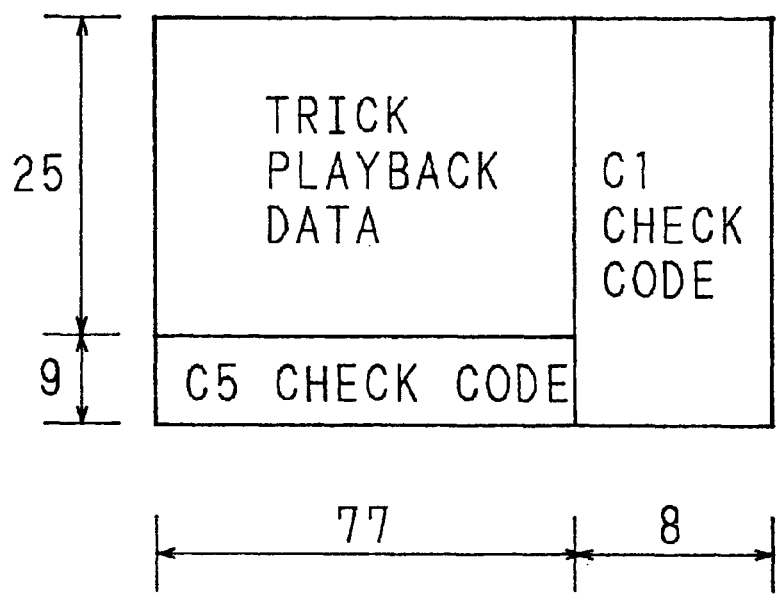
FIG. 26 is a diagram showing the structure of an error correcting check code which is to be appended to trick playback data in the invention.

Next, the structure of an error correcting code which is to be appended to trick playback data, and the data arrangement on the magnetic tape 90 will be described with reference to FIGS. 22, 23, and 26. FIG. 26 is a diagram showing the structure of an error correcting check code which is to be appended to trick playback data and which is an embodiment of the invention. Hereinafter, the data structure shown in FIG. 26 is referred to as "error correcting block". It is assumed that the error correcting code (C5 code) to be appended to trick playback data uses (34, 25, 10) Reed-Solomon code. FIG. 22D shows the arrangement of 16-times speed data and an error correcting code to be recorded in A track. When data of the error correcting block shown in FIG. 26 are to be recorded in A track, 16-times speed playback data are divided in the unit of 5 sync blocks and the blocks are recorded in the areas shown in FIG. 22A. respectively. An error correcting code is recorded in error correcting check code record areas disposed in sync blocks above and below the trick playback data area of the unit of 1 sync block.

Similarly, 4-times speed playback data to be recorded in B track are recorded in the trick playback data area in the unit of 25 sync blocks. On the other hand, an error correcting code is divided into front 4 sync blocks and rear 5 sync blocks, and then recorded in error correcting check code record areas disposed in 5 sync blocks and 4 sync blocks above and below the trick playback data area. In FIGS. 22, and 23, numerals which are vertically arranged indicate sync block addresses for configuring an error correcting code, and numerals which are horizontally arranged indicate data addresses in 1 sync block.

Next, the operation of the record system will be described with reference to FIGS. 12 to 25. A transport packet input through the input terminal 1 is inputted to the data synthesis circuit 81 and the TP header analysis circuit 5. The TP header analysis circuit 5 detects a transport header from the input transport packet. The detection result is inputted to the 4-times speed data forming circuit 13, the 16-times speed data forming circuit 14, and the ECC control circuit 84. On the other hand, a transport packet from which a transport header is detected in the TP header analysis circuit 5 is inputted to the de-packet circuit 7.

In the de-packet circuit 7, the inputted transport packet is subjected to parallel/serial conversion to be converted into 1-bit bitstreams. The bitstreams outputted from the de-packet circuit 7 are inputted to the header analysis circuit 8. The header analysis circuit 8 detects headers such as a sequence header, and a picture header from the inputted bitstreams, and separates intra-coding data. The intra-data separated in the header analysis circuit 8 are inputted to the trick playback data forming circuit 9.

Hereinafter, the trick playback data forming circuit 9 will be described in detail with reference to FIG. 13. In video compression according to MPEG2, an 8-line×8-pixel block (hereinafter, referred to as "DCT block") is subjected to the discrete cosine transform (hereinafter, abbreviated as "DCT"), data which have undergone the DCT (hereinafter, referred to as "DCT coefficient") are read out in the scanning sequence which is called the zig-zag scanning, the read out data are subjected to run-length coding of the run length of zero coefficients to be split into run length data and coefficient data, and then two-dimensional variable-length coding is conducted. Intra-data inputted through the input terminal 20 are inputted to the variable-length decoder 40, the first data extracting circuit 42, and the second data extracting circuit 43. In the variable-length decoder 40, the inputted bitstreams are subjected to variable-length decoding. In Embodiment 1, the inputted bitstreams are not completely decoded, but only the run length and the code length of a variable-length coded word are detected and outputted, thereby reducing the circuit scale. It is a matter of course that variable-length decoding may be completely done. The counter 41 counts the number of DCT coefficients in decoded 1 DCT block on the basis of the run length, and outputs the count result to the first data extracting circuit 42 and the second data extracting circuit 43.

The first data extracting circuit 42 extracts a variable-length coded word to be transmitted, on the basis of the count result outputted from the counter 41. The timing of extracting data is controlled so that the number of decoded DCT coefficients outputted from the counter 41 is compared with a predetermined number and a variable-length coded word is transmitted before the number exceeds the predetermined number. Each break between variable-length codes is detected based on code-length information outputted from the variable-length decoder 40. Similarly, also the second data extracting circuit 43 extracts data at timings (thresholds) which are independently preset on the basis of data outputted from the counter 41 and the variable-length decoder 40. An EOB code is appended to the extracted data in the first and second EOB appending circuits 27 and 28, and the data are outputted through the output terminals 29 and 30, respectively.

In the data extracting circuit 42 and 43, the number of DCT coefficients from which data are to be extracted may be the same or alternatively different. When the number of DCT coefficients to be extracted is different in the circuits, it means that the number of DCT blocks recorded in the recorded trick playback transport packet is different. As described above, the areas into which trick playback data can be recorded is restricted. In the case where trick playback data record areas for trick playback speeds have the same number of sync blocks, when the number of recorded DCT coefficients in 1 DCT block is increased, more trick playback data record areas are required, thereby lengthening the update interval (hereinafter, referred to as "refresh") of video data on the screen in high-speed playback. As a larger number of DCT coefficients are transmitted, the picture quality of a played back image is further improved. By contrast, when the number of recorded DCT coefficients in 1 DCT block is decreased, the data amount for 1 frame of trick playback data is reduced so that a less number of trick playback data record areas are required, thereby shortening the refresh of a played back image. Since recorded DCT coefficients are reduced in number, the picture quality of a played back image is degraded. The amount of extracting data in each speed is determined in accordance with the tradeoff of the refresh and the picture quality.

Then, 4-times speed trick playback data and 16-times speed trick playback data outputted from the trick playback data forming circuit 9 are inputted to the 4-times speed data forming circuit 13 and the 16-times speed data forming circuit 14, respectively. The successive processes are the same in both the playback speeds (4-times speed and 16-times speed), and hence only the formation of 4-times speed data will be described hereinafter. The 4-times speed data forming circuit 13 corrects the transport header on the basis of transport header information inputted from the TP header analysis circuit 5. Specifically, on the basis of intra-data information outputted from the header analysis circuit 8, the 4-times speed data forming circuit 13 rewrites header information which are in the transport header of a transport packet transmitted through intra-frame and indicative of continuity of the transport packet. On the other hand, the header appending circuit 10 appends header information such as a sequence header, and a picture header detected in the header analysis circuit 8, and information (a coding mode flag, quantizing table information, etc.) which are required for decoding trick playback data from the headers, to a trick playback bitstream outputted from the trick playback data forming circuit 9.

The trick playback data to which header information are appended are subjected to serial/parallel conversion by the packet circuit 11 to be converted into data in which 1 byte consists of 8 bits. The 8-bit data which have undergone serial/parallel conversion are divided into parts of 184 bytes so as to constitute the data portion of the transport packet. In the serial/parallel conversion, data "0" are inserted before each header information so that each header information is configured by 4 bytes as defined in MPEG2. Each header information which consists of 32 bits must be configured by 4 bytes when a transport packet is to be formed. Specifically, when a header information spreads over 5 bytes, the header information is controlled so as to be configured by 4 bytes, by appending data "0" before the header information. In the corrected TP header appending circuit 12, the transport header information outputted from the TP header correcting circuit 6 is appended to the data of the transport packet of 184 bytes which is configured by the packet circuit 11, and the resulting data is then outputted. Header information read out from the TP header correcting circuit 6 is outputted on the basis of a timing signal outputted from the packet circuit 11.

Tn the above, processing of converting 4-times speed data into a transport packet has been described. Also 16-times speed data are subjected to similar processing. That is, 16-times speed trick playback data outputted from the trick playback data forming circuit 9 are inputted to the 16-times speed data forming circuit 14. In the 16-times speed data forming circuit 14, on the basis of header information outputted from the header analysis circuit 8, headers and appended information are appended to the trick playback data by the header appending circuit 10, the trick playback data are then subjected to serial/parallel conversion by the packet circuit 11 in the manner described above to constitute the data portion of the transport packet, the corrected transport header is appended by the corrected TP header appending circuit 12, and then the data are outputted in the form of a transport packet to the trick playback FCC circuit 80.

The operation of the ECC control circuit 84 will be described. In response to a command inputted from the user, the ECC control circuit 84 judges whether the mode is a trick playback ECC mode or a normal playback ECC mode, outputs the kind of an error correcting check code to be recorded, to the trick playback ECC circuit 80, the data synthesis circuit 81, the normal playback ECC circuit 83, and the digital modulator 86, and outputs also a track identification signal of a 4-track period on the basis of servo information outputted from the tape running control system and the drum rotation control system. In Embodiment 1, error correcting check codes are switched over in accordance with an output of the memory 82.

With respect to the trick playback transport packet data respectively outputted from the 4-times speed data forming circuit 13 and the 16-times speed data forming circuit 14, first 2 transport packets are collected by the respective trick playback ECC circuits 80, and converted into data of 5 sync blocks as shown in FIG. 15B. Trick playback data which have been converted into data of 5 sync blocks shown in FIG. 15B and correspond to each playback speed are collected in 25 sync blocks to constitute error correcting blocks for appending the C5 check code to the trick playback data. The C5 code is formed for each of 4-times speed data and 16-times speed data, and appended to the respective data. Then, 4-times speed data and 16-times speed data to which the C5 code is appended are inputted to the data synthesis circuit 81.

In the data synthesis circuit 81, the ATV signal which is inputted through the input terminal 1 and in the unit of a transport packet is converted into the sync block format shown in FIG. 15B, and the ATV signal in the unit of a sync block and trick playback data outputted from the trick playback ECC circuit 80 are synthesized so that ATV data and trick playback data are synthesized in the unit of 1 sync block as shown in FIG. 22B or 23B. The tracks from the first to fourth tracks shown in FIG. 19 are identified on the basis of the control signal outputted from the ECC control circuit 84. When data configured in the manner described above are outputted from the data synthesis circuit 81 to the memory 82, the C5 check code formed in the trick playback ECC circuit 80 is outputted together with the data, and temporarily stored in a C5 code storage area disposed in the memory 82. In the memory 82, data outputted from the data synthesis circuit 81 are temporarily written at a predetermined address. The write address in the memory 82, and the control signal are outputted from the data synthesis circuit 81.

Next, the operation of forming the C4 code will be described. With respect to the data held in the memory 82, the normal playback ECC circuit 83 operates in the following manner. When the storage of data for 10 tracks in the memory 82 is completed, the normal playback ECC circuit 83 outputs to the memory 82, a read address and a control signal for reading data which are used for forming the C4 code. In the memory 82, data are read out on the basis of the inputted control signal. It is assumed that read out data are previously subjected to interleave of a depth of 10 tracks. In other words, it is assumed that the read address outputted from the normal playback ECC circuit 83 is previously subjected to interleave of a depth of 10 tracks. The normal playback ECC circuit 83 forms the C4 code on the basis of the data read out from the memory 82. The C4 code formed in the normal playback ECC circuit 83 is stored in the C4 code storage area which is previously disposed in the memory 82. When the formation of C4 codes for 10 tracks is completed, the data stored in the memory 82 are outputted to the ECC circuit 85.

The operation of reading data from the memory 82 is conducted on the basis of the read address and the control signal which are outputted from the ECC circuit 85. In the ECC circuit 85, on the basis of a mode signal and the track identification signal which are outputted from the ECC control circuit 84, data stored in the memory 82 are read out in the sequence of sync blocks of FIG. 22A or 23A. In this case, also the selection of the C4 code and the C5 code is conducted in accordance with the externally inputted command signal inputted to the ECC control circuit 84. Specifically, when the trick playback ECC mode is set, the C5 code is read out from the memory 82 at a predetermined timing, and, when the normal playback ECC mode is set, the C4 code is read out from the memory 82 at a predetermined timing.

The ECC circuit 85 appends an error correcting code according to the SD standard shown in FIG. 10 to the data outputted from the memory 82. Specifically, the C2 check code is first formed in the unit of a track and appended to the data to be recorded in the video area. The C1 check code is formed in the unit of a sync block and appended to the data to which the C2 check code is appended. Also with respect to the audio area, the C3 check code and the C1 code are appended. In Embodiment 1, the audio data area is not filled in order to comply with a future expansion, and dummy data of a fixed value are recorded therein. The data to which an error correcting code according to the SD standard is appended are read out in the unit of a track at a predetermined timing from the ECC circuit 85. During the reading, a track format according to the SD standard is formed. The data in which the track format is formed as described above are outputted to the digital modulator 86.

The digital modulator 86 first appends an ID signal to the top of each sync block. In this case, with respect to the sync blocks to be recorded in the error correcting code record area, flag information for identifying the kind of an error correcting check code are appended to the ID signal. In playback, the kind of an error correcting code is identified on the basis of the flag in the ID signal, and each data is subjected to error correction. The data to which the ID signal is appended are subjected to digital modulation, amplified by the record amplifier 87, and recorded onto the magnetic tape 90 through the rotary heads 89a and 89b.

Figure 27:
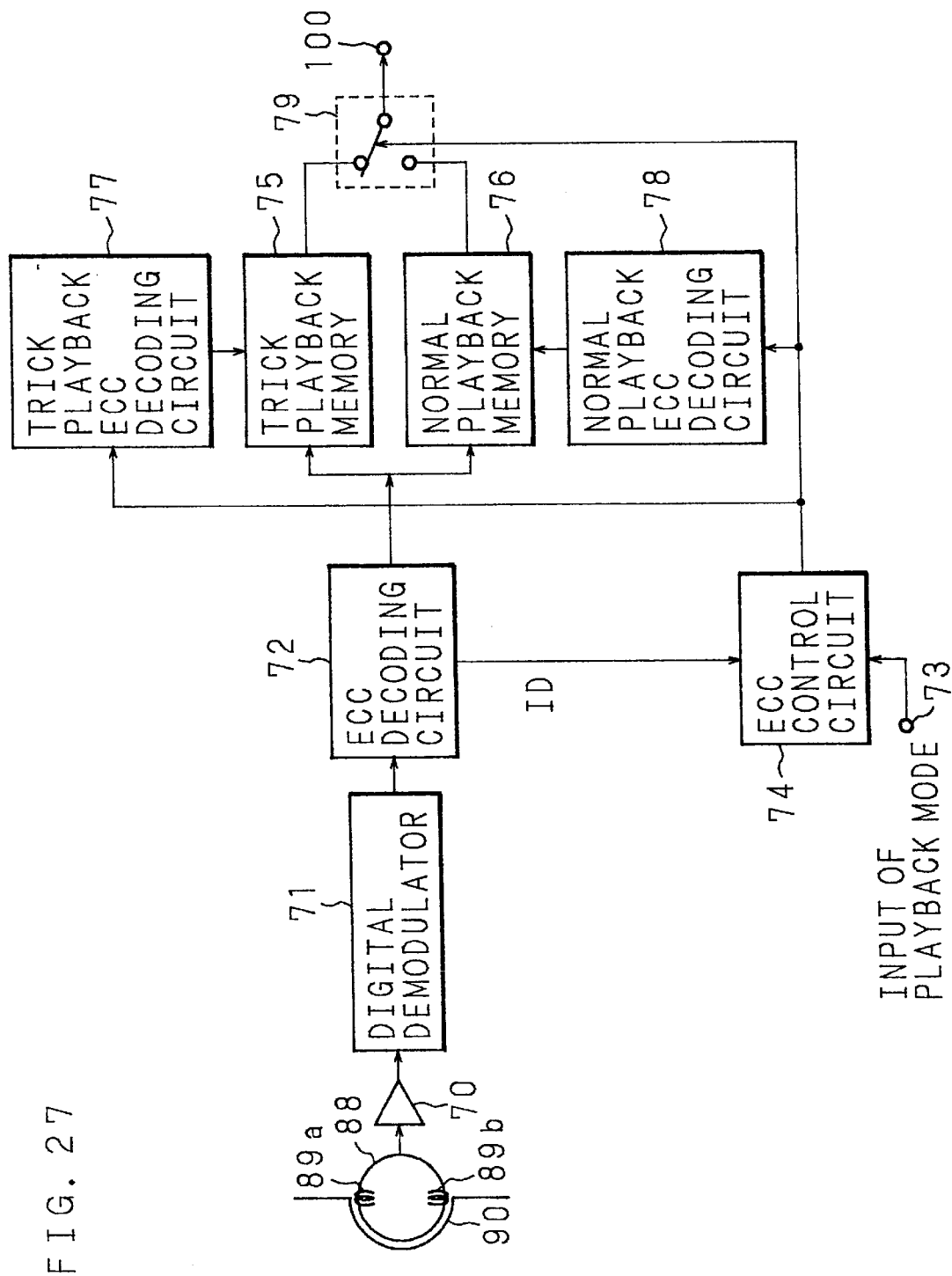
FIG. 27 is a block diagram showing the configuration of a playback system of the digital VTR of the invention.

Next, the configuration of the playback system of the digital VTR having the above-mentioned record format will be described. FIG. 27 is a block diagram showing the configuration of the playback system of the digital VTR which is an embodiment of the invention. The components designated by the same reference numerals as those of FIG. 12 are identical in structure and operation with those designated by the numerals in FIG. 12, and hence their description is omitted. In FIG. 27, 70 designates a playback amplifier, 71 designates a digital demodulator, 72 designates an ECC decoding circuit which applies the C1 error correcting check code and the C2 error correcting check code to playback data, to correct and detect an error in a playback signal, 73 designates an input terminal for a mode signal (normal playback or special playback) indicative of the current playback state, and 74 designates an ECC control circuit which, in accordance with an ID signal outputted from the ECC decoding circuit 72 and a playback mode signal via the input terminal 73, switches over error correcting decoding processes of trick playback and normal playback. The reference numeral 75 designates a trick playback memory which detects a trick playback signal from data outputted from the ECC decoding circuit 72 and stores the signal, and 76 designates a normal playback memory which stores data outputted from the ECC decoding circuit 72 and stored in a video area.

The reference numeral 77 designates a trick playback ECC decoding circuit which conducts error correcting decoding using the C5 code on the data stored in the trick playback memory 75 on the basis of a control signal (the judgment result of ID information detected by the ECC decoding circuit 72, the playback mode signal, etc.) outputted from the ECC control circuit 74, and 78 designates a normal playback ECC decoding circuit which conducts normal playback ECC decoding on the data stored in the normal playback memory 76 in the normal playback mode on the basis of the control signal (the judgment result of ID information detected by the ECC decoding circuit 72, the playback mode signal, etc.) outputted from the ECC control circuit 74. The reference numeral 79 designates a switch which selects the outputs on the basis of the control signal of the ECC control circuit 74, so that, when the trick playback mode is set, data in the trick playback memory 75 are outputted and, when the normal playback mode is set, data in the normal playback memory 76 are outputted. The reference numeral 100 designates an output terminal.

Figure 28:
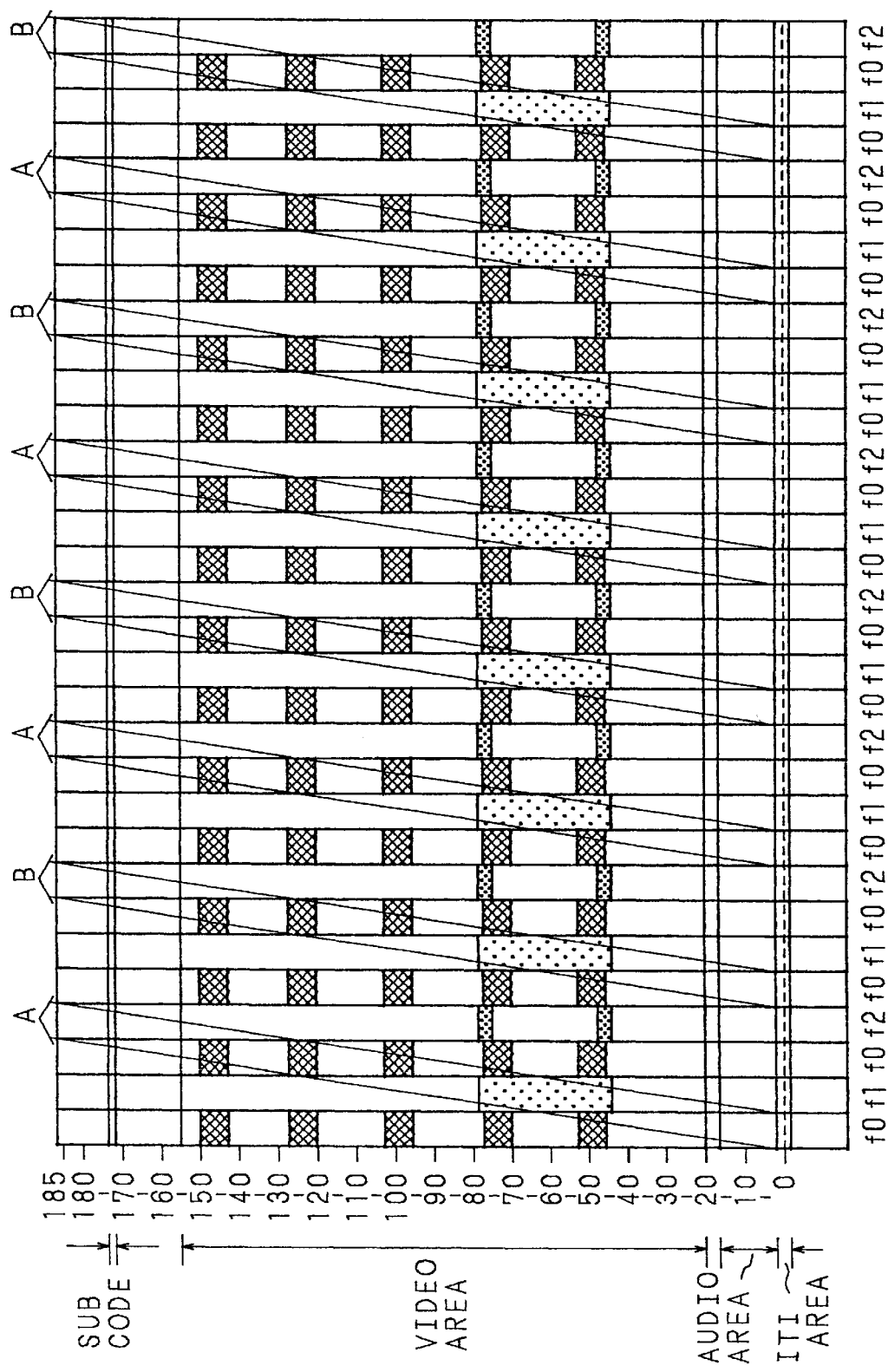
FIG. 28 is a diagram showing relationships between the scan paths of rotary heads and a track pattern in the case where a magnetic tape having the record format shown in FIG. 20 according to the invention is subjected to 4-times speed playback in the drum structure of 1Ch×2.

Hereinafter, prior to the description of the operation of the playback system, the operation of the digital VTR of Embodiment 1 in 4-times speed playback and 16-times speed playback will be described with reference to FIGS. 28 to 31. FIG. 28 is a diagram showing relationships between the scan paths of the rotary heads 89a and 89b and a track pattern in the case where a magnetic tape having the record format shown in FIG. 20 which is an embodiment of the invention is subjected to 4-times speed playback in the drum structure of 1Ch×2. In FIG. 28, the scan paths indicated by A show those of the rotary head 89a for A channel, and similarly the scan paths indicated by B show those of the rotary head 89b for B channel. The arrows indicate head scans in the case of 4-times speed playback. As described above, 4-times speed trick playback data are recorded in tracks of B channel, and subjected to the 2-unit repetitive recording (the same data are recorded in 2 record areas). As shown in FIG. 28, therefore, one of the 2 units is scanned by the rotary head 89a for A channel, and the other unit by the rotary head 89b for B channel, and hence 4-times speed trick playback data recorded by the rotary head 89b for B channel can be played back. At this time, the rotary head 89b scans also the subcode area to obtain a signal in the subcode area. Furthermore, tracking also may be conducted in the ITI area.

Figure 29:
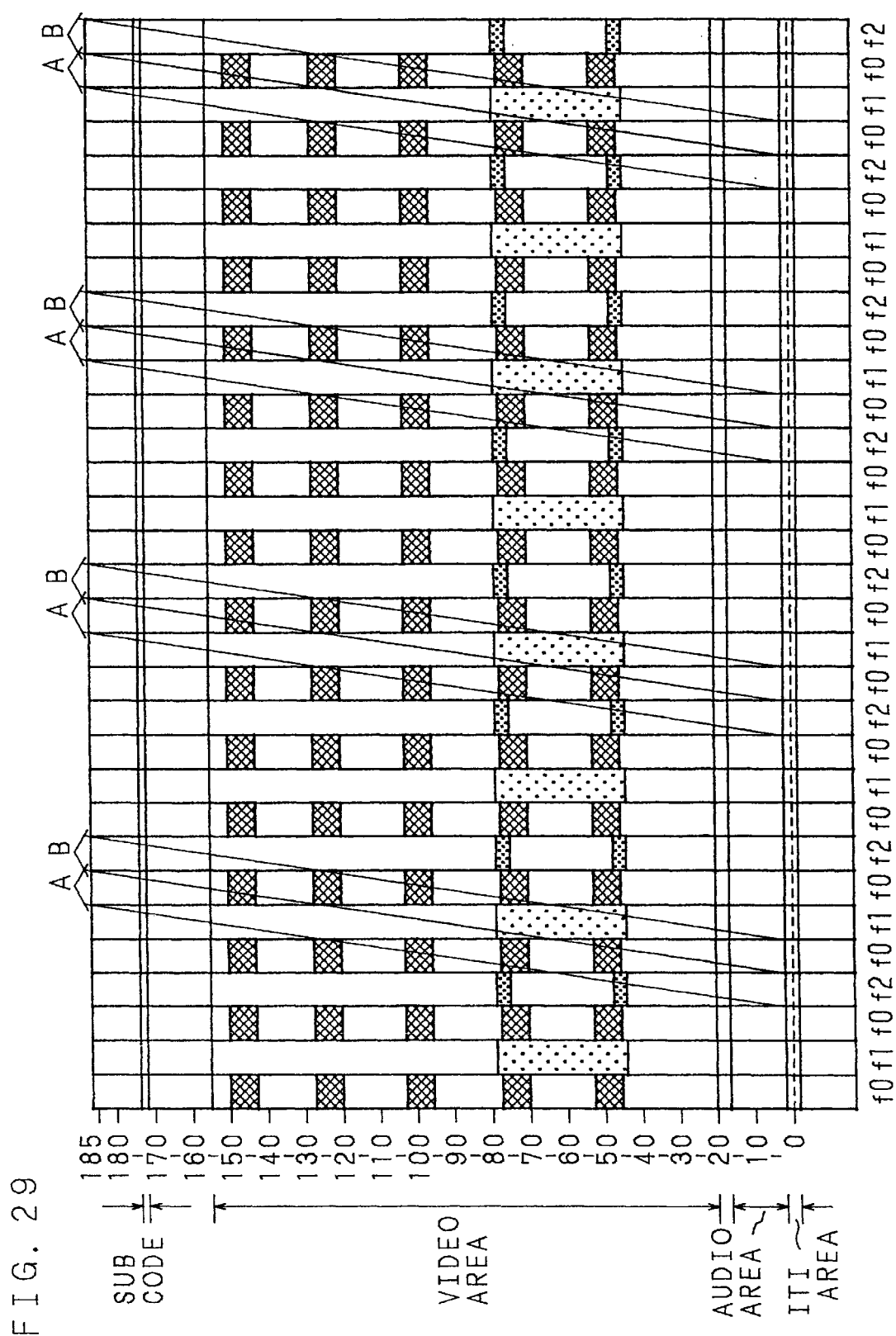
FIG. 29 is a diagram showing relationships between the scan paths of rotary heads and a track pattern in the case where a magnetic tape having the record format shown in FIG. 20 according to the invention is subjected to 4-times speed playback in the drum structure of 2Ch×1.

Similarly, FIG. 29 is a diagram showing relationships between the scan paths of the rotary heads 89a and 89b and a track pattern in the case where a magnetic tape having the record format shown in FIG. 20 which is an embodiment of the invention is subjected to 4-times speed playback in the drum structure of 2Ch×1. In FIG. 29, the scan paths indicated by A show those of the rotary head 89a for A channel, and similarly the scan paths indicated by B show those of the rotary head 89b for B channel. The arrows indicate head scans in the case of 4-times speed playback. In the same manner as the case of 1Ch×2, 4-times speed trick playback data are recorded in B channel, and subjected to the 2-unit repetitive recording. Consequently, the 2Ch heads always scan one of the 2 units. Therefore, 4-times speed trick playback data recorded by the rotary head 89b for B channel can be played back.

Figure 30:
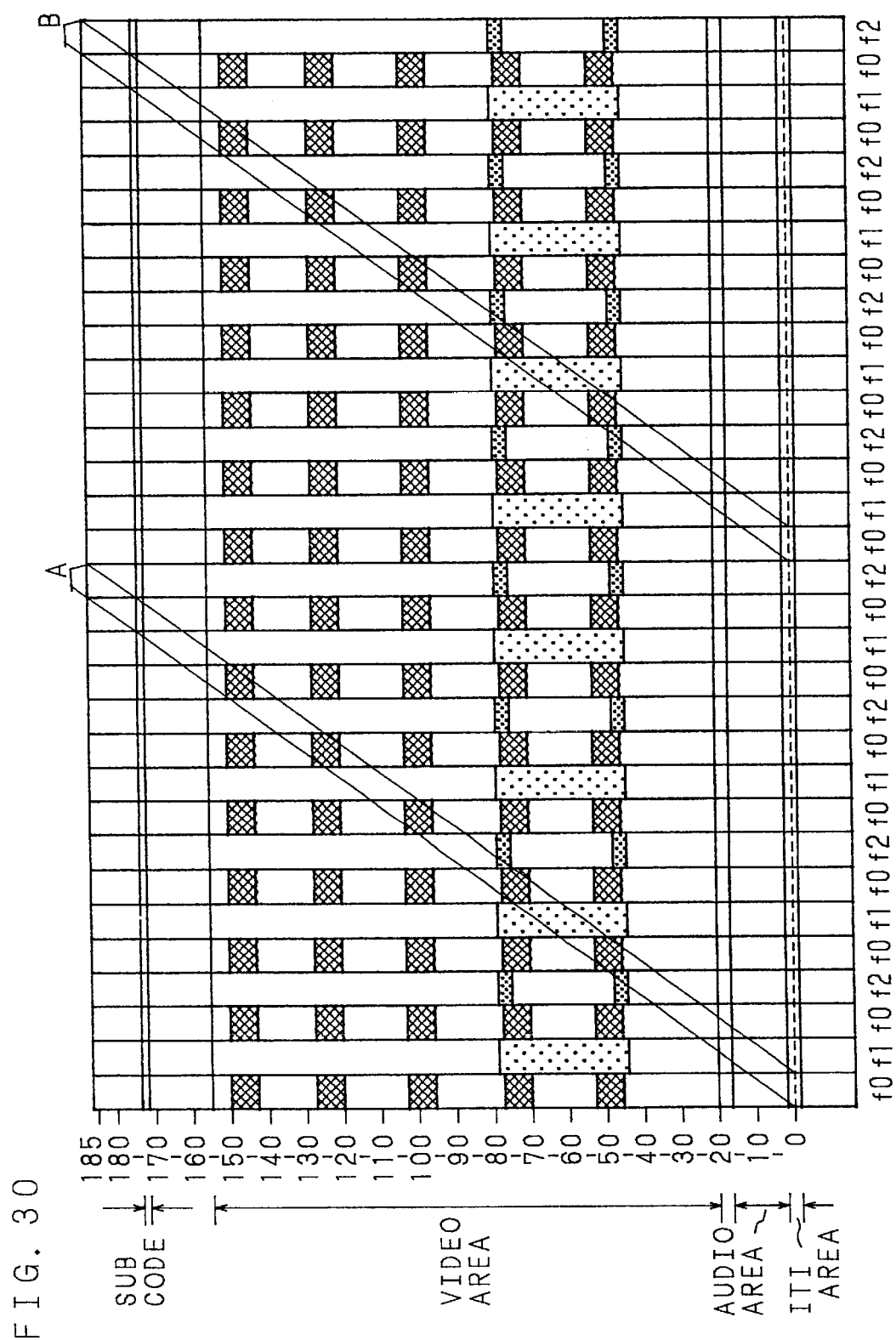
FIG. 30 is a diagram showing relationships between the scan paths of rotary heads and a track pattern in the case where a magnetic tape having the record format shown in FIG. 20 according to the invention is subjected to 16-times speed playback in the drum structure of 1Ch×2.

FIG. 30 is a diagram showing relationships between the scan paths of the rotary heads 89a and 89b and a track pattern in the case where a magnetic tape having the record format shown in FIG. 20 which is an embodiment of the invention is subjected to 16-times speed playback in the drum structure of 1Ch×2. In FIG. 30, the scan path indicated by A shows that of the rotary head 89a for A channel, and similarly the scan path indicated by B shows that of the rotary head 89b for B channel. The arrows indicate head scans in the case of 16-times speed playback. Since 16-times speed trick playback data are recorded in tracks for A channel by the 8-unit repetitive recording (the same data are recorded at 16 positions in total), 16-times speed trick playback data recorded by the rotary head 89a for A channel can be played back as described in the prior art paragraph. As shown in FIG. 30, 16-times speed trick playback data can surely be played back by the rotary head 89a for A channel. At this time, the rotary head 89a scans the subcode area to obtain a signal in the subcode area. Furthermore, tracking may be conducted in accordance with the pilot signals in the ITI area.

Figure 31:
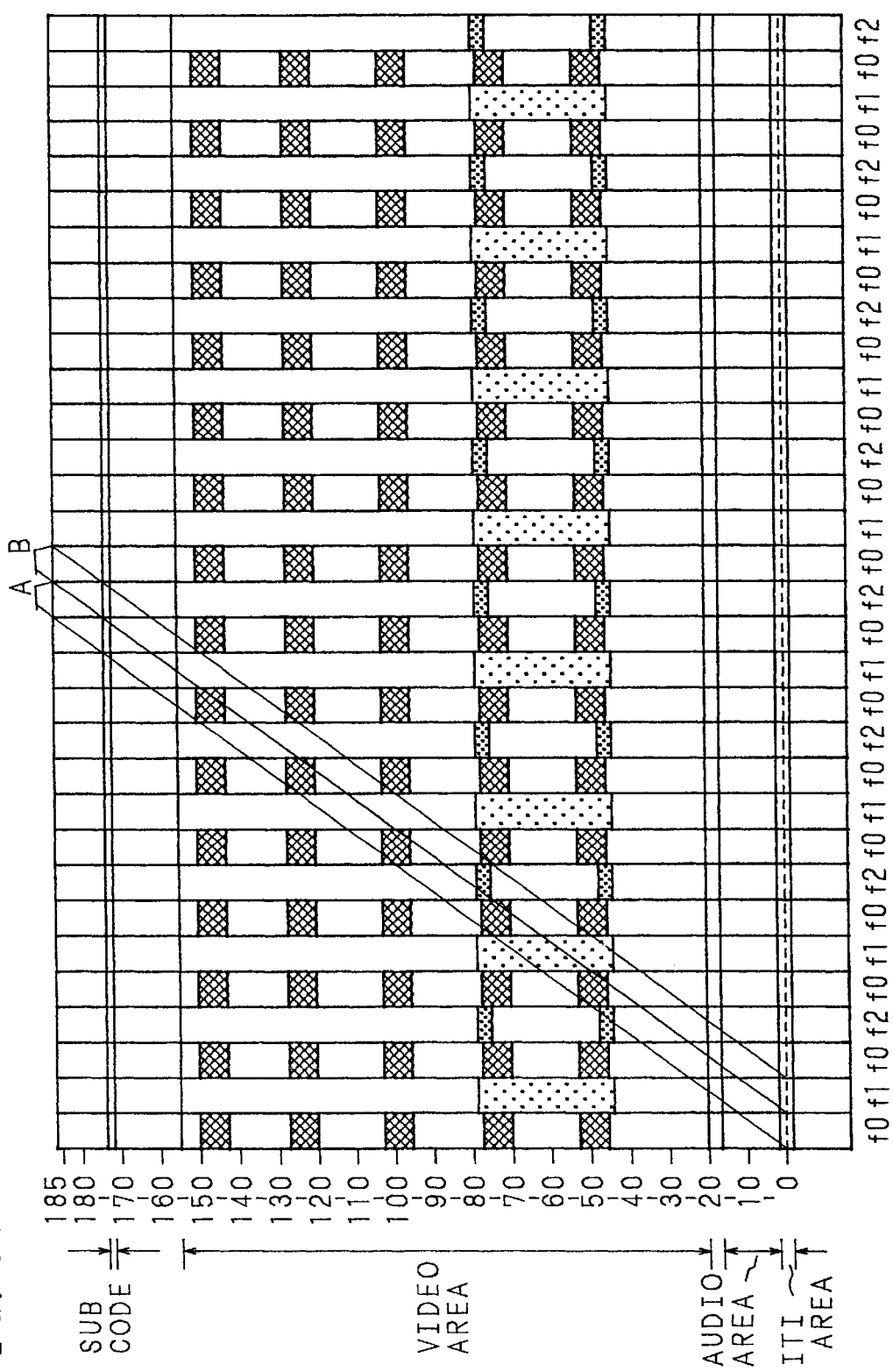
FIG. 31 is a diagram showing relationships between the scan paths of rotary heads and a track pattern in the case where a magnetic tape having the record format shown in FIG. 20 according to the invention is subjected to 16-times speed playback in the drum structure of 2Ch×1.

FIG. 31 is a diagram showing relationships between the scan paths of the rotary heads 89a and 89b and a track pattern in the case where a magnetic tape having the record format shown in FIG. 20 which is an embodiment of the invention is subjected to 16-times speed playback in the drum structure of 2Ch×1. In FIG. 31, the scan path indicated by A shows that of the rotary head 89a for A channel, and similarly the scan path indicated by B shows that of the rotary head 89b for B channel. The arrows indicate scans of the rotary heads 89a and 89b in the case of 16-times speed playback. In the same manner as the case of 1Ch×2, 16-times speed trick playback data are recorded by the 8-unit repetitive recording, 16-times speed trick playback data recorded by the rotary head 89a for A channel can be played back. At this time, the heads scan the subcode area to obtain a signal in the subcode area. Furthermore, tracking may be conducted in accordance with the pilot signals in the ITI area.

In 4-times speed playback or 16-times speed playback, the amount of data which can be played back from one track is 62 SB (4-times speed) or 12 SB (16-times speed) as shown in FIG. 16. Also in -2-times speed playback or -14-times speed playback, playback positions of data on a track are the same as those in 4-times speed playback or 16-times speed playback, and hence the playback can be realized by the record format shown in FIG. 20. In high-speed playback of each speed, therefore, in addition to trick playback data, also an error correcting code record area adjacently disposed can simultaneously be played back. Since the heads scan all the tracks in normal playback, it is possible to play back all data recorded on the tracks. Consequently, the error correcting code record area can be played back in both high-speed playback (4-times speed, 16-times speed, -2-times speed, and -14-times speed) and normal playback. As mentioned in the description of the recording operation, the same record area can commonly be used. In other words, whichever error correcting code is appended, it is possible to play back the error correcting check code in high-speed playback or normal playback.

In the description above, tracking in high-speed playback is conducted in the ITI area. The invention is not restricted to the above. In 16-times speed playback, for example, the tracking phase may be detected in one data area of the trick playback data record area and controlled. Alternatively, the tracking phase may be detected in plural trick playback data record areas and controlled. In 4-times speed playback, the tracking phase may be detected at a predetermined position of adjacent A track, and controlled. The tracking phase may coarsely be adjusted in the ITI area and finely adjusted in the trick playback area. This is effective particularly in the case where a track bent occurs in compatible playback or the like.

Next, the operation of the playback system in normal playback will be described. Data which are played back from the magnetic tape 90 through the rotary heads 89a and 89b on the drum 88 are amplified by the playback amplifier 70, and then inputted to the digital demodulator 71. The digital demodulator 71 detects data from the input playback data, converts the detected data into a playback digital signal, and then which have undergone digital demodulation in the digital demodulator 71 are inputted to the ECC decoding circuit 72. In the FCC decoding circuit 72, when the playback digital signal is inputted, the ID signal appended to the top of each sync block is separated, and the result is outputted to the ECC control circuit 74. With respect to the playback digital data from which the ID signal has been separated, correction and detection of an error which may be generated in playback are conducted by using the C1 check code and the C2 check code in the ECC decoding circuit 72. The playback digital data which have undergone error correction in the ECC decoding circuit 72 are outputted to the trick playback memory 75 and the normal playback memory 76. At this time, trick playback data played back from the trick playback data record area are stored in the trick playback memory 75, and all playback data outputted from the ECC decoding circuit 72 are stored in the normal playback memory 76. In Embodiment 1, error correcting decoding in accordance with the C5 code in the trick playback ECC decoding circuit 77 is not conducted in normal playback. In other words, trick playback data are subjected only to the writing into the trick playback memory 75, and not to the error correcting decoding operation, etc.

On the other hands the ID signal detected in the ECC decoding circuit 72 is inputted to the ECC control circuit 74. The ECC control circuit 74 detects the separated ID signal from sync block data stored in the error correcting code record area, and identifies the kind of the error correcting code by using appended flag data. In normal playback, the circuit conducts also detection of the number of the track which is currently subjected to playback. The current playback mode is detected on the basis of the playback mode signal inputted through the input terminal 73. The identification result of the error correcting code, the track number, and playback mode information are outputted to the trick playback ECC decoding circuit 77 and the normal playback ECC decoding circuit 78, and the playback mode signal is supplied to the switch 79.

If the error correcting code recorded in the error correcting check code record area is a normal playback error detecting code, the normal playback ECC decoding circuit 78 configures error correcting blocks in the unit of 10 tracks shown in FIG. 21 in the normal playback memory 76 by using track number information outputted from the ECC control circuit 74, and applies an error correcting code due to the C4 code. The interleave of 10 tracks in the decoding is conducted in the process of controlling the reading of playback data from the normal playback memory 76. The data which have undergone the C4 decoding are supplied through the switch 79 to the output terminal 100. By contrast, if the error correcting code recorded in the error correcting check code record area is a trick playback error check code, the playback digital data are read out as they are from the normal playback memory 76 without conducting any other process and then outputted to the switch 79. The switch 79 is controlled so as to select the normal playback memory 76 in normal playback.

Next, the operation of the playback system in trick playback will be described. Data which are intermittently played back from the magnetic tape 90 through the rotary heads 89a and 89b on the drum 88 are amplified by the playback amplifier 70, and then inputted to the digital demodulator 71. The digital demodulator 71 detects data from the inputted playback data, converts the detected data into a playback digital signal, and then conducts digital demodulation on the signal. The playback digital data which have undergone digital demodulation in the digital demodulator 71 are inputted to the ECC decoding circuit 72. In the ECC decoding circuit 72, when the playback digital signal is inputted, the ID signal appended to the top of each sync block is separated, and the result is outputted to the ECC control circuit 74. With respect to the playback digital data from which the ID signal has been separated, correction and detection of an error which may be generated in playback are conducted by using the C1 check code in the ECC decoding circuit 72. In trick playback, since data are intermittently played back as described also in the prior art example, it is impossible to configure an error correcting block such as shown in FIG. 10 or 21. Consequently, error correction due to the C2 code, and that due to the C4 code are not conducted.

The playback digital data which have undergone error correction in the ECC decoding circuit 72 are outputted to the trick playback memory 75 and the normal playback memory 76. At this time, trick playback data played back from the trick playback data record area are stored in the trick playback memory 75. Because of the above-mentioned reason, playback data are not written into the normal playback memory 76.

In the same manner as normal playback, the ID signal detected in the ECC decoding circuit 72 is inputted to the ECC control circuit 74. The ECC control circuit 74 detects the separated ID signal from sync block recorded in the error correcting code record area, identifies the kind of the error correcting code appended to the ID signal, and detects the track number which is currently subjected to playback. The current playback mode is detected on the basis of the playback mode signal inputted through the input terminal 73. The identification result of the error correcting code, the track number, and playback mode information are outputted to the trick playback ECC decoding circuit 77 and the normal playback ECC decoding circuit 78, and the playback mode signal is supplied to the switch 79. If the error correcting code stored in the error correcting code record area is a normal playback error detecting code, the playback digital data are read out as they are from the trick playback memory 75 without conducting any other process. By contrast, if the error correcting code stored in the error correcting code record area is a trick playback error detecting code, error correcting blocks shown in FIG. 26 are configured and error correction due to the C5 code is conducted on the trick playback data stored in the trick playback memory 75. The output of the trick playback memory 75 is supplied to the switch 79. The switch 79 is controlled so as to select the trick playback memory 75 in trick playback.

The digital VTR shown in Embodiment 1 which is configured as described above records an error correcting code record area disposed in a record track, at a position which can be read out both in normal playback and trick playback. Consequently, the error correcting code record area can commonly be used. The error correcting code to be formed is switched over in accordance with the usage. Therefore, it is possible to effectively use a restricted area for recording appended information. When the digital VTR is used in future as an external apparatus for recording data used in a computer system or the like, it is possible to append a strong error correcting code with the same record format.

The error correcting code to be formed is switched over in accordance with the usage. When importance is placed on the picture quality of a trick playback image, therefore, the error correcting ability in trick playback can be improved by recording the C5 check code in the error correcting check code record area, and, when importance is placed on the picture quality of a normal playback image, the error correcting ability for normal playback data can be improved by recording the C4 check code in the area, whereby a restricted area on the magnetic tape can effectively be used. When the digital VTR is used in future as an external storage device in a computer system or the like, it is possible to append a strong error correcting code with the same record format, so that the digital VTR can be used together with an external storage apparatus. Since a record area on the magnetic tape can efficiently be used as described above, the data amount which can be allocated to trick playback data can be increased so that the picture quality of a trick playback image is improved.

In Embodiment 1, the system in which the record format shown in FIG. 19 is used has been described. The record format is not restricted to this format. For example, the same effects can be attained in a system in which the error correcting check code record area is disposed so as to be adjacent to the trick playback data record area in a digital signal record/playback apparatus (a digital VTR, a digital disk player, or the like) having a record format wherein trick playback data are separated from input data and then recorded in a predetermined area on a record medium.

Furthermore, the depth of interleave in normal playback is not restricted to 10 tracks. In the PAL zone (the frame frequency is 25 Hz) that is mainly in Europe, for example, the depth may be 12 tracks so that interleave different in depth from that in the NTSC zone is realized. Also in the NTSC zone, the depth may be 12 tracks or 15 tracks. It is a matter of course that the depth of interleave is equal in the NTSC zone and the PAL zone, and that the method of interleave is not restricted to that shown in FIGS. 21 to 24. For example, interleave may be conducted in tracks in a vertical direction in place of an obolique direction.

It is a matter of course that the same effects can be attained even when a signal other than the ATV signal is used as record data, and, for example, the DVB signal used in Europe in which a video signal is compressed on the basis of MPEG2, or a signal which is compressed by MPEG1 may be used. The playback speed in high-speed playback is not restricted to 4-times speed and 16-times speed. The same effects can be attained as far as the trick playback data record area is disposed in accordance with a playback speed required in a digital signal record/playback apparatus, and the error correcting check code record area is disposed so as to be adjacent to the trick playback data record area.

In Embodiment 1, the error correcting check code record area is disposed so as to be adjacent to the trick playback data record area. The invention is not restricted to this. In high-speed playback, a dedicated area for recording the error correcting check code may be disposed on the scan paths of the rotary heads 89a and 89b, with attaining the same effects. Specifically, in FIG. 19, for example, 16-times speed playback data are arranged in the record areas 51a to 51d on the first and third tracks 60 and 62, and an error correcting check code (error correcting check code for trick playback or normal playback) is disposed in the record area 51e. In this case, the record area 51e for recording an error correcting check code has a size of, for example, 9 sync blocks. The record area for an error correcting check code recorded in the second and fourth tracks 61 and 63 may be 6 sync blocks.

The minimum distance of an error correcting check code may be determined depending on the size of the append area.

Embodiment 2

The arrangement of the 4-times speed data area, the 16-times speed data area, and the ECC data area, and the number of the areas are not restricted to those described above. The track period is not restricted to a 4-track period. In Embodiment 1, 4-times speed or 16-times speed is selected as an embodiment of the high-speed playback speed. The invention is not restricted to this. Even in the case where another speed is employed, the same effects can be attained as far as the trick playback data record area and the error correcting code record area are disposed on the scan paths of the rotary heads 89a and 89b, and the error correcting code to be recorded in the areas is switched over in accordance with the usage.

In Embodiment 1, the error correcting code to be stored in the error correcting code record area is switched over in accordance with a command inputted from the user. The invention is not restricted to this. In order to suppress the cost, for example, even a digital VTR having only error correcting encoder and decoder for only one of the codes (a digital VTR in which only an error correcting code to be appended to trick playback data is recorded in and played back from the error correcting code record area, or a digital VTR in which only an error correcting code for normal playback is recorded in and played back from the area) may be used. Also in this case, magnetic tapes on which recording is conducted by using such digital VTRs are compatible, and the same effects can be attained.

When a flag for identifying the signal is recorded in, for example, the ID signal, even a low-cost digital VTR, or that which is not provided with an encoder and a decoder for an error correcting check code to be appended into the error correcting check code record area is compatible with the above-mentioned digital VTRs, and it is not required to newly determine a record format for a low-cost system. Furthermore, also when the digital VTR is used n future as an external storage device in a computer system or the like, it is possible to attain the compatibility.

In the case where compatible playback is to be conducted by using the three above-described kinds of digital VTRs, it is a matter of course that the compatibility can be attained as described above by configuring the VTRs so that, when the error correcting decoder for decoding an error correcting check code recorded in the error correcting check code record area is not disposed, playback data are outputted without conducting error correcting decoding using the error correcting check code.

Embodiment 3

In Embodiment 1, the signal for identifying the error correcting check code is appended to the ID signal. The invention is not restricted to this. In Embodiment 1 described above, the subcode area is played back in high-speed playback. Consequently, the subcode area can be played back in trick Playback in the record format used in Embodiment 1. When an identification signal for the 3 signals (a signal indicative that the questioned signal is other than the trick playback error correcting check code, the high-speed playback error correcting check code, and the error correcting check code (for example, a signal of a predetermined fixed pattern)) is recorded in the subcode area, scale is little enlarged. The identification may be appended to both the ID signal and the subcode signal. It is a matter course that, in the case where a standard in which an error correcting code is always appended is employed, the identification flag is required only for switching over 2 signals.

Embodiment 4

When the minimum distance of the C4 check code is made equal to that of the C5 check code as described in Embodiment 1, an encoder and a decoder for an error correcting check code can be realized by adding a small number of circuits, whereby the circuit scale can be reduced. Specifically, it is required to add only 3 circuits, a count value set circuit which counts the code length of a syndrome forming circuit in decoding, a selector circuit for setting initial values of registers in a chaining search circuit, and a count value set circuit which counts the number of chaining searches. When considering the shared use of the encoder and the decoder, the encoder can be coped with only by the addition of the circuits.

Embodiment 5

With respect to the error correcting check code record area, when there is a track in which trick playback data are not recorded (the fourth track 63 shown in FIG. 19), a record area for an error correcting check code is disposed at the same height as the error correcting check code record area disposed in tracks which are formed by rotary heads having the same azimuth angles and in which trick playback data are recorded (the second track 61 shown in FIG. 19). This allows the burst error correcting ability to be made substantially uniform among tracks having the same azimuth angles, and the control of the process of interleave in the formation of the C4 code to be made very simple, whereby the circuit scale can be reduced. It is a matter of course that, although the circuit scale is slightly increased, tracks having no trick playback area may be disposed in an area which is different (i.e., at a different height) from the error correcting code record area disposed in tracks having the trick playback data record area and recorded with the same azimuth angles.

Embodiment 6

Figure 32:
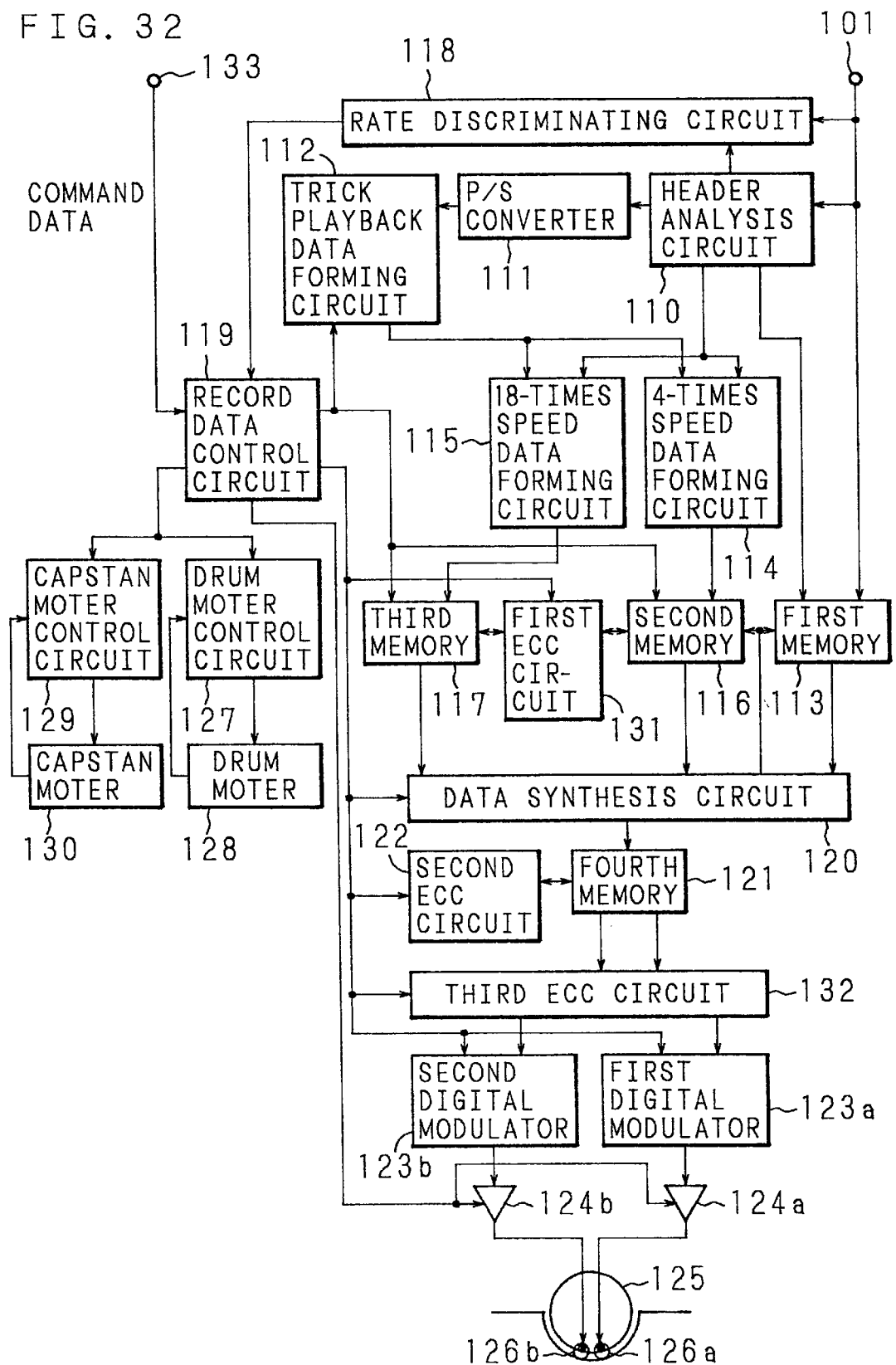
FIG. 32 is a block diagram of a record system of the digital VTR of the invention.

FIG. 32 is a block diagram of a record system of a digital VTR which is Embodiment 6 of the invention. In the figure, 101 designates an input terminal for a transport packet. The reference numeral 110 designates a header analysis circuit which detects a transport header in a transport packet, detects headers such as a sequence header, and a picture header contained in a bitstream, and separates intra-coding data, 111 designates a parallel/serial converter (hereinafter, referred to as "P/S converter") which conducts parallel/serial conversion on the inputted transport packet to convert it into data of 1-bit bitstream, and 112 designates a trick playback data forming circuit which separates bitstream data of an intra-image on the basis of the header information detected by the header analysis circuit 110, and forms trick playback data for various high-speed playback speeds (4-times and 18-times speeds in a 25-Mbps record mode of Embodiment 6, 4-times and 18-times speeds in a 12.5-Mbps record mode, and 8-times and 36-times speeds in a 6.25-Mbps record mode).

The reference numeral 113 designates a first memory which temporarily stores a transport packet inputted through the input terminal 101, and, when the data are to be outputted, converts the data into the sync block format shown in FIG. 15B, 114 designates a 4-times speed data forming circuit which forms a trick playback transport packet for 4-times speed by using 4-times speed playback data outputted from the trick playback data forming circuit 112, and 115 designates an 18-times speed data forming circuit which forms a trick playback transport packet for 18-times speed by using 18-times speed playback data outputted from the trick playback data forming circuit 112. In Embodiment 6, there are 3 kinds of record modes as described later, and the high-speed playback speeds supported by the record modes are different from each other. For the sake of convenience, hereinafter, data for the lower high-speed playback speed are referred to as "4-times speed playback data", and data for the higher high-speed playback speed are referred to as "18-times speed playback data".

The reference numeral 116 designates a second memory which temporarily stores 4-times speed playback data inputted in the form of a transport packet, and, when the data are to be outputted, converts the data into the sync block format (see FIG. 15), and 117 designates a third memory which temporarily stores 18-times speed playback data inputted in the form of a transport packet, and, when the data are to be outputted, converts the data into the sync block format (see FIG. 15). The reference numeral 131 designates a first ECC circuit which, when trick playback error correcting encoding is conducted in accordance with an externally inputted command information signal, appends the C5 check code for trick playback to data of the second and third memories 116 and 117, 118 designates a rate discriminating circuit which detects the transmission rate of an inputted transport packet, and 119 designates a record data control circuit which sets the record mode of the digital VTR on the basis of the record data rate outputted from the rate discriminating circuit 118, outputs various control signals based on the set result, and controls the first ECC circuit 131, a second ECC circuit 122, and a third ECC circuit 132 in accordance with external command information. The reference numeral 133 designates an input terminal through which external command information is inputted.

The reference numeral 120 designates a data synthesis circuit which rearranges the input transport packet outputted from the first memory 113, and trick playback data outputted from the second and third memories 116 and 117, into a predetermined sequence of sync blocks. These data are converted into the sync block format shown in FIG. 15B in the first, second, and third memories 113, 116, and 117, and then inputted to the data synthesis circuit. The reference numeral 121 designates a fourth memory, and 122 designates the second ECC circuit which, when error correcting coding for normal playback is to be conducted, appends the C4 check code for normal playback having interleave of a depth of 10 tracks, to the data recorded in the fourth memory 121 in accordance with an externally inputted command information signal. The reference numeral 132 designates the third ECC circuit which appends error correcting check codes in horizontal direction (C1 check code) and vertical direction (C2 check code) defined in the SD standard, to the data in the fourth memory 121 to which the C4 check code has been appended. The reference numerals 123a and 123b designate first and second digital modulators which conduct digital modulation on the record data which are outputted from the fourth memory 121 and to which an error correcting check code has been appended. The ID information and sync information are appended to data of sync blocks at the timings when the data are inputted to the first and second digital modulators 123a and 123b. The reference numerals 124a and 124b designate record amplifiers, 125 designates a rotary drum, 126a designates a rotary head for recording and playing back data of A track, and 126b designates a rotary head for recording and playing back data of B track. The reference numeral 128 designates a drum motor, 127 designates a drum motor control circuit which controls the drum motor 128, 130 designates a capstan motor, and 129 designates a capstan motor control circuit which controls the capstan motor 130.

Figure 33:
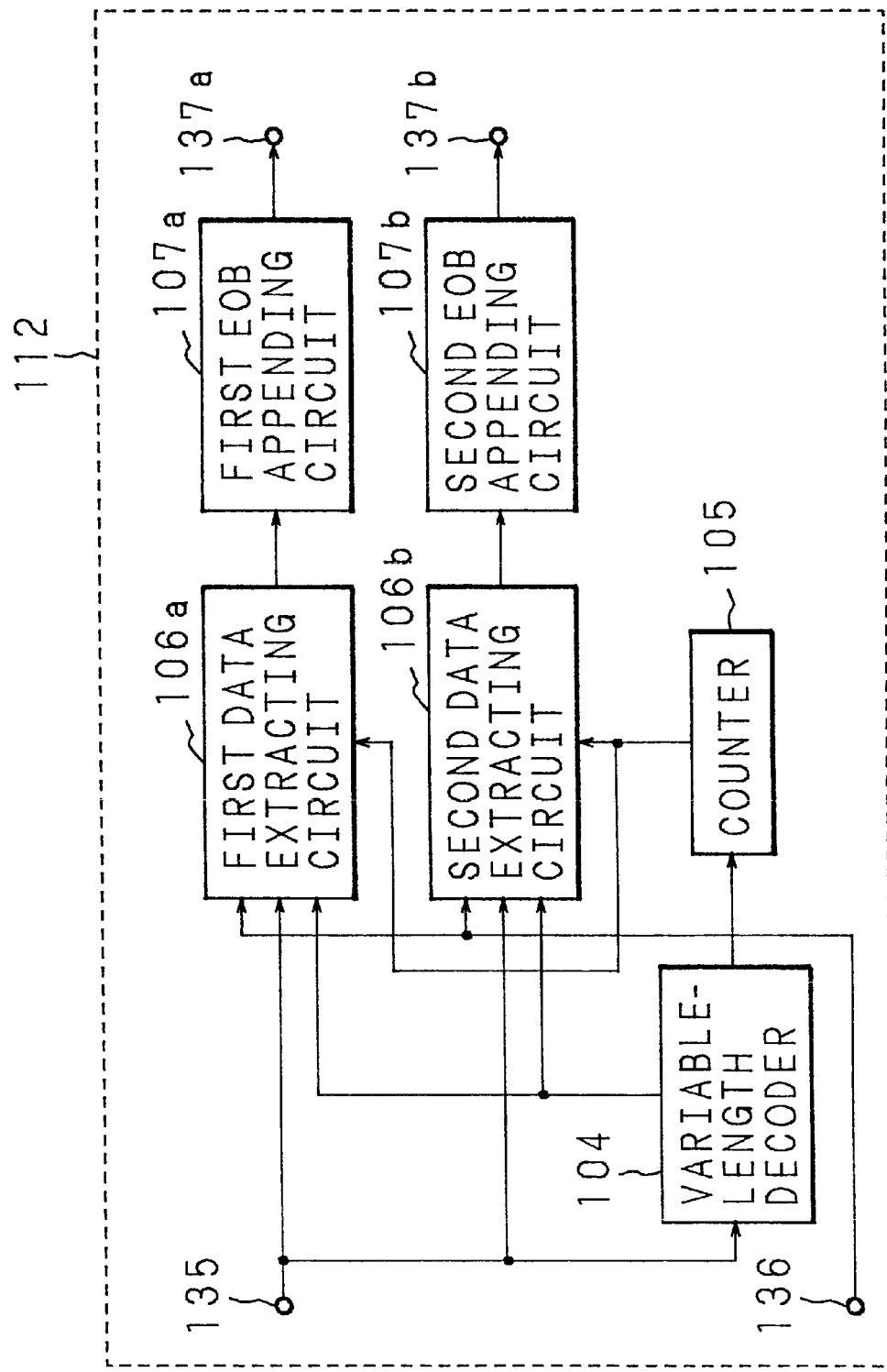
FIG. 33 is a block diagram showing an example of the configuration of a trick playback data forming circuit used in the invention.

FIG. 33 is a block diagram showing an example of the configuration of the trick playback data forming circuit 112 used in Embodiment 6. The reference numeral 135 designates an input terminal to which a bitstream of intra-frame or intra-field coding data (hereinafter, referred to as "intra-data") is inputted, 136 designates an input terminal for the control signal outputted from the record data control circuit 119, 137a designates an output terminal for 4-times speed playback data, and 137b designates an output terminal for 18-times speed playback data. The reference numeral 104 designates a variable-length decoder which conducts variable-length decoding on the inputted bitstream, 105 designates a counter, 106a designates a first data extracting circuit which extracts 4-times speed playback data from bitstreams of the inputted intra-data, 106b designates a second data extracting circuit which extracts 18-times speed playback data, 107a designates a first EOB appending circuit which appends an EOB code to the end of each DCT block of 4-times speed playback data, and 107b designates a second EOB appending circuit which appends an EOB code to the end of each DCT block of 18-times speed playback data.

Figure 34:
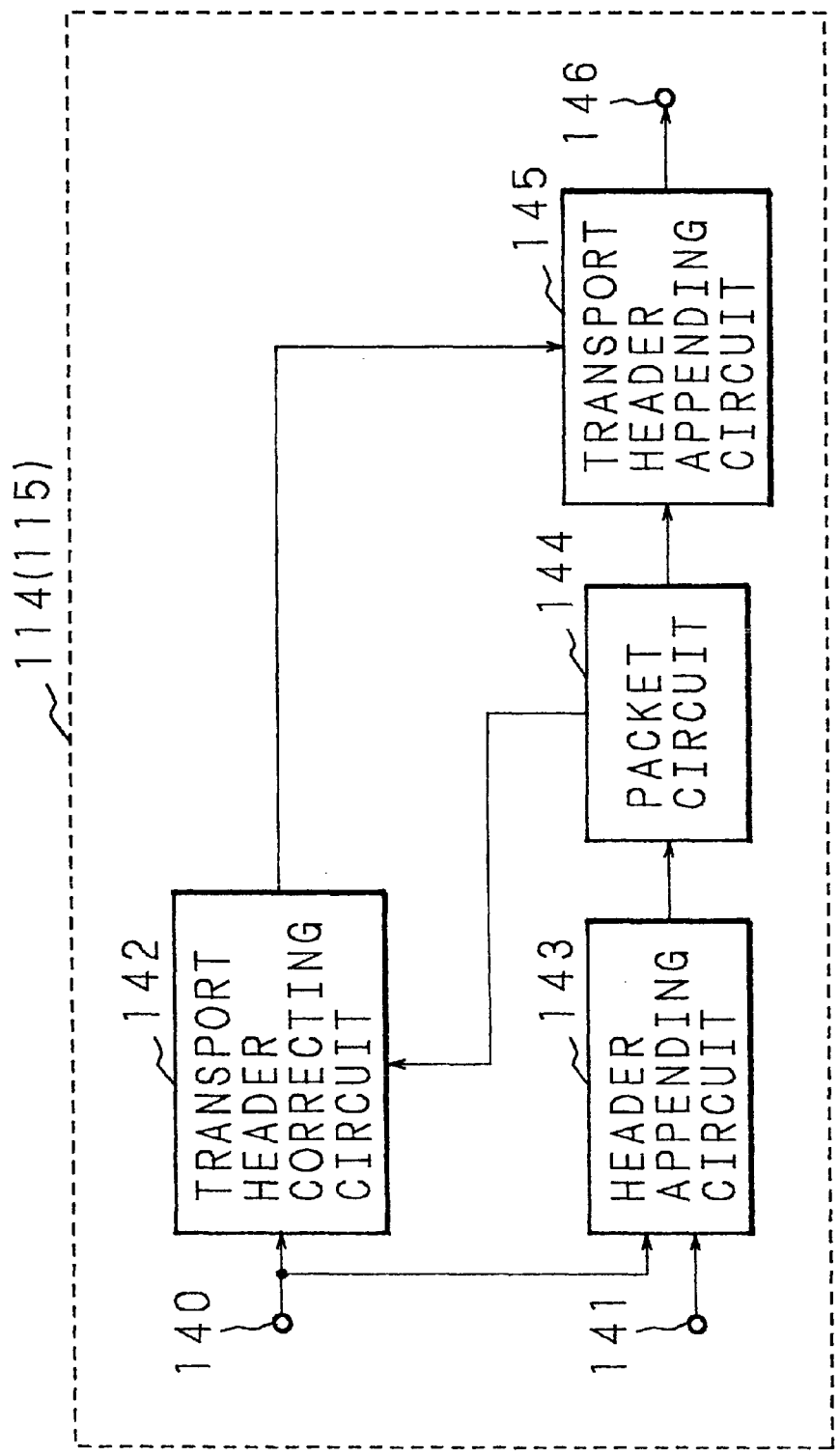
FIG. 34 is a block diagram showing an example of the configuration of a 4-times speed playback data forming circuit used in the invention.

FIG. 34 is a block diagram showing an example of the configuration of the 4-times speed playback data forming circuit 114 used in Embodiment 6. The 18-times speed data forming circuit 115 has the same configuration as that of the 4-times speed data forming circuit 11, and hence the detailed description of the 18-times speed data forming circuit 115 is omitted. In the figure, 140 designates an input terminal for header information outputted from the header analysis circuit 110 such as a transport header, and a picture header, and appended data such as a quantizing table, 141 designates an input terminal for 4-times speed playback data outputted from the trick playback data forming circuit 112, 142 designates a transport header correcting circuit which corrects a transport header inputted through the input terminal 140 and outputs the corrected header, 143 designates a header appending circuit which appends the header information detected by the header analysis circuit 110 such as the sequence header, and the picture header, and appended information (quantizing table data, etc.) necessary for decoding of 4-times speed playback data, to 4-times speed playback data outputted from the trick playback data forming circuit 112, 144 designates a packet circuit which conducts serial/parallel conversion on bitstream data outputted from the header appending circuit 143 to form data in which 1 byte consists of 8 bits, and collects data of 184 bytes to constitute the data portion of the transport packet, and 145 designates a transport header appending circuit which appends the transport header outputted from the transport header correcting circuit 142 to data of the transport header outputted from the packet circuit 144.

Figure 35:
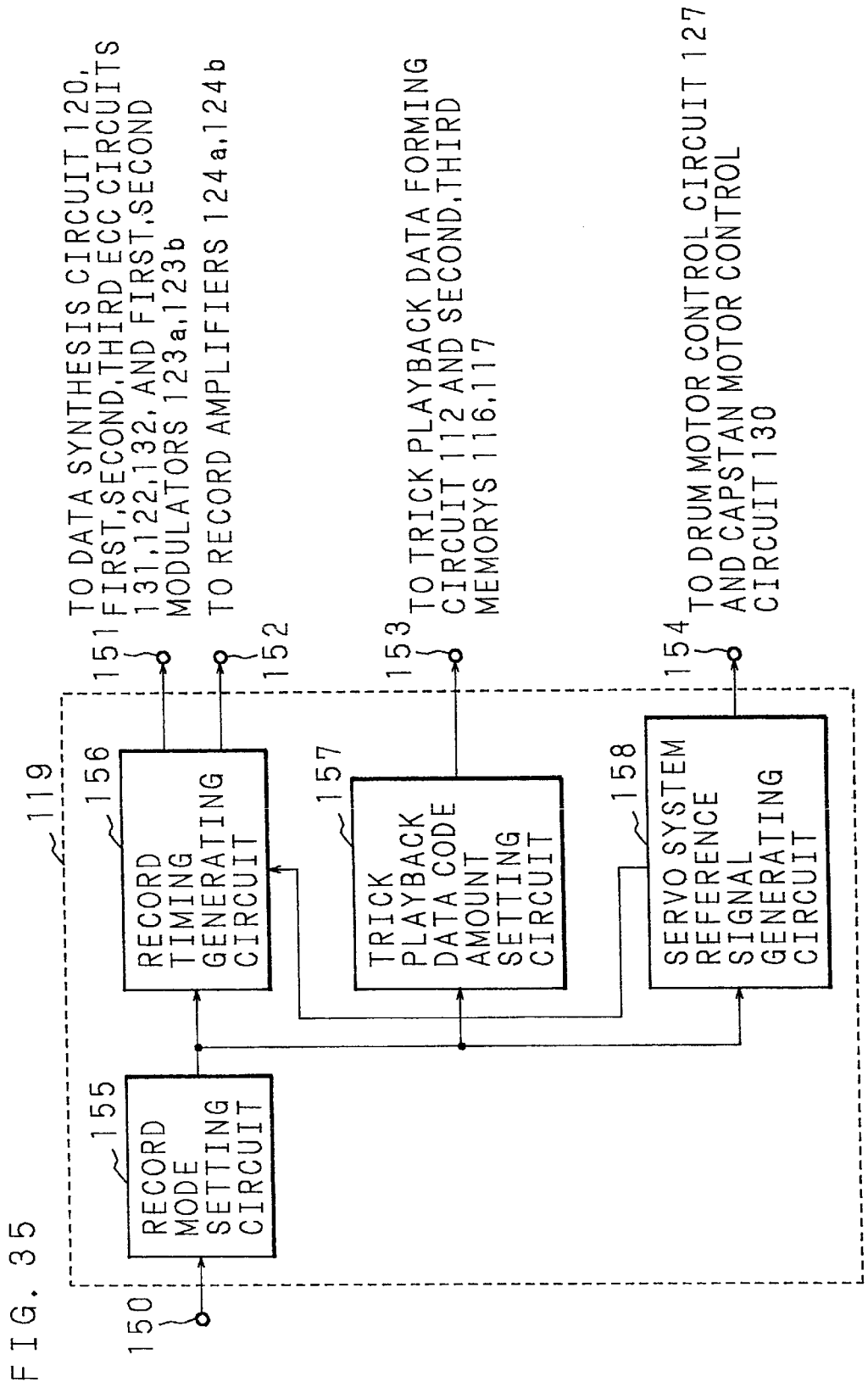
FIG. 35 is a block diagram showing an example of the configuration of a record data control circuit used in the invention.

FIG. 35 is a block diagram showing an example of the configuration of the record data control circuit 119used in Embodiment 6. In the figure, 150 designates an input terminal for the record data rate outputted from the rate discriminating circuit 118, 151, 152, 153, and 154 designate output terminals for the control signals, 155 designates a record mode setting circuit which sets the record mode of the digital VRon the basis of the record data rate information inputted through the input terminal 150, 156 designates a record timing generating circuit which, based on a record mode signal outputted from the record mode setting circuit 155, outputs control signals for forming record data such as a timing signal to the data synthesis circuit 120, the third error correcting code circuit 112, and the first and second digital modulators 122a and 123b, and outputs a record control signal for recording record data onto a magnetic tape, to the record amplifiers 124a and 124b, 157 designates a trick playback data code amount setting circuit which, based on the record mode signal outputted from the record mode setting circuit 155, outputs a code amount control signal for controlling the code amount of various trick playback data, and 158 designates a servo system reference signal generating circuit.

Figure 36:
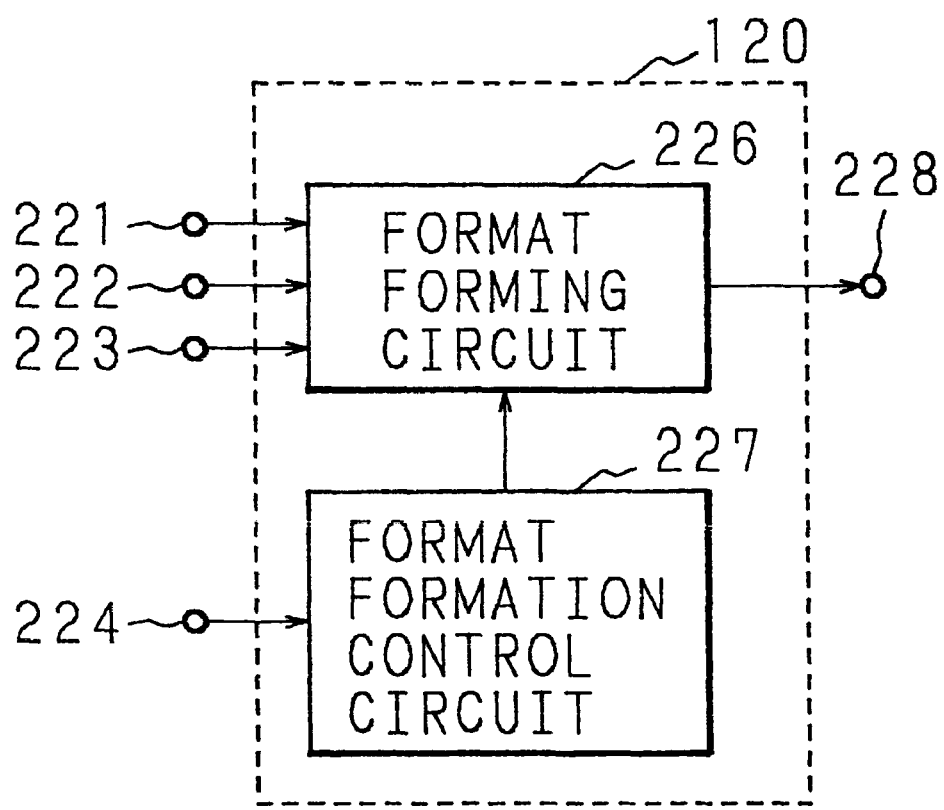
FIG. 36 is a block diagram showing an example of the configuration of a data synthesis circuit used in the invention.

FIG. 36 is a block diagram showing an example of the configuration of the data synthesis circuit 120 used in Embodiment 6. In the figure, 221, 222, and 223 designate input terminals for data outputted from the first, second, and third memories 113, 116, and 117, 224 designates an input terminal for a control signal which is outputted from the record data control circuit 119 and used for setting a number of repetition of the same data for each record mode, 226 designates a format forming circuit which forms a predetermined record format, 227 designates a format formation control circuit which controls the format forming circuit 226 on the basis of the repetition number control signal, and 228 designates an output terminal for the fourth memory 121.

Figure 37A:
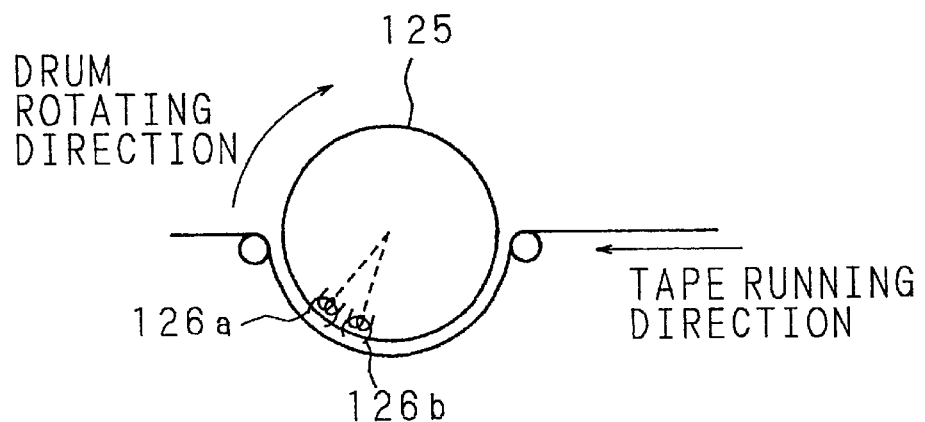
FIG. 37A is a diagram showing the arrangement of rotary heads for respective channels disposed on a typical rotary drum which is used in a digital VTR for recording a multirate signal.
Figure 37B:
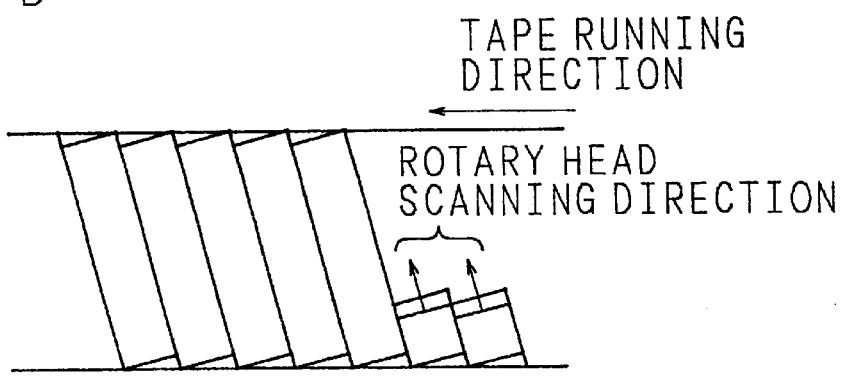
FIG. 37B is a diagram conceptually showing a process of recording a signal on a magnetic tape by using a digital VTR.

FIG. 37A is a diagram showing an example of the arrangement of the rotary heads 126a and 126b disposed on the rotary drum 125 of the digital VTR for recording multirate bitstreams, and FIG. 37B is a diagram showing the scan paths of the rotary heads 126a and 126b obtained when the digital VTR having the rotary head arrangement shown in FIG. 37A records data on a magnetic tape. In Embodiment 6, record data are recorded on the magnetic tape while controlling the rotary drum 125 shown in FIG. 37A at 9,000 rpm. When data are to be recorded by using the rotary heads 126a and 126b, the rotary heads 126a and 126b which are adjacently disposed as shown in FIG. 37B record substantially simultaneously the data on the magnetic tape.

FIG. 38 is a table showing record modes of the digital VTR of Embodiment 6 for recording multirate bitstreams. In Embodiment 6, the digital VTR having 3 kinds of record modes, 25-Mbps record mode (hereinafter, referred to as "standard record mode"), 12.5-Mbps record mode (hereinafter, referred to as "½-times record mode"), and 6.25-Mbps record mode (hereinafter, referred to as "¼-times record mode") is described.

Figure 10B:
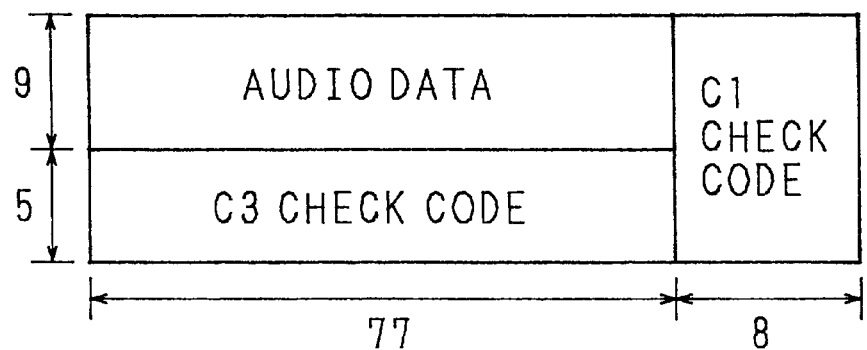

In Embodiment 6, the data format of the video signal record area in 1 track for a video signal according to the SD standard is the same as that shown in FIGS. 10A and 10B, and the configuration of 1 sync block according to the SD standard is the same as that shown in FIG. 11. Therefore, their description is omitted.

Figure 41:
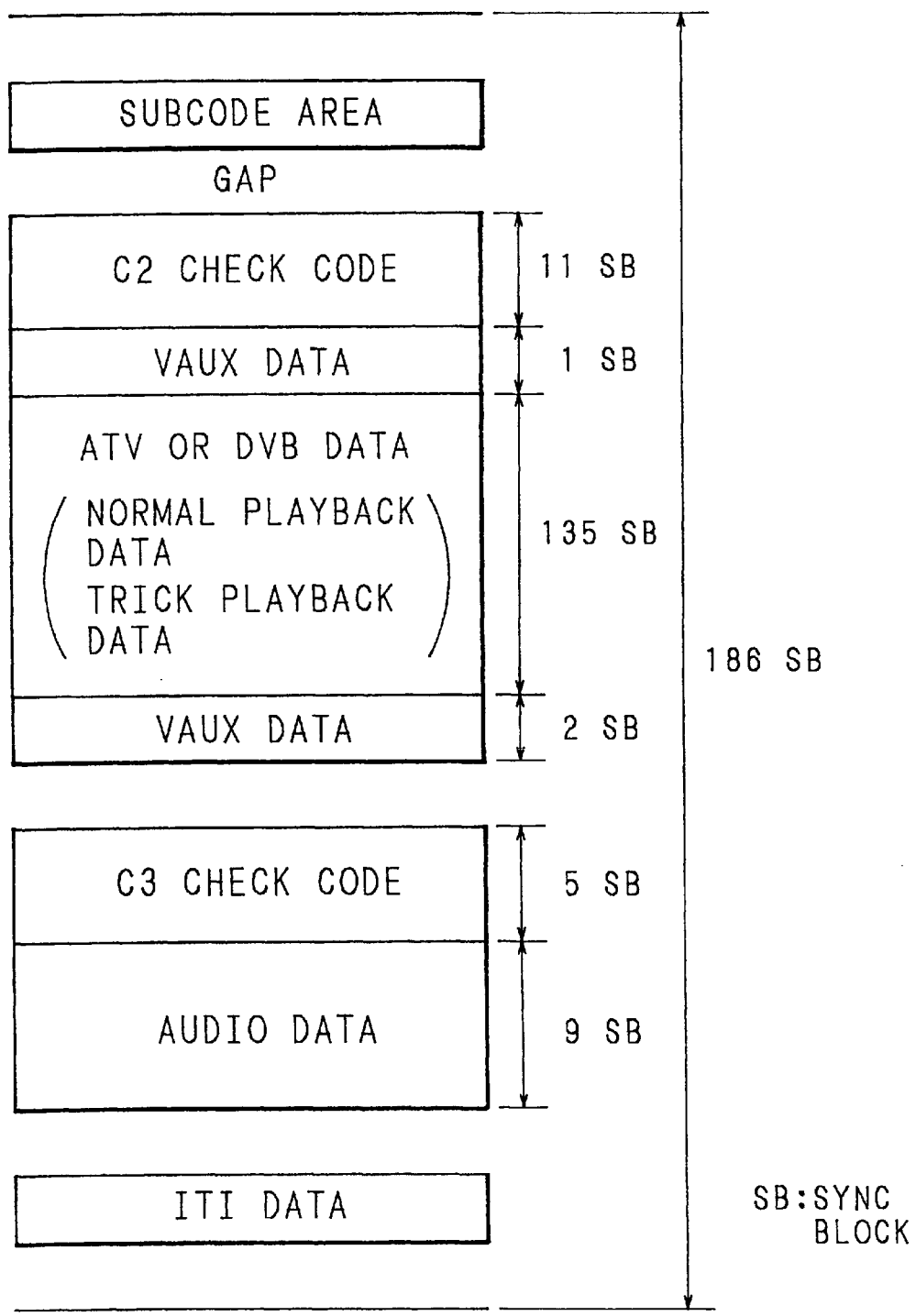
FIG. 41 is a diagram showing a record format in 1 track according to the SD standard.

FIG. 41 is a diagram showing a record format in 1 track according to the SD standard. In the SD standard, as shown in FIG. 41 (or FIG. 10), 149 sync blocks are used for 1 track as an area for recording video data as described above. Among the sync blocks, 3 sync blocks are used as a VAUX data record area (2 VAUX data record areas are disposed, one consists of 2 sync blocks, and the other consists of 1 sync block), and 11 sync blocks are used as an error correcting code record area (C2 check code). As shown in FIG. 11, 1 sync block is configured by 90 bytes. In each block, the sync pattern and the ID signal are recorded in the first 5 bytes, and the error correcting code (C1 check code) is recorded in the last 8 bytes. Therefore, data of 77 bytes can be stored in 1 sync block.

The sync block format used in Embodiment 6 is the same as that shown in FIGS. 15A and 15B. Namely, a bitstream is detected in the unit of a transport packet, and 2 detected transport packets are converted into a record data block of 5 sync blocks (sync block format) as shown in FIG. 15B and then recorded.

FIG. 42 is a table showing the number of sync blocks which can be played back from 1 track under various high-speed playback speeds used in Embodiment 6. Each value listed in the figure indicates the number of sync blocks which can be played back from 1 track at the respective high-speed playback speed in the case where trick playback is performed by using 10 μm rotary heads. The number of sync blocks was calculated under the assumption that one track (corresponding to 180 deg.) has 186 sync blocks and a portion where the output level of a playback signal is higher than −6 dB can be obtained in the same manner as the prior art example.

According to Embodiment 6, a record format can be obtained with which, in any of the 3 different record modes, data can efficiently be played back in high-speed playback and appended information such as time information, and music piece number information can be played back.

Figure 43:
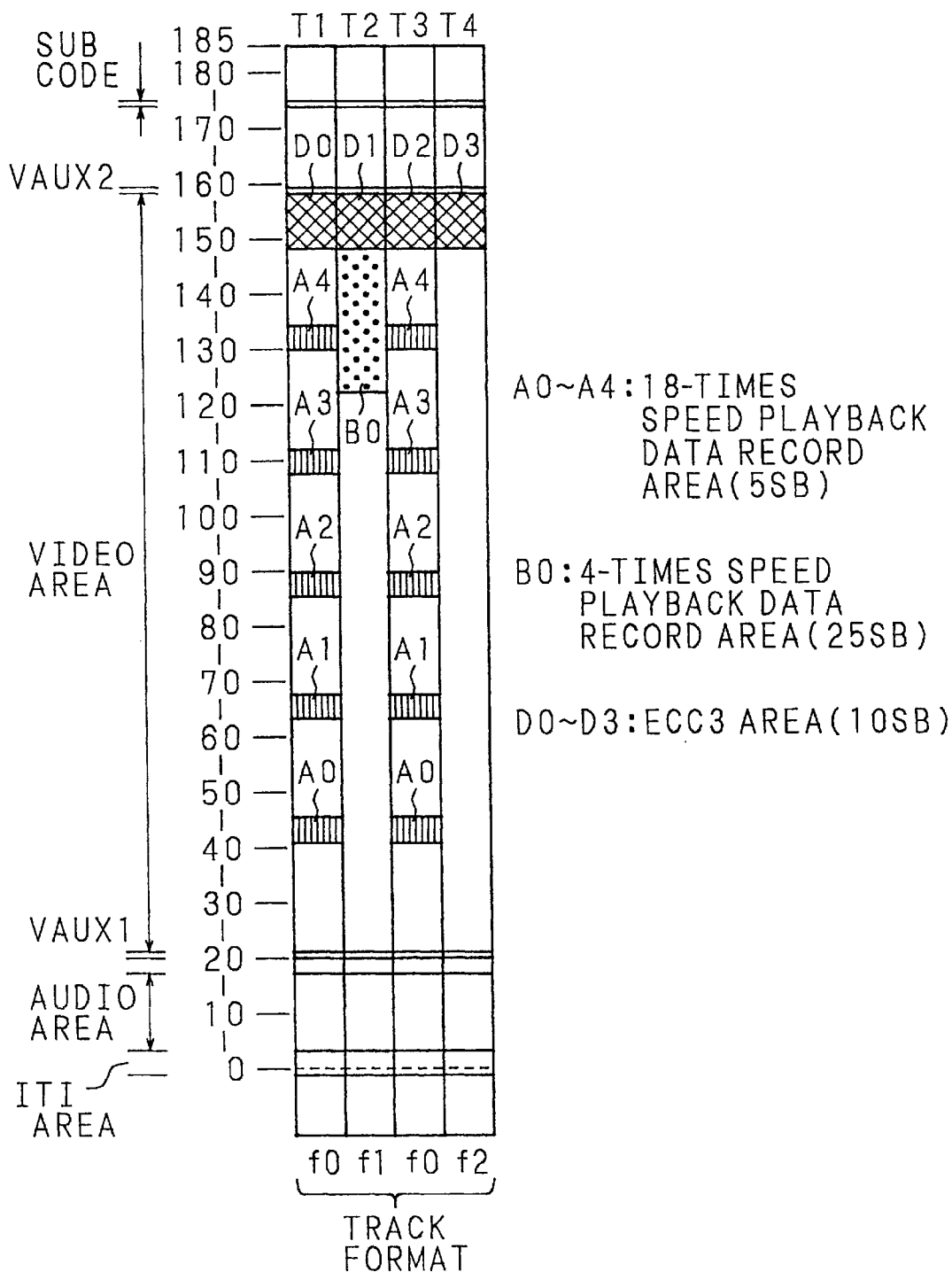
FIG. 43 is a diagram showing a track format of a 4-track period including the arrangement of a trick playback data record area used in the invention.

FIG. 43 is a diagram showing a track format of a 4-track period including the arrangement of a trick playback data record area used in Embodiment 6. As shown in the figure, in Embodiment 6, the record area for bitstreams on each track (hereinafter, referred to as "normal playback data"), and the trick playback data record area are repeated in a period of 4 tracks. Hereinafter, the 4 tracks are referred to as "track format". In the following description, the track on which recording of the rotary head 126a is conducted is called A track, and that on which recording of the rotary head 126b is conducted is called B track.

In FIG. 43, T1 designates a first track on which recording is conducted by the A-channel rotary head 126a, T2 designates a second track on which recording is conducted by the B-channel rotary head 126b, T3 designates a third track on which recording is conducted by the A-channel rotary head 126a, and T4 designates a fourth track on which recording is conducted by the B-channel rotary head 126b. In Embodiment 6, as described above, data are recorded on the magnetic tape with setting the 4 tracks from the first to fourth tracks as one unit (hereinafter, referred to as "1 track format"). Normal playback data and trick playback data are recorded in the video area of 135 sync blocks excluding the C2 check code record area and the VAUX data record areas in the video area.

In FIG. 43, A0 to A4 indicate the arrangement of 18-times speed playback data record areas on the magnetic tape in the standard record mode. Each 18-times speed playback data record area (A0 to A4) has a width of 5 sync blocks. As shown in the figure, five 18-times speed playback data record areas are disposed in each A track (T1 and T3). In the figure, the same data are recorded in the areas indicated by the same symbol (A0 to A4).

Similarly, in FIG. 43, B0 indicates the arrangement of a 4-times speed playback data record area on the magnetic tape in the standard record mode. The 4-times speed playback data record area B0 has a width of 25 sync blocks. As shown in the figure, one 4-times speed playback data record area is disposed in the track T2.

The number of sync blocks allocated to each data record area was determined on the basis of the data shown in FIG.

42. As seen from FIG. 42, in the standard record mode, 62 sync blocks can be obtained from 1 track in 4-times speed playback, and 10.94 sync blocks can be obtained from 1 track in 18-times speed playback. The data arrangement on the magnetic tape which is configured on the basis of the above and corresponds to the trick playback speeds in the standard record mode is should in FIG. 43. In the 12-times record mode, 4-times speed is set as the lower speed, and 9-times speed as the higher speed, and, in the ¼-times record mode 8-times speed is set as the lower speed, and 18-times speed as the higher speed. These speeds are examples of the speeds which are set as high-speed playback speeds required in the modes, and set as speeds at which the high-speed playback area can be used as a common area in the 3 record modes. In this case, in the ½-times record mode, 124 sync blocks can be obtained from 1 track in 4-times speed playback, and 46.5 sync blocks can be obtained from 1 track in 9-times speed playback, and, in the ¼-times record mode, 106.29 sync blocks can be obtained from 1 track in 8-times speed playback, and 43.76 sync blocks can be obtained from 1 track in 18-times speed playback.

In FIG. 43, D0 to D3 indicate the arrangement of record areas for the C4 code (hereinafter, referred to as "ECC3") on the magnetic tape. The ECC3 areas D0 to D3 have a width of 10 sync blocks. As shown in the figure, one ECC3 area is disposed in each of the tracks T1 to T4.

In each record mode, data are recorded on the magnetic tape by repeatedly recording the 1 track format shown in FIG. 43.

Hereinafter, an embodiment of the data recording method in the digital VTR in the case where multirate signals are recorded will be described with reference to FIGS. 37 to 39. In FIG. 37A, the rotary heads 126a and 126b are adjacently disposed on the rotary drum 125, and the magnetic tape is wound on the rotary drum 125 by about 180 deg. In Embodiment 6, the rotary drum 125 is rotated at 9,000 rpm (constant) in all the record modes.

Figure 44:
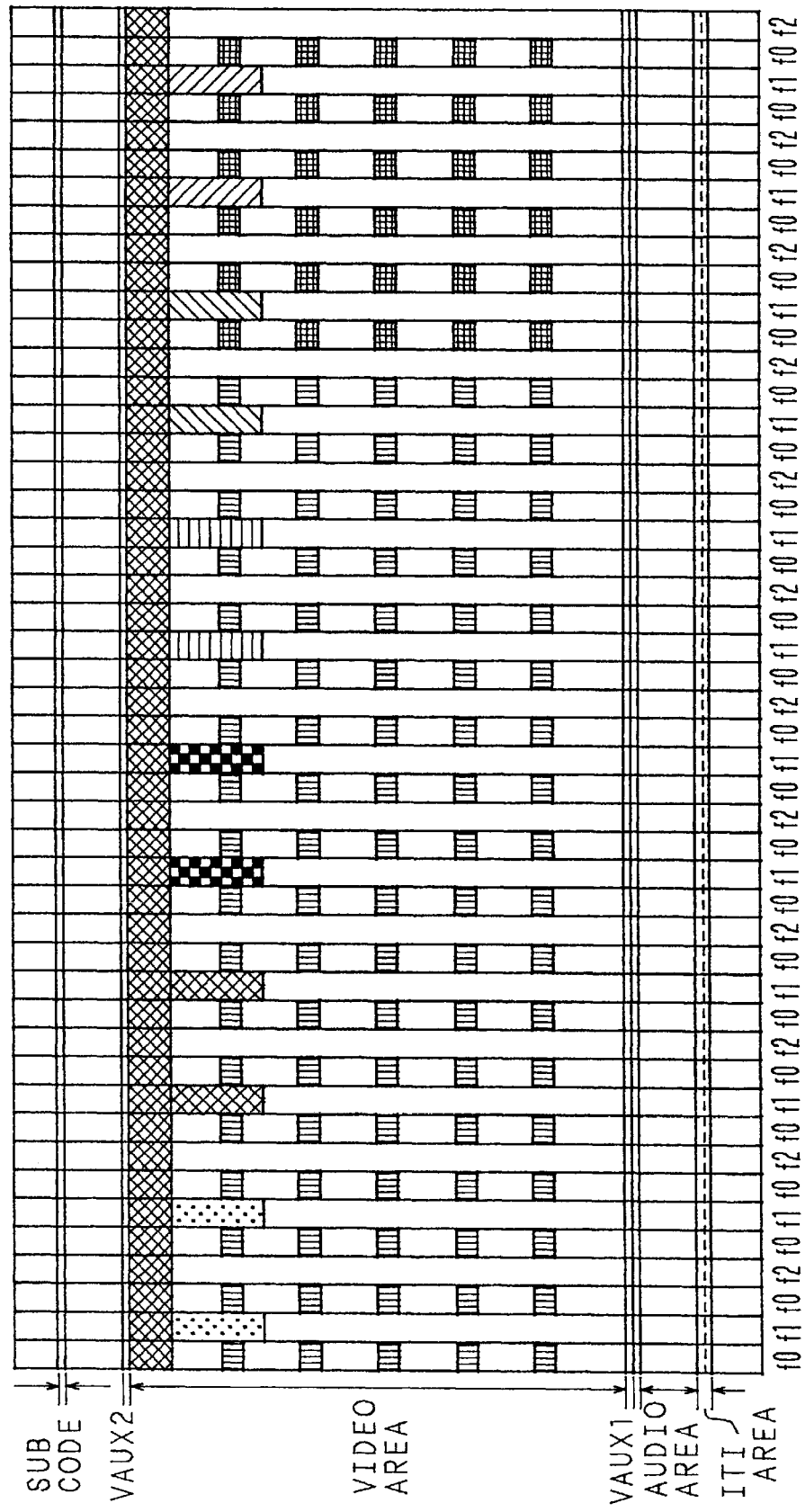
FIG. 44 is a diagram showing a record track pattern for a standard record mode disposed on a magnetic tape of the track format of FIG. 43.

First, the standard record mode will be described briefly with reference to FIG. 39A. In the standard record mode, the magnetic tape is driven at a standard magnetic tape feeding speed which is defined in the SD standard, and, as shown in the figure, 2-channel record signals are recorded substantially simultaneously on the magnetic tape for each rotation of the rotary drum 125 by the rotary heads 126a and 126b (see FIG. 37B). FIG. 44 shows a record track pattern on a magnetic tape in the standard record mode. In FIG. 44, the 1 track format shown in FIG. 43 is repeatedly recorded. In the standard record mode, 4-times speed playback is conducted by using data of B0 area of FIG. 43, and 18-times speed playback is conducted by using data of A0 to A4 areas. As shown in FIG. 44, with respect to B0 area, 2 track formats of the same trick playback data are repeatedly recorded, and, with respect to A0 to A4 areas, 9 track formats are repeatedly recorded. Therefore, with respect to the data of B0 area, the same data are repeatedly recorded 2 times in a period of 8 tracks as shown in FIG. 44, and, with respect to A0 to A4 areas, the same data are repeatedly recorded 18 times in a period of 36 tracks. In the figure, the track pitch is 10 μm.

Figure 1:
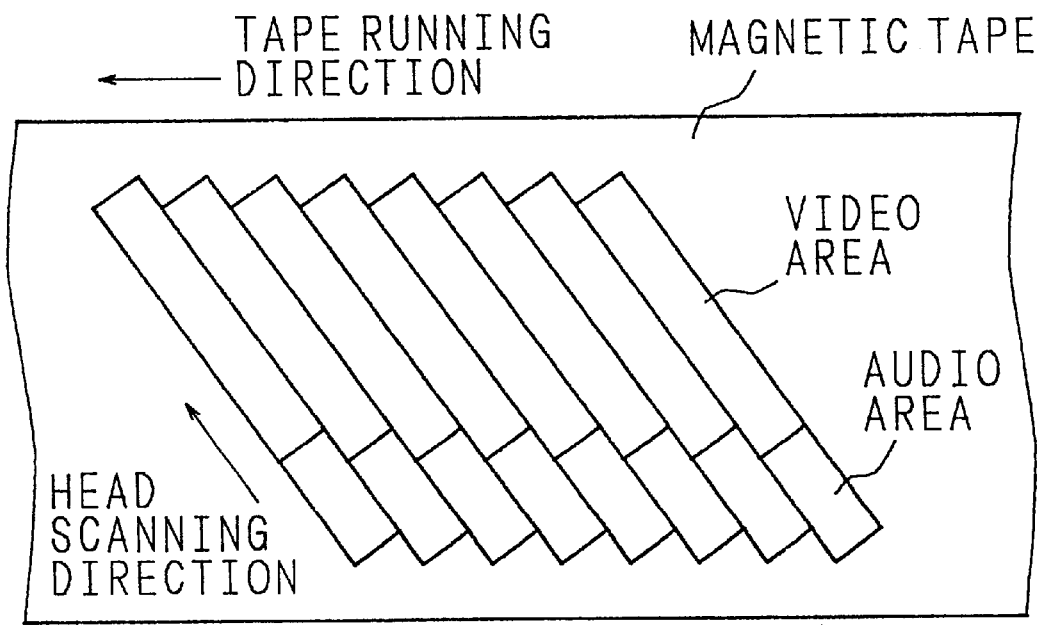
FIG. 1 is a diagram showing a track pattern of a prior art common home digital VTR.
Figure 2A:
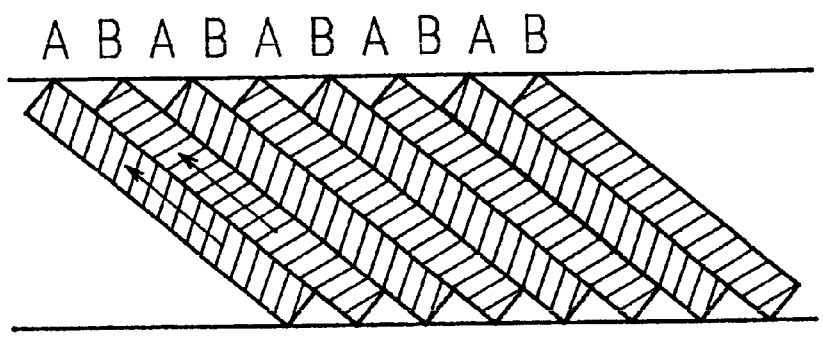
FIGS. 2A and 2B are diagrams showing head scan paths in normal playback and high-speed playback in a prior art digital VTR.
Figure 2B:
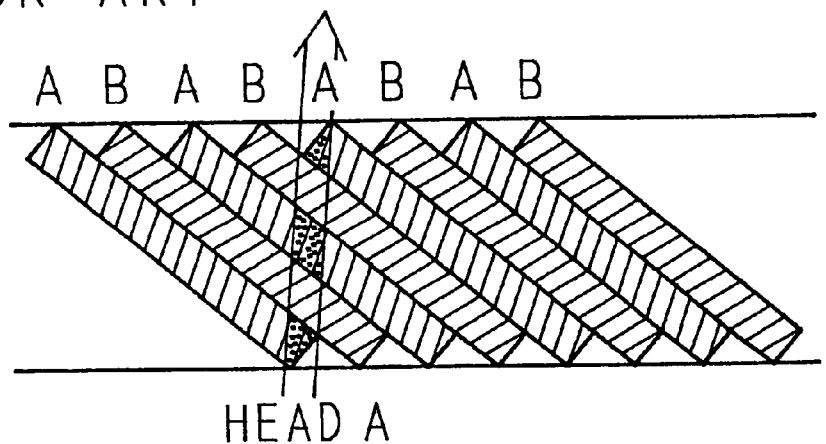
Figure 3:
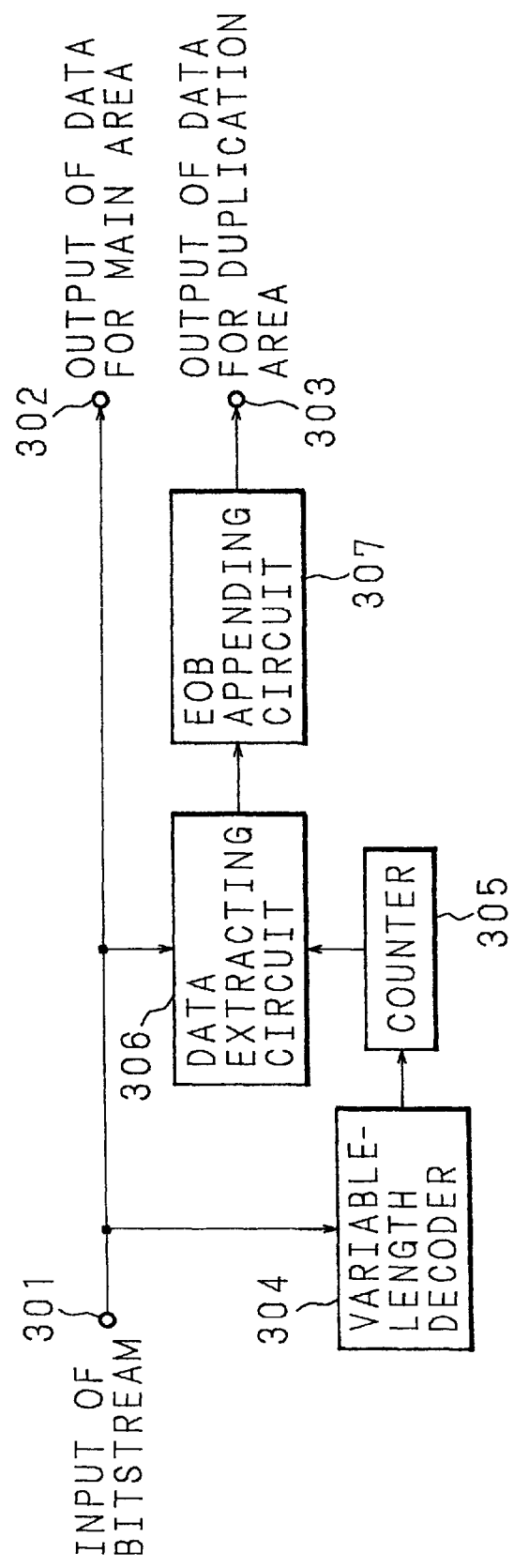
FIG. 3 is a block diagram showing the configuration of a prior art digital VTR which can perform high-speed playback.
Figure 5:
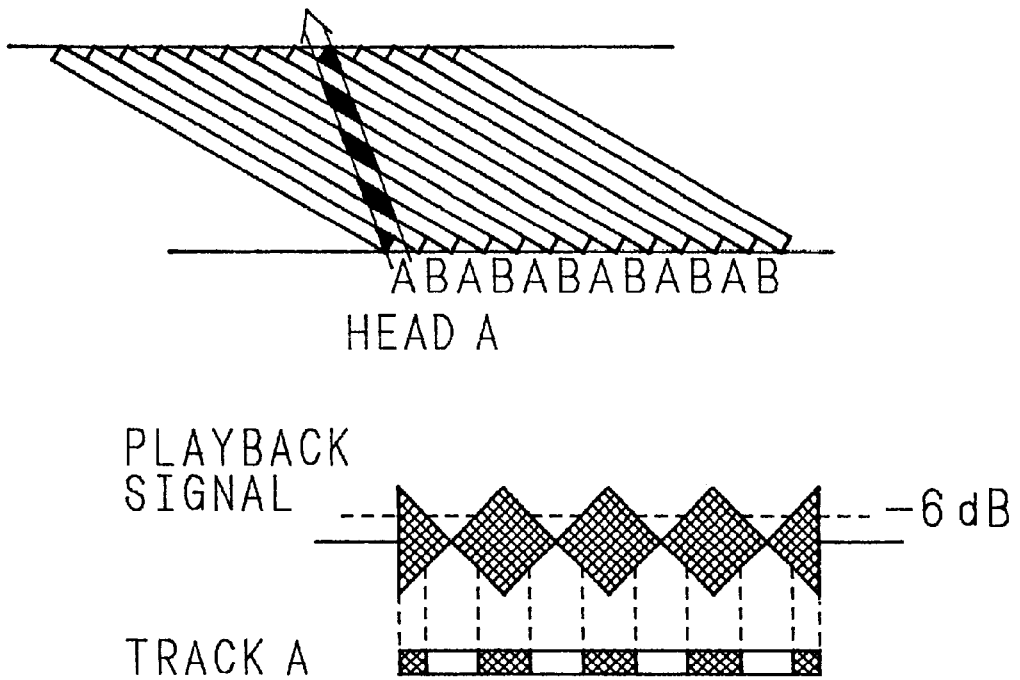
FIG. 5 is a diagram showing a head scan path in common high-speed playback.
Figure 7:
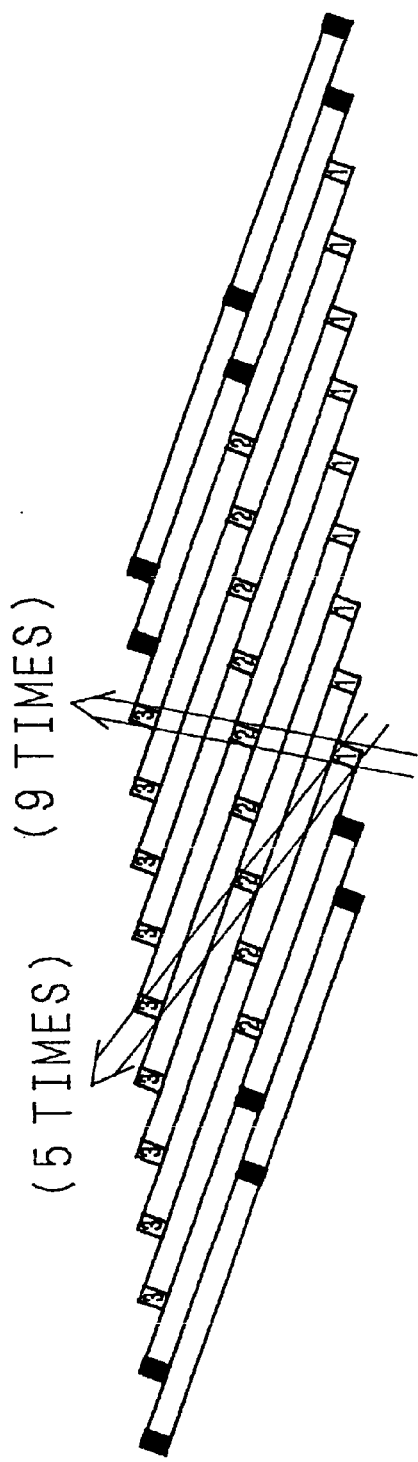
FIG. 7 is a diagram showing head scan paths in 5-times speed and 9-times speed in a prior art digital VTR.
Figure 9:
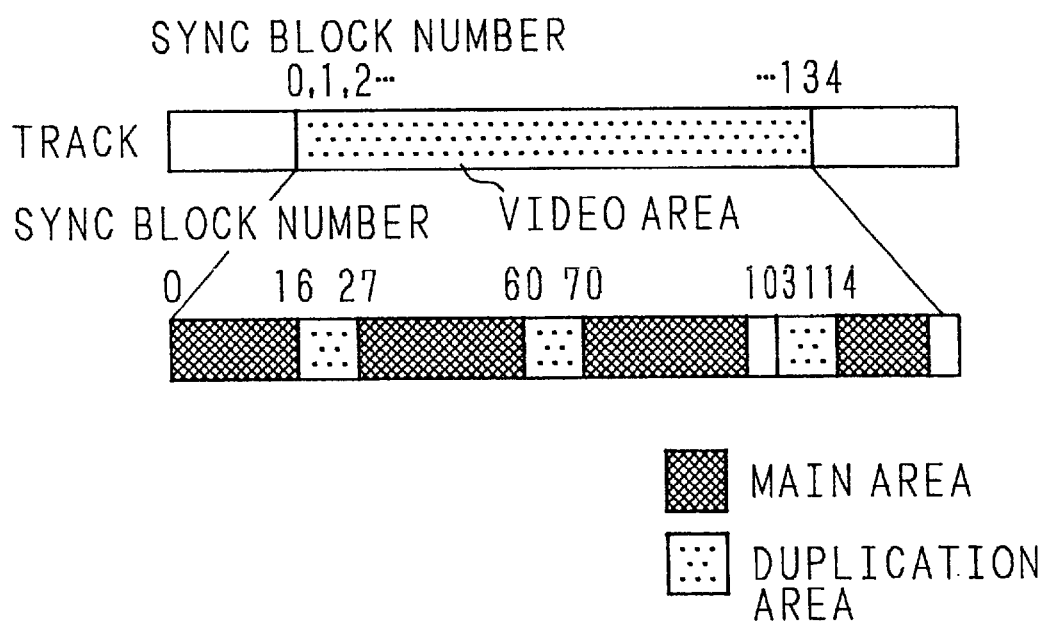
FIG. 9 is a diagram showing a track format in a prior art digital VTR.
Figure 45:
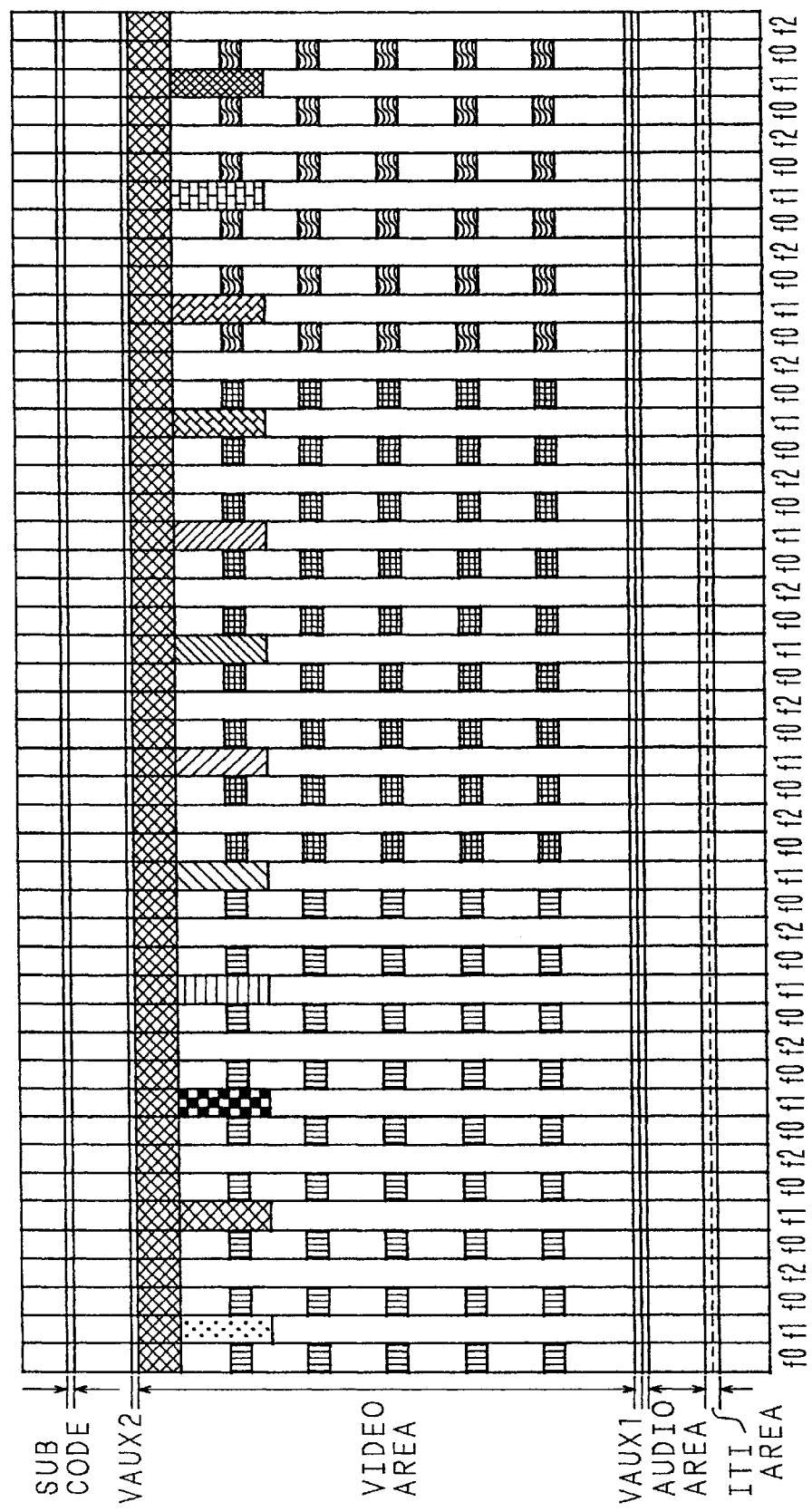
FIG. 45 is a diagram showing a record track pattern for ½-times and ¼-times record modes disposed on a magnetic tape of the track format of FIG. 43.

Similarly, the ½-times record mode will he described briefly. In the same manner as the standard record mode, the rotary drum 125 is rotated at 9,000 rpm as described above. By contrast, the magnetic tape feeding speed is ½ times that of the standard record mode. If data are recorded for each rotation of the rotary drum 125 in the same manner as the standard record mode, therefore, data which have been recorded by the rotary head 126b are overwritten by the rotary head 126a because the tape feeding speed is reduced to a half. This is caused by the configuration in which data are recorded in a track pitch of 10 μm in all the record modes as described above. In the ½-times record mode, therefore, 2-channel record signals are recorded by the rotary heads 126a and 126b in such a manner that, as shown in FIG. 39B, data for 1 track of the both channels are recorded substantially simultaneously on the magnetic tape for every 2 rotations of the rotary drum 125 (see FIG. 37B). FIG. 45 shows a record track pattern on a magnetic tape in the ½-times record mode. In FIG. 45, the 1 track format shown in FIG. 43 is repeatedly recorded. In the ½-times record mode, 4-times speed playback is conducted by using information of B0 area of FIG. 43, and 9-times speed playback is conducted by using data of A0 to A4 areas. As shown in FIG. 45, with respect to B0 area, 1 track format of the same trick playback data is recorded, and, with respect to A0 to A4 areas, 4.5 track formats are repeatedly recorded. Therefore, with respect to the data of B0 area, the same data are recorded only one time in a period of 4 tracks as shown in FIG. 45, and, with respect to A0 to A4 areas the same data are repeatedly recorded 9 times in a period of 18 tracks. In the figure, the track pitch is 10 μm.

Next, the ¼-times record mode will be described. In the same manner as the standard record mode, the rotary drum 125 is rotated at 9,000 rpm as described above. By contrast, the magnetic tape feeding speed is ¼ times that of the standard record mode. If data are recorded for each rotation of the rotary drum 125 in the same manner as the standard record mode, therefore, data which have been recorded are overwritten by the rotary heads 126a and 126b because the tape feeding speed is reduced to a quarter. In the ¼-times record mode, therefore, 2-channel record signals are recorded by the rotary heads 126a and 126b in such a manner that, as shown in FIG. 39C, data for 1 track of the both channels are recorded substantially simultaneously on the magnetic tape for every 4 rotations of the rotary drum 125 (see FIG. 37B). The record track pattern on the magnetic tape in the ¼-times record mode is the same as that in the ½-times record mode or that shown in FIG. 45. In the ¼-times record mode, 8-times speed playback is conducted by using data of B0 area of FIG. 43, and 18-times speed playback is conducted by using data of A0 to A4 areas. In the same manner as the ½-times record mode, as shown in FIG. 45, with respect to B0 area, 1 track format of the same trick playback data is recorded, and, with respect to A0 to A4 areas, 4.5 track formats are repeatedly recorded. Therefore, with respect to the data of B0 area, the same data are recorded only one time in a period of 4 tracks as shown in FIG. 45, and, with respect to A0 to A4 areas, the same data are repeatedly recorded 9 times in a period of 18 tracks.

Figure 46:
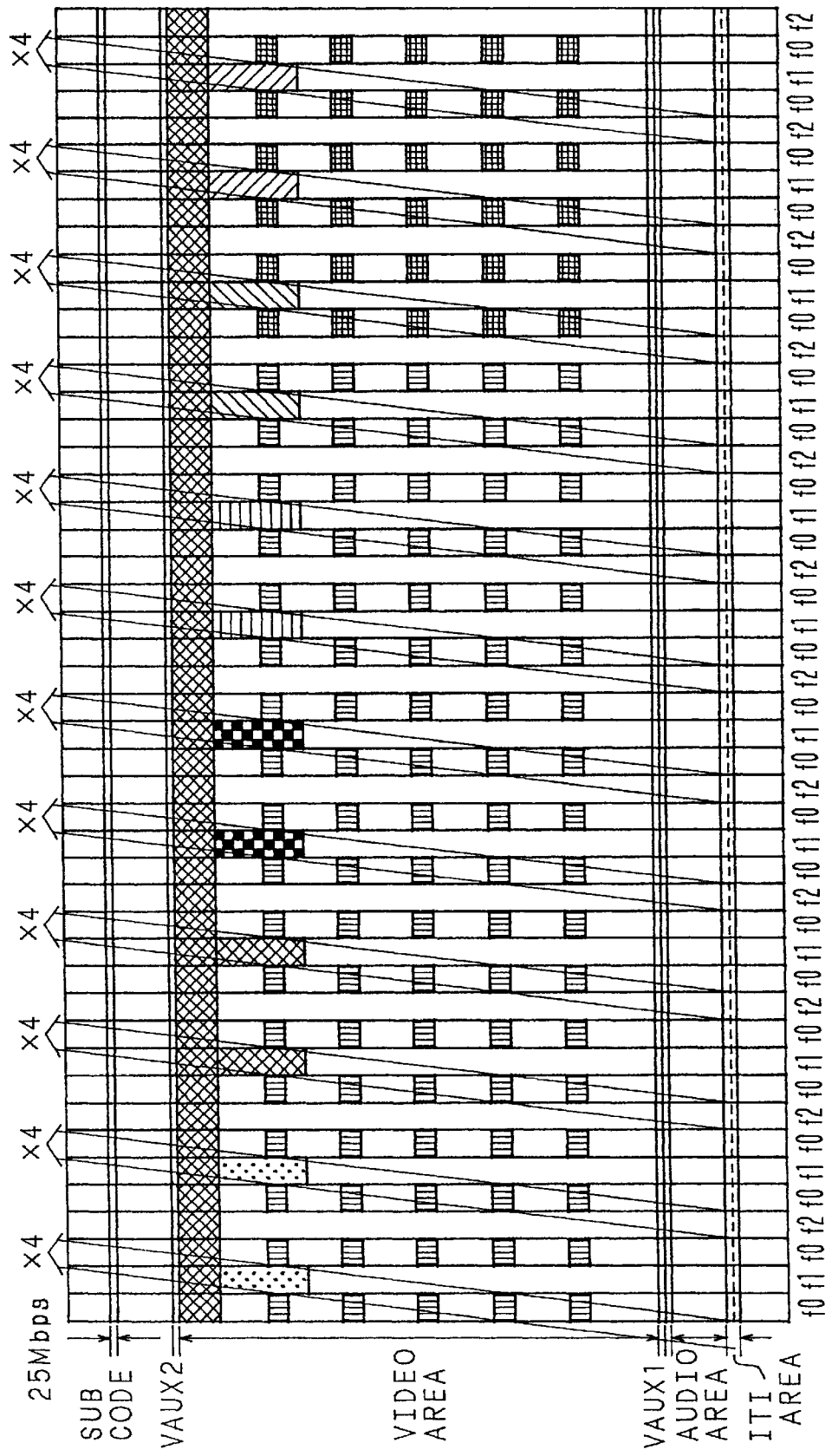
FIG. 46 is a diagram showing scan paths of a rotary head in the case where the record track pattern of FIG. 44 is subjected to 4-times speed playback at the rate of 25 Mbps.
Figure 47:
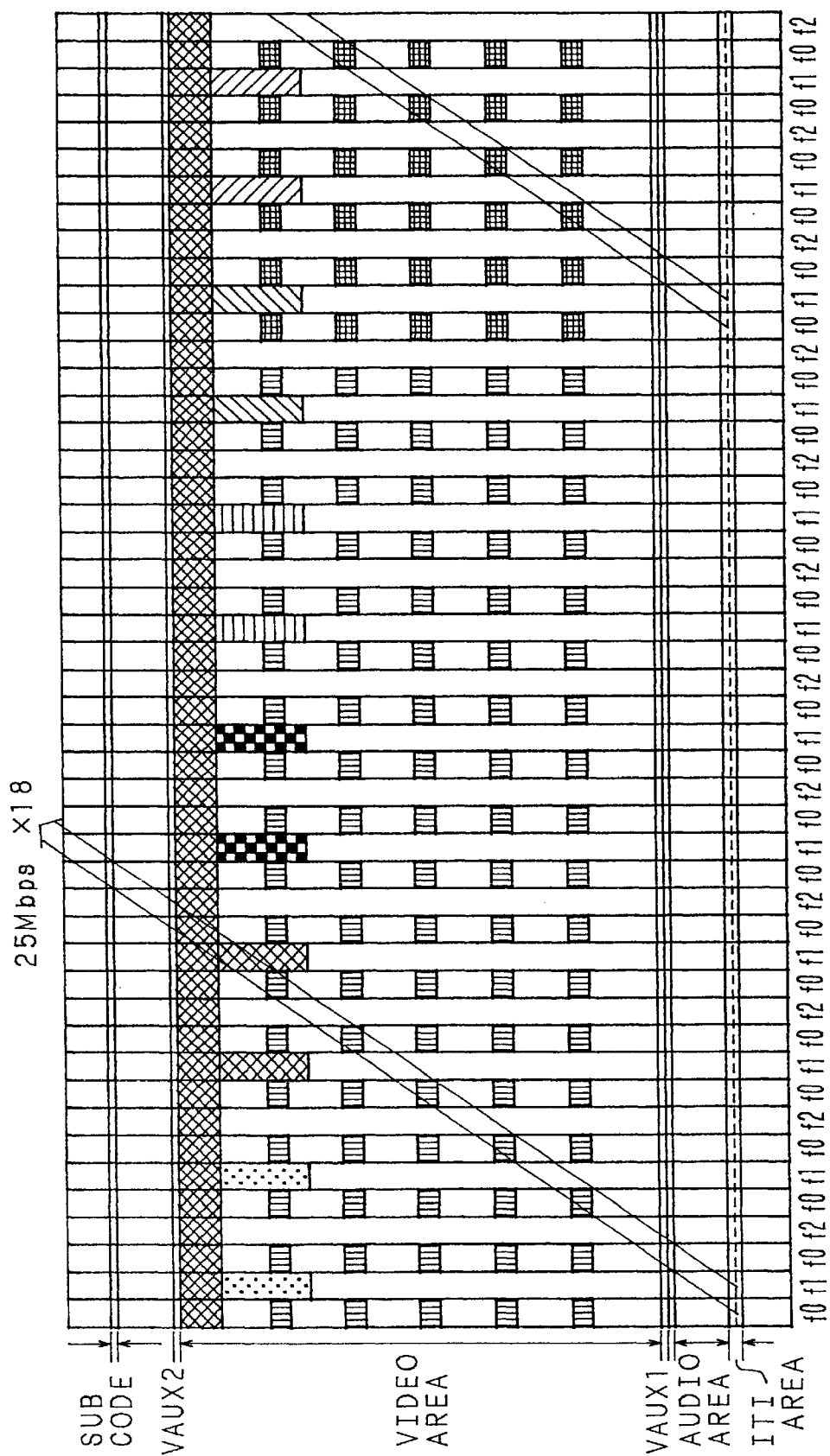
FIG. 47 is a diagram showing scan paths of a rotary head in the case where the record track pattern of FIG. 44 is subjected to 18-times speed playback at the rate of 25 Mbps.

Next, scan paths of the rotary heads in the case where high-speed playback is conducted by using the record format in the standard record mode of Embodiment 6 shown in FIG. 44 will be shown. FIG. 46 shows scan paths of the rotary heads in the case where 4-times speed playback is conducted by using the record format of FIG. 44 in the standard record mode, and FIG. 47 shows scan paths of the rotary heads in the case where 18-times speed playback is conducted by using the record format of FIG. 44 in the standard record mode.

Figure 48:
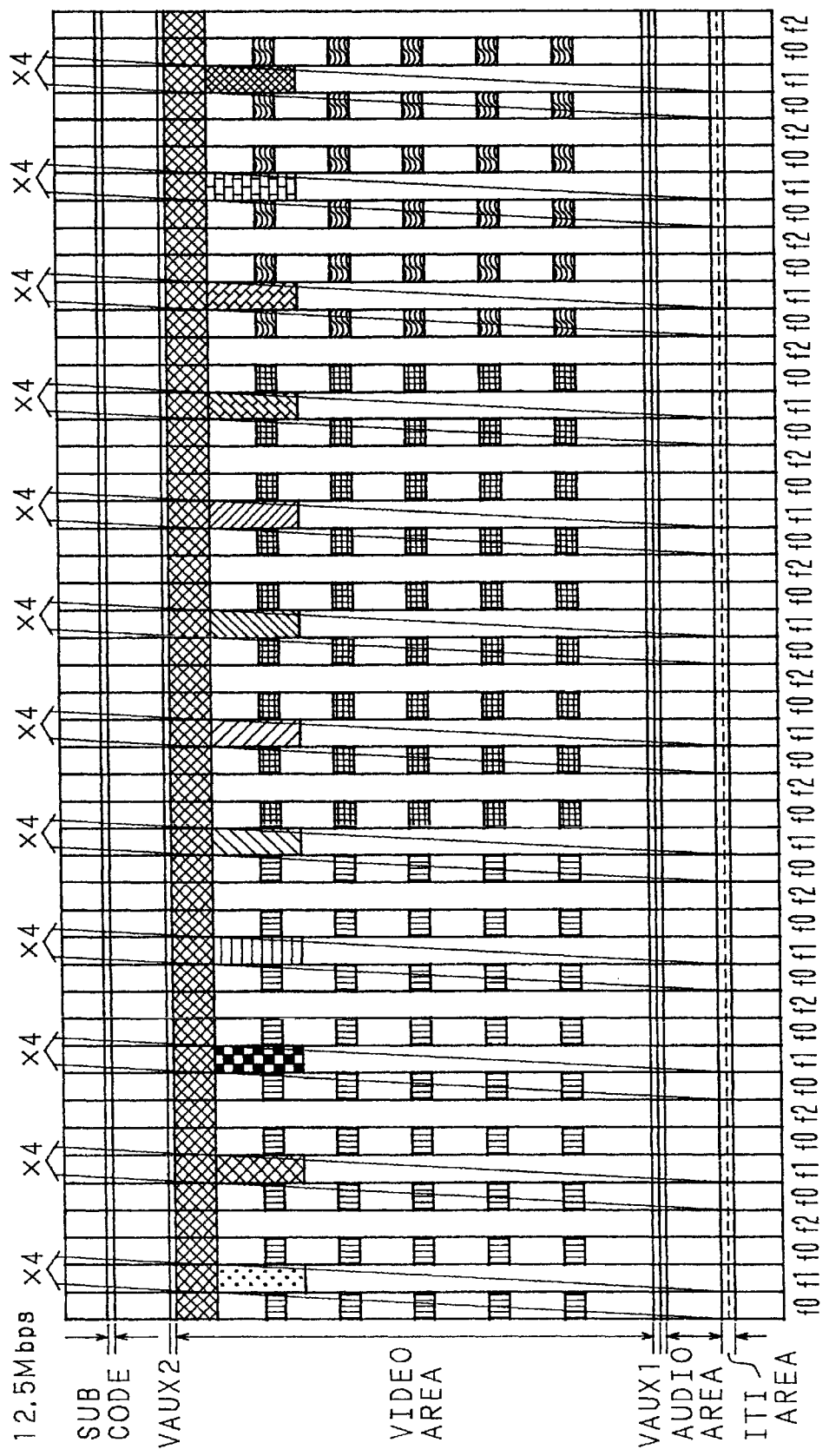
FIG. 48 is a diagram showing scan paths of a rotary head in the case where the record track pattern of FIG. 45 is subjected to 4-times speed playback at the rate of 12.5 Mbps.
Figure 49:
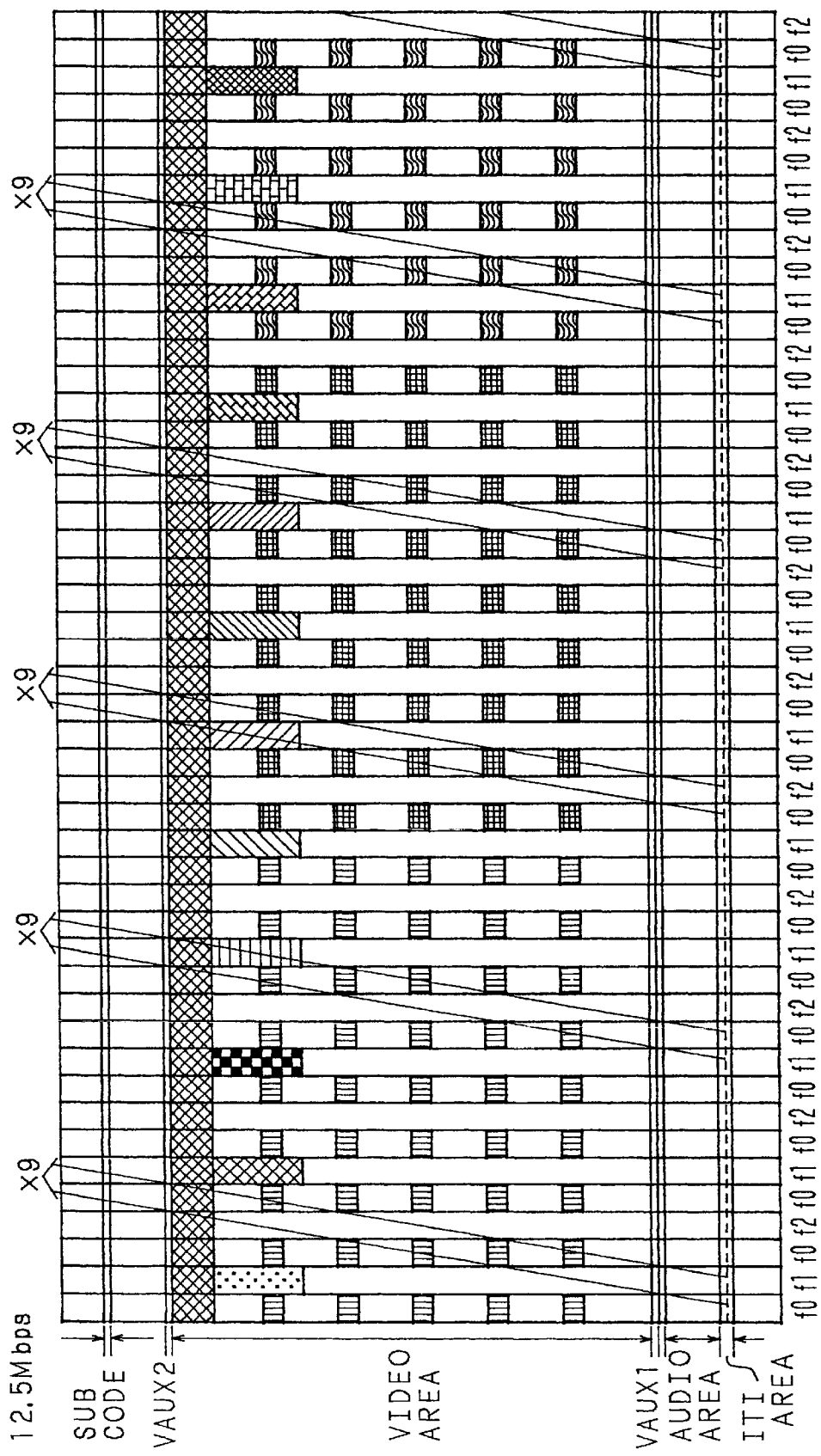
FIG. 49 is a diagram showing scan paths of a rotary head in the case where the record track pattern of FIG. 45 is subjected to 9-times speed playback at the rate of 12.5 Mbps.
Figure 50:
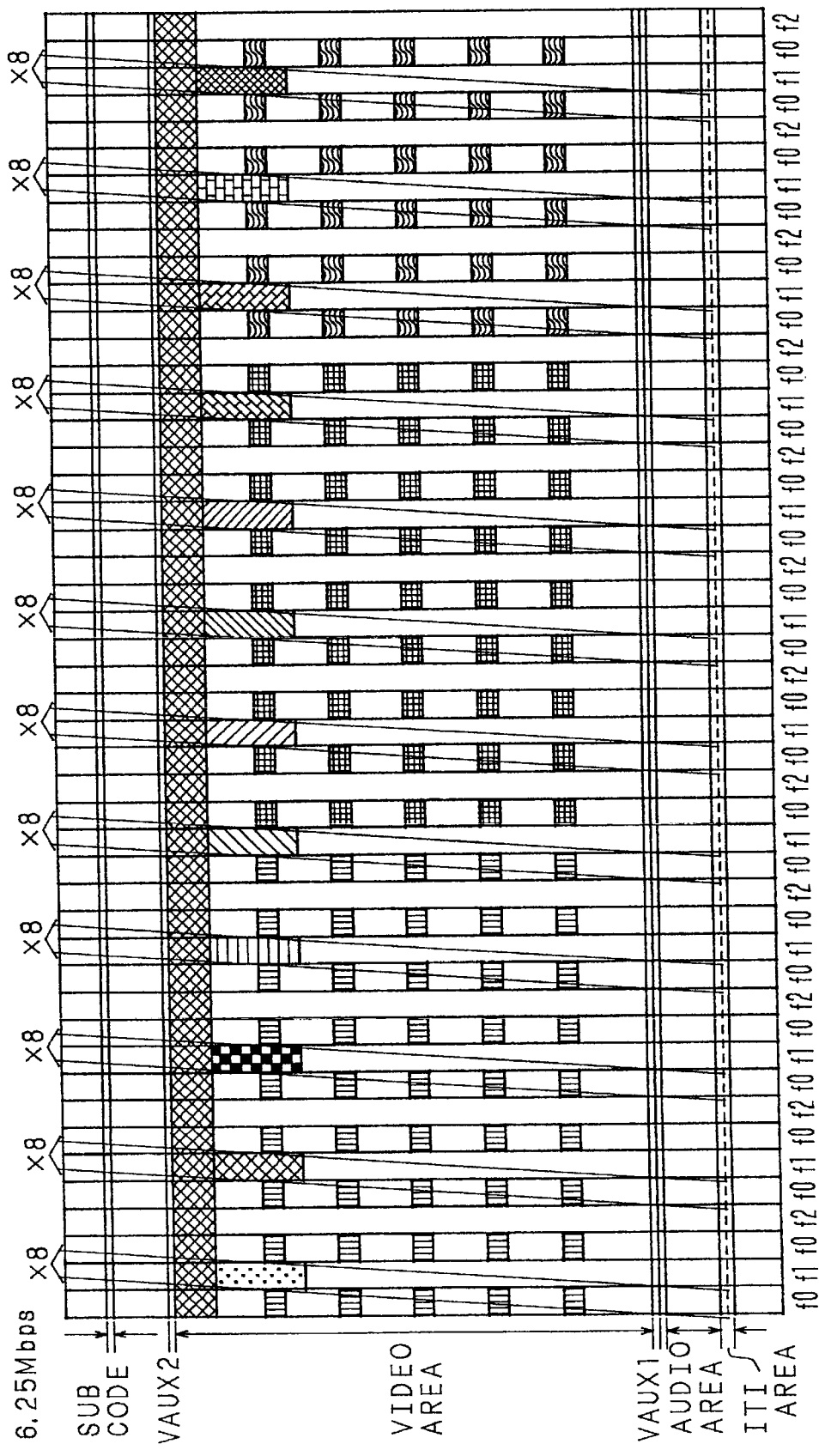
FIG. 50 is a diagram showing scan paths of a rotary head in the case where the record track pattern of FIG. 45 is subjected to 8-times speed playback at the rate of 6.25 Mbps.

Furthermore, scan paths of the rotary heads in the case where high-speed playback is conducted by using the record format in the ½-times record mode and the ¼-times record mode of Embodiment 6 shown in FIG. 45 will be shown. FIG. 48 shows scan paths of the rotary heads in the case where 4-times speed playback is conducted by using the record format of FIG. 45 in the ½-times record mode, and FIG. 49 shows scan paths of the rotary heads in the case where 9-times speed playback is conducted by using the record format of FIG. 45 in the ½-times record mode. FIG. 50 shows scan paths of the rotary, heads in the case where 8-times speed playback is conducted by using the record format of FIG. 45 in the ¼-times record mode, and FIG. 51 shows scan paths of the rotary heads in the case where 18-times speed playback is conducted by using the record format of FIG. 45 in the ¼-times record mode.

According to the record track pattern shown in FIG. 44, the rotary heads scan the ITI area, and the area of VAUX1 of sync block address 19 in 4-times speed playback in the standard record mode. This will be described in detail in the description of the playback system. That is, in trick playback, tracking can be controlled by using the pilot signals f0, f1, and f2 in the ITI area, and the area of VAUX1 is reserved for an area for recording appended information according to the SD standard. Therefore, appended information such as time information, and music piece number information may previously be recorded in the area, and then played back in high-speed playback. In 18-times speed playback, the rotary heads scan the ITI area, and the subcode area. Namely, in trick playback, tracking can be controlled by using the pilot signals f0, f1, and f2 in the ITI area, and, in 18-times speed playback, appended information such as time information, and music piece number information which are recorded in the subcode area can be played back.

According to the record track pattern shown in FIG. 45, as shown in FIGS. 48 and 49, the rotary heads scan the subcode area in 4-times speed playback in the ½-times record mode. Also in 9-times speed playbacks the rotary heads scan the subcode area. In other words, both in 4-times speed playback and 9-times speed playback, appended information such as time information, and music piece number information which are recorded in the subcode area can be played back. In 9-times speed playback, the control is conducted based on only the speed control.

Figure 51:
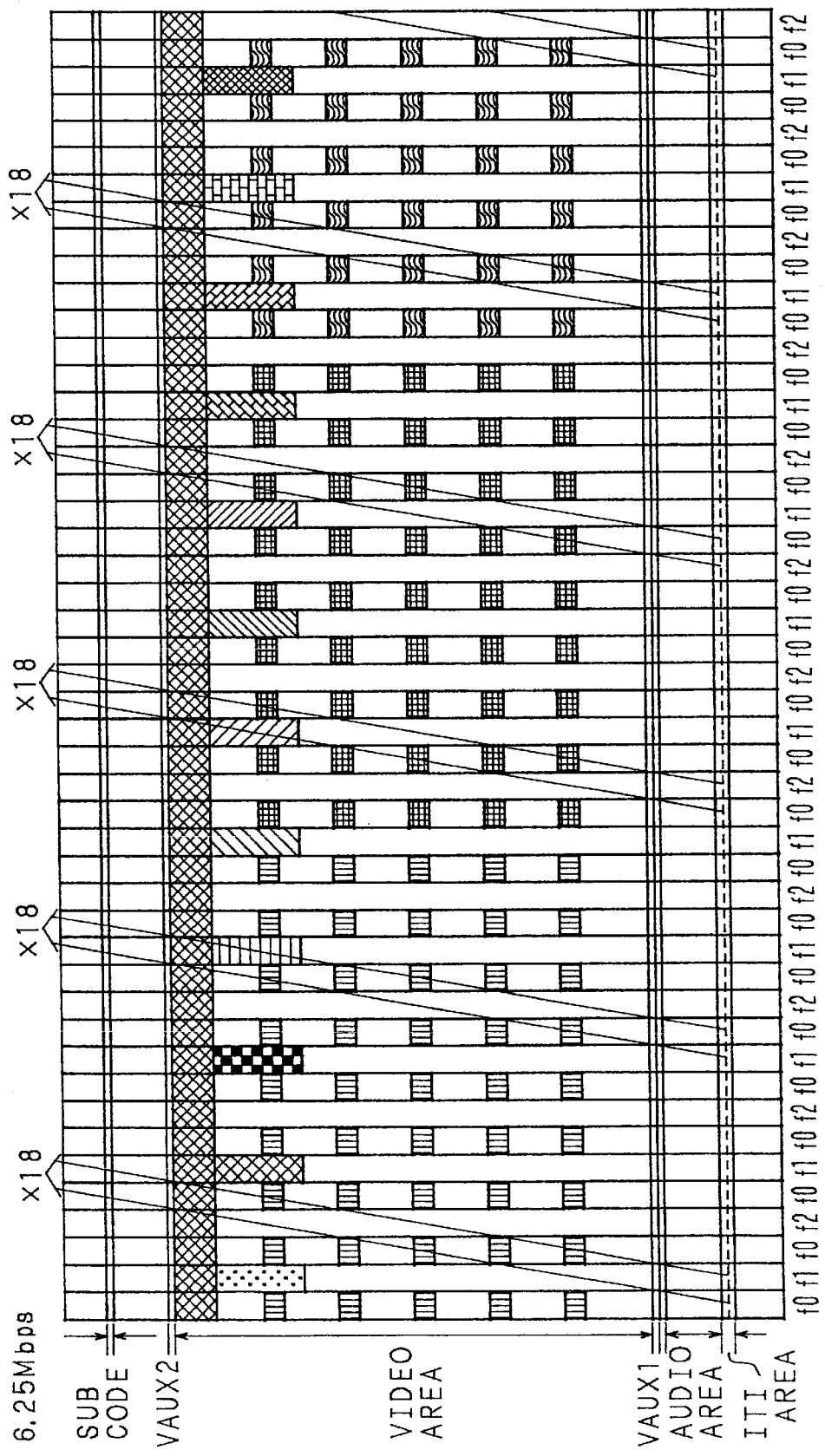
FIG. 51 is a diagram showing scan paths of a rotary head in the case where the record track pattern of FIG. 45 is subjected to 18-times speed playback at the rate of 6.25 Mbps.

According to the record track pattern shown in FIG. 45, as shown in FIGS. 50 and 51, the rotary heads scan the subcode area in 8-times speed playback in the ¼-times record mode. Also in 18-times speed playback, the rotary heads scan the subcode area. In other words, both in 8-times speed playback and 18-times speed playback, appended information such as time information, and music piece number information which are recorded in the subcode area can be played back. In 18-times speed playback, the control is conducted based only on the speed control.

Next, the operation of the record system will be described. A transport packet inputted through the input terminal 101 is inputted to the header analysis circuit 110, the first memory 113, and the rate discriminating circuit 118. The header analysis circuit 110 first detects a transport header from the inputted transport packet, and analyzes the detected transport header. A PAT (Program Association Table) and a PMT (Program Map Table) are separated from the transport bitstream, and a PID of the program to be recorded by the digital VTR is detected. The detected PID data are outputted to the first memory 113 and the rate discriminating circuit 118.

On the basis of the detected PID, the header analysis circuit 110 separates a transport packet for transmitting video data of the program to be recorded, and analyzes data in the separated transport packet to separate header information such as a sequence header, a picture header, and a slice header, and, on the basis of the header information, separates intra-image data from the transport packet. In this case, the various header information appended to the intra-image data, and appended information appended to the header information are also separated.

The sequence header is a header information which is disposed in a bitstream of a video signal, and to which identifying information for MPEG1 and MPEG2, the aspect ratio of the picture, the transmission rate of the picture, etc, are appended. The picture header is a header which is appended to the top of each frame or field so as to indicate the top of each frame or field, and to which a signal indicative of the mode such as a coding mode, a quantizing table, or the like are appended. In MPEG2, when data of 1 frame are to be transmitted, the transmission is performed while dividing a screen of 1 frame (field) into plural slices. The slice header indicates the top of each slice (the headers are described in detail in the draft of MPEG2).

The header information detected by the header analysis circuit 110, and information (e.g., quantizing table information) appended to the header information are outputted to the P/S converter 111, the first memory 113, the 4-times speed playback data forming circuit 114, the 18-times speed data forming circuit 115, and the rate discriminating circuit 118. The intra-image data separated in the header analysis circuit 110 are outputted to the P/S converter 111.

In the rate discriminating circuit 118, on the basis of the PID data of the program to be recorded which are inputted from the header analysis circuit 110, the transport packet of the program to be recorded is separated from transport packets inputted through the input terminal 101. From the separated transport packet, header information appended to video data, audio data, digital data relating to the video data and the audio data, etc. is analyzed, and the transmission rates of the data are detected. The record data rate of the program is outputted to the record data control circuit 119. The transmission rate of video data only may be detected simultaneously with the analysis of the header of video data in the header analysis circuit 110.

The record data rate of the program detected in the rate discriminating circuit 118 is inputted to the record data control circuit 119. The operation of the record data control circuit 119 will be described with reference to FIG. 35. The record data rate inputted through the input terminal 150 is inputted into the record mode setting circuit 155. The record mode which is optimum for recording the program is selected from the 4 kinds of record modes, and the selected record mode is outputted. For example, when the record data rate of the program is 5.5 Mbps, the ¼-times record mode (6.25-Hbps record mode) is selected, and, when the record data rate is 9.0 Mbps, the ½-times record mode (12.5-Mbps record mode) is selected.

The output of the record mode setting circuit 155 is inputted to the record timing generating circuit 156, the trick playback data code amount setting circuit 157, and the servo system reference signal generating circuit 158. The servo system reference signal generating circuit 158 generates a reference signal which is required for controlling the rotation phase of the rotary drum 125, tape feeding speed information, a track identification signal (track number, frequency information of the pilot signal of a 4-track period, etc.), and the like. In Embodiment 6, the rotary drum 125 is rotated at 9,000 rpm in all the record modes. On the other hand, when the record mode signal is inputted, the trick playback data code amount setting circuit 157 outputs the code amount control information of trick playback data to be recorded in B0, and A0 to A4 areas (see FIG. 43), to the trick playback data forming circuit 112, and the second and third memories 116 and 117.

The record timing generating circuit 156 generates various control signals on the basis of the selection result of the record mode, and the reference signal which is outputted from the servo system reference signal generating circuit 158 and which controls the rotation phase of the rotary drum 125. The circuit will be described later in detail.

On the other hand, the intra-image data ((hereinafter, referred to as "intraframe") detected in the header analysis circuit 110 is subjected to the P/S conversion in the P/S converter 111 to be converted into 1-bit bitstream data (in the following description, the case where data encoded in the unit of 1 frame will be described). The bitstream data of intra-frame converted into 1-bit serial data are inputted to the trick playback data forming circuit 112.

The operation of the trick playback data forming circuit 112 will be described with reference to FIG. 33. In video compression according to MPEG2, DCT coefficients obtained by conducting the DCT on an DCT block of 8-line×8-pixel is subjected to quantization, the DCT coefficients are read out from the low frequency components in which the power spectrum is concentrated, in the scanning sequence which is called the zig-zag scanning, and the read out coefficients are subjected to run-length coding of the run length of zero coefficients. The data which have undergone run-length coding are then subjected to two-dimensional variable-length coding, thereby reducing the transmission rate.

The serial data of the intra-image inputted through the input terminal 125 are inputted to the variable-length decoder 104, and the first and second data extracting circuits 106a and 106b. In the variable-length decoder 104, the inputted bitstreams are subjected to variable-length decoding. In Embodiment 6, the inputted bitstreams are not completely decoded in the variable-length decoding, but only the run length and the code length of a variable-length coded word are detected and outputted, thereby reducing the circuit scale. It is a matter of course that variable-length decoding may be completely done. The counter 105 counts the number of DCT coefficients in decoded 1 DCT block on the basis of the run length, and outputs the count result to the first and second data extracting circuits 106a and 106b.

Hereinafter, the operation in each of the standard record mode, the ½-times record mode, and the ¼-times record mode (see FIGS. 43, 44, and 45) will be described. First, the operation in the standard record mode will be described. In the standard record mode, the first data extracting circuit 106a extracts a variable-length coded word of 4-times speed playback data to be transmitted, on the basis of the code amount control data (the number of DCT coefficients to be transmitted) of 4-times speed playback data which are outputted from the trick playback data code amount setting circuit 157 through the input terminal 136 (in Embodiment 6, for the sake convenience, signals to be recorded in B0 area are hereinafter referred to as "4-times speed playback data", and signals to be recorded in A0 to A4 areas are referred to as "18-times speed playback data"), and the count result outputted from the counter 105. The timing of extracting data is controlled so that the number of decoded DCT coefficients outputted from the counter 105 is compared with the code amount control data inputted through the input terminal 136 and a variable-length coded word is transmitted before the number exceeds the code amount control information. Each break between variable-length codes is detected based on code-length information outputted from the variable-length decoder 104.

Similarly, also the second data extracting circuit 106b extracts a variable-length coded word of 18-times speed playback data, on the basis of the code amount control data of 18-times speed playback data, and information outputted from the counter 105 and the variable-length decoder 104. An EOB code is appended to the end of each DCT block in the extracted data in the first and second EOB appending circuits 107a and 107b, and the data are outputted through the output terminals 137a and 127b, respectively. The top of each DCT block is detected by the variable-length decoder 104, and outputted to the counter 105 and the first and second data extracting circuits 106a and 106b.

In this process, the number of DCT coefficients from which data are extracted may be the same or different in the record modes or the speeds. When the number of DCT coefficients to be extracted is different in the modes or speeds, it means that the number of DCT blocks recorded in the recorded trick playback transport packet is different. As described above, the areas into which trick playback data can be recorded is restricted. In the case where trick playback data record areas for trick playback speeds have the same number of sync blocks, when the number of recorded DCT coefficients in 1 DCT block is increased, more trick playback data record areas are required, thereby lengthening the refresh in the case of high-speed playback. As a larger number of DCT coefficients are transmitted, the picture quality of a played back image is further improved. By contrast, when the number of recorded DCT coefficients in 1 DCT block is decreased, the data amount for 1 frame of trick playback data is reduced so that a less number of trick playback data record areas are required, thereby shortening the refresh of a played back image. Since recorded DCT coefficients are reduced in number, the picture quality of a played back image is degraded. The amount of extracting data in each record mode or speed is determined in accordance with the tradeoff of the refresh and the picture quality.

The 4-times speed playback data and 18-times speed playback data outputted from the trick playback data forming circuit 112 are inputted to the 4-times speed playback data forming circuit 114 and the 18-times speed data forming circuit 115, respectively. The successive processes are the same in both the playback speeds (4-times speed and 18-times speed), and hence only the formation of 4-times speed playback data will be described. Hereinafter, the operation of the 4-times speed playback data forming circuit 114 will be described with reference to FIG. 34. The 4-times speed playback data forming circuit 114 forms a transport packet for 4-times speed playback by using the transport header information and various header information (including appended data) inputted from the header analysis circuit 110, and 4-times speed playback data outputted from the trick playback data forming circuit 112. With respect to the transport header information inputted through the input terminal 140, the transport header correcting circuit 142 corrects the transport header.

Specifically, on the basis of intra-data outputted from the header analysis circuit 110, the 4-times speed data forming circuit 114 rewrites header information which are in the transport header of a transport packet transmitted through an intra-image and indicative of continuity of the transport packet. On the other hand, the header appending circuit 143 appends header information such as a sequence header, and a picture header detected in the header analysis circuit 110, and information (a coding mode flag, quantizing table information, etc.) which are required for decoding trick playback data from the headers, to a trick playback bitstream outputted from the trick playback data forming circuit 112.

The trick playback data to which header information are appended are subjected to serial/parallel conversion by the packet circuit 144 to be converted into data in which 1 byte consists of 8 bits. The 8-bit data which have undergone serial/parallel conversion are divided into parts of 184 bytes so as to constitute the data portion of the transport packet. In the serial/parallel conversion, data "0" are inserted before each header information so that each header information is configured by 4 bytes as defined in MPEG2. This is done because each header information which consists of 32 bits must be configured by 4 bytes when a transport packet is to be formed.

Specifically, when a header information spreads over 5 bytes, the header data is controlled so as to be configured by 4 bytes, by appending data "0". In the transport header appending circuit 145, the transport packet data outputted from the transport header correcting circuit 142 is appended to the data of the transport packet of 184 bytes which is configured by the packet circuit 144, and the resulting data is then outputted. Header information read out from the transport header correcting circuit 142 is outputted on the basis of a timing signal outputted from the packet circuit 114. The 4-times speed playback data formed by the 4-times speed data forming circuit 114 are outputted in the form of a transport packet to the second memory 116.

In the above, processing of converting 4-times speed playback data into a transport packet has been described. Also 18-times speed playback data are subjected to similar processing. That is, 18-times speed playback data outputted from the trick playback data forming circuit 112 are inputted to the 18-times speed data forming circuit 115. In the 18-times speed data forming circuit 115, on the basis of header information outputted from the header analysis circuit 110, headers and appended information are appended to the trick playback data by the header appending circuit 143, the playback data are then subjected to serial/parallel conversion by the packet circuit 144 in the manner described above to constitute the data portion of the transport packet, the corrected transport header outputted from the transport header correcting circuit 142 is appended by the transport header appending circuit 145, and then the data are outputted in the form of a transport packet to the third memory 117.

The trick playback transport packet data outputted from the 4-times speed data forming circuit 114 and the 18-times speed data forming circuit 115 are inputted to the second memory 116 and the third memory 117. In the second memory 116 and the third memory 117, a storage area for trick playback data for 1 frame is set on the basis of the code amount data outputted from the record data control circuit 119. The second memory 116 and the third memory 117 store the inputted data in the form of a transport packet in the storage area in the respective memories and constitute trick playback data for 1 frame (field).

In the first ECC circuit 131, the C5 check code for trick playback is appended to the trick playback data for 1 frame configured in the second memory 116 and the third memory 117. The data to which the C5 check code is appended in the first ECC circuit 131 are read out from the memories for every 2 trick playback transport packets, based on a data request signal outputted from the data synthesis circuit 120, converted into data of 5 sync blocks as shown in FIG. 15B, and then outputted to the data synthesis circuit 120. At this time, the H1 and H2 header information shown in FIG. 15B are appended to the data.

On the other hand, a transport packet inputted through the input terminal 101 is inputted to the first memory 113 to be stored therein. On the basis of the control signal (data request signal) outputted from the data synthesis circuit 120, data are read out from the first memory 113. At this time, data which have been inputted in the unit of 1 transport packet are outputted while converting the data into data of 5 sync blocks as shown in FIG. 15B in the unit of 2 transport packets. In the same manner as the case of trick playback data, when data of sync blocks are to be outputted from the first memory 113, the H1 and H2 header information are appended to the data.

The record data control circuit 119 generates a record format on the basis of the control signals outputted from the record timing generating circuit 156. Hereinafter, the operation of generating a record format will be described. Based on the record mode outputted from the record mode setting circuit 155, the record timing generating circuit 156 outputs a track identification signal in 1 track format of trick playback data, a track number, and a repetition number control signal for recording the same data for each record mode, to the data synthesis circuit 120. Furthermore, the record timing generating circuit 156 outputs a data formation start signal to the data synthesis circuit 120 and the third ECC circuit 132, on the basis of the reference signal which is outputted from the servo system reference signal generating circuit 158 and controls the rotation phase of the rotary drum 125, and the record mode.

FIG. 40 shows the control signals outputted from the record timing generating circuit 156 in various record modes. Hereinafter, the control signals outputted from the record timing generating circuit 156 in each record mode will be described. FIG. 40(*a*) shows the reference signal which is outputted from the servo system reference signal generating circuit 158 and controls the rotation phase of the rotary drum 125, and FIG. 40(*b*) shows the data formation start signal in the standard record mode. FIG. 40(*c*) shows data record timing signals which are outputted to the record amplifiers 124*a* and 124*b* in the standard record mode. Actually, the record timing signal which is outputted to the record amplifier 124*b* is delayed from that which is outputted to the record amplifier 124*a* by a period corresponding to the distance between the rotary heads (usually, about 5 sync blocks). FIG. 40(*d*) shows the record timings of data of the channels in the standard record mode. As shown in the figure, in the standard record mode, the control signals are outputted for each rotation of the rotary drum 125, and data are recorded on the magnetic tape.

FIG. 40(*e*) shows the data formation start signal in the ½-times record mode. FIG. 40(*f*) shows data record timing signals which are outputted to the record amplifiers 124*a* and 124*b* in the ½-times record mode. FIG. 40(*g*) shows the record timings of data of the channels in the ½-times record mode. As shown in the figure, in the ½-times record mode, the control signals are outputted for every 2 rotations of the rotary drum 125, and data are recorded on the magnetic tape.

FIG. 40(*h*) shows the data formation start signal in the ¼-times record mode. FIG. 40(*i*) shows data record timing signals which are outputted to the record amplifiers 124*a* and 124*b* in the ¼-times record mode. FIG. 40(*j*) shows the record timings of data of the channels in the ¼-times record mode. As shown in the figure, in the ¼-times record mode, the control signals are outputted for every 4 rotations of the rotary drum 125, and data are recorded on the magnetic tape. Actually, as described above, the record timing signal which is outputted to the record amplifier 124*b* is delayed from that which is outputted to the record amplifier 124*a* by a period corresponding to the distance between the rotary heads (usually, about 5 sync blocks).

The data synthesis circuit 120 forms a record format on the basis of the control signals. When the data formation start signal is inputted, the format formation control circuit 227 sets the kind and area of trick playback data to be recorded in tracks of the channels generated on the basis of the track number of the track to be next subjected to recording and identification of the track in 1 track format. The format forming circuit 226 forms a record format so that 4-times speed playback data and 18-times speed playback data are arranged in areas of predetermined tracks, on the basis of a sync block information signal which is inputted to the format formation control circuit 227 from the record data control circuit 119. At this time, the number of repetition of trick playback data of each speed is checked. If the repetition has been conducted a predetermined number of times, the next trick playback data are read out from the memory which stores the corresponding trick playback data, and the data request signal is outputted.

Specifically, when 18-times speed playback data were repeatedly recorded 18 times in the standard record mode, the data request signal is outputted so that the third memory 117 outputs the next trick playback data for 25 sync blocks. The 18-times speed playback data for 25 sync blocks which are read out from the third memory 117 are temporarily stored in an 18-times speed playback data memory disposed in the data synthesis circuit 120. Similarly, when 4-times speed playback data were repeatedly recorded 2 times in the standard record mode, the data request signal is outputted so that the second memory 116 outputs the next trick playback data for 25 sync blocks. The 4-times speed playback data for 25 sync blocks which are read out from the second memory 116 are temporarily stored in a 4-times speed playback data memory disposed in the data synthesis circuit 120. If the number of repetition is smaller than the predetermined number, record data are formed by using trick playback data for each speed stored in the data synthesis circuit 120.

Similarly, when 18-times speed playback data were repeatedly recorded 9 times in the ½-times record mode, the data request signal is outputted so that the third memory 117 outputs the next trick playback data for 25 sync blocks. The 18-times speed playback data for 25 sync blocks which are read out from the third memory 117 are temporarily stored in the 18-times speed playback data memory disposed in the data synthesis circuit 120. Similarly, when 4-times speed playback data were recorded 1 time in the ½-times record mode, the data request signal is outputted so that the second memory 116 outputs the next trick playback data for 25 sync blocks. The 4-times speed playback data for 25 sync blocks which are read out from the second memory 116 are temporarily stored in the 4-times speed playback data memory disposed in the data synthesis circuit 120. If the number of repetition is smaller than the predetermined number, record data are formed by using trick playback data for each speed stored in the data synthesis circuit 120.

Similarly, when 18-times speed playback data were repeatedly recorded 9 times in the ¼-times record mode, the data request signal is outputted so that the third memory 117 outputs the next trick playback data for 25 sync blocks. The 18-times speed playback data for 25 sync blocks which are read out from the third memory 117 are temporarily stored in the 18-times speed playback data memory disposed in the data synthesis circuit 120. Similarly, when 4-times speed playback data were recorded 1 time in the ¼-times record mode, the data request signal is outputted so that the second memory 116 outputs the next trick playback data for 25 sync blocks. The 4-times speed playback data for 25 sync blocks which are read out from the second memory 116 are temporarily stored in the 4-times speed playback data memory disposed in the data synthesis circuit 120. If the number of repetition is smaller than the predetermined number, record data are formed by using trick playback data for each speed stored in the data synthesis circuit 120.

When the process of checking the number of repetition of trick playback data is completed, the data arrangement in 1 track is set by using the track identification signal. The track identification signal is a signal which is used for identifying the tracks T1 to T4 shown in FIG. 43. In Embodiment 6, since data for 2 tracks are recorded substantially simultaneously, a signal which can identify the track T1 or the track T3 is outputted as the track identification signal. First, the data arrangement in a track to be recorded by the rotary head 126*a* is set. When the data arrangement in 1 track has been set, trick playback data for the respective speed provided in the first memory 113 and the data synthesis circuit 120 are read out in the unit of 1 sync block, and record data for 1 track are formed and then outputted to the fourth memory 121. When the formation of data for 1 track to be recorded by the rotary head 126*a* is completed, the formation of a track to be recorded by the rotary head 126*b* is conducted in the same manner.

The record data for 2 tracks formed in the data synthesis circuit 120 are temporarily stored in the fourth memory 121. The record data of the channels stored in the fourth memory 121 are subjected in the second ECC circuit 122 to error correcting coding for normal playback which is accompanied by interleave of a depth of 10 tracks and appends the C4 check code. With respect to the data of the fourth memory 121 to which the C4 check code formed by the second ECC circuit 122 has been appended, an error correcting check code according to the SD standard is formed and appended in the third ECC circuit 132 (see FIG. 10). In response to the data formation start signal outputted from the record timing generating circuit 156, the third ECC circuit 132 outputs a read control signal to the fourth memory 121 so that data for 2 tracks to which an error correcting check code is appended are read out substantially simultaneously. In accordance with the read control signal, record data for 1 track of each channel are read out from the fourth memory 121. At this time, a track format according to the SD standard is formed. Specifically, a gap corresponding to 5 bytes are formed between sync blocks in order to append a sync signal and the ID signal, a gap of a predetermined length is formed between the ITI area, the subcode area, and data, and the resulting data are then outputted. The output of the fourth memory 121 is inputted to the first and second modulators 123*a* and 123*b*.

The first and second modulators 123*a* and 123*b* first appends the sync signal and the ID signal to the top of each sync block. In Embodiment 6, the identification signal of the record mode is recorded in the ID signal. The data to which the ID signal is appended are subjected to digital modulation, and then outputted to the record amplifiers 124*a* and 124*b*. The digital modulation is conducted on the basis of the track identification data outputted from the record timing generating circuit 156. The data which have been subjected to digital modulation and are inputted to the record amplifiers 124*a* and 124*b* are amplified, and then recorded on the magnetic tape via the rotary heads 126*a* and 126*b*.

Next, the operation of the servo system will be described. The reference signal which is outputted from the servo system reference signal generating circuit 158 and controls the rotary drum 125 is inputted to the drum motor control circuit 127. The drum motor control circuit 127 controls the drum motor 128 at 9,000 rpm on the basis of the reference signal, and rotation phase information of the rotary heads 126a and 126b outputted from the drum motor 128. The drum motor 128 is driven by a drum motor driving voltage outputted from the drum motor control circuit 127. The drum motor 128 outputs the rotation phase of the rotary drum 125 to the drum motor control circuit 127.

Similarly, the capstan motor control circuit 129 controls the capstan motor 130 on the basis of the reference signal for controlling the rotary drum 125, the record mode, and motor rotation information (information of the running speed of the magnetic tape) from the capstan motor 130. The running speed of the magnetic tape in each record mode is controlled as follows. When the running speed in the standard record mode is 1 as shown in FIG. 38, the running speed is controlled to be ½ times in the ½-times record mode, and to be ¼ times in the ¼-times record mode. The capstan motor control circuit 129 outputs the driving voltage for driving the capstan motor 130 by using the reference signal of the rotary drum 125 and rotation information of the capstan motor, so that the tape running speed according to the record mode is attained. The capstan motor 130 outputs the rotation information of the capstan motor to the capstan motor control circuit 129.

Figure 52:
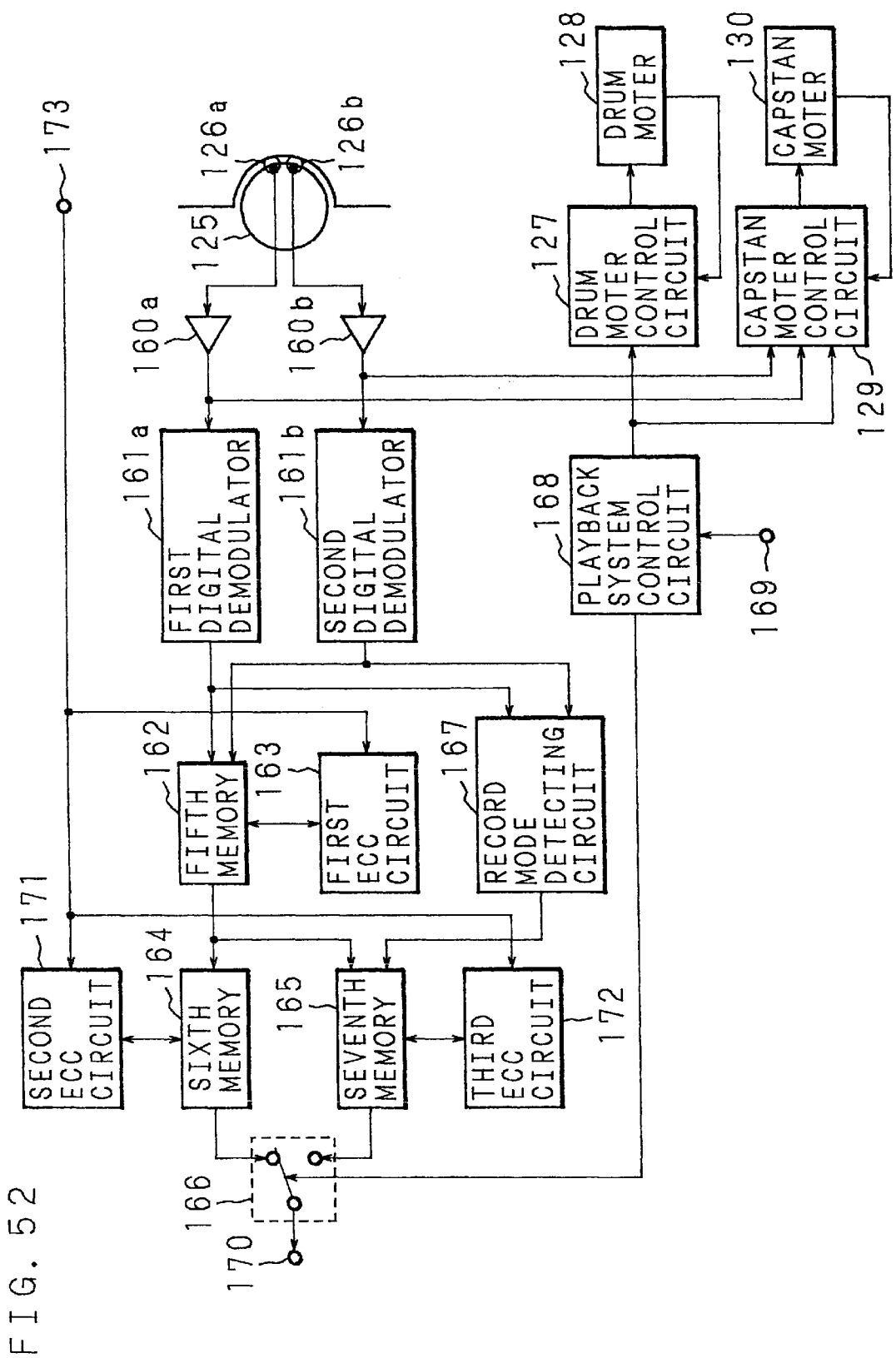
FIG. 52 is a block diagram of a playback system of the digital VTR of the invention.

Next, the configuration of the playback system of the digital VTR which plays back a magnetic tape having the above-mentioned record format will be described. FIG. 52 is a block diagram of the playback system of the digital VTR of Embodiment 6. The components designated by the same reference numerals as those of FIG. 32 are identical in structure and operation with those designated by the numerals in FIG. 32, and hence their description is omitted. In FIG. 52, 160a and 160b designate playback amplifiers, 161a and 161b designate first and second digital demodulators, 162 designates a fifth memory, and 163 designates a first ECC circuit which corrects and detects an error in a playback signal by applying the C1 check code and the C2 check code to the playback digital signal.

The reference numeral 173 designates an input terminal through which an ECC3 mode signal indicative of the record data contents of the ECC3 area set in a recording process in accordance with externally input command data. The reference numeral 164 designates a sixth memory which stores playback digital signals for normal playback, 171 designates a second ECC circuit which, on the basis of the ECC3 mode information signal, corrects and detects an error in normal playback data of the sixth memory 164 in the case where normal playback error correcting coding is conducted, 165 designates a seventh memory which stores trick playback data, 172 designates a third ECC circuit which, on the basis of the ECC3 mode data signal, corrects and detects an error in trick playback data of the seventh memory 165 in the case where trick playback error correcting coding is conducted, 166 designates a switch which selects one of the outputs of the sixth and seventh memories 164 and 165 in accordance with a selection signal outputted from a playback system control circuit 168, 167 designates a record mode detecting circuit which detects the record mode of the data in the recording process from the playback digital signal which has undergone digital demodulation, 169 designates an input terminal for the mode signal, 168 designates the playback system control circuit which generates the reference signal for controlling the drum motor 128 and the capstan motor 130, and outputs a changeover signal for the switch 166, on the basis of the mode signal inputted through the input terminal 169 and the record mode detection result, and 170 designates an output terminal.

Hereinafter, prior to the description of the operation of the playback system, the operation of the digital VTR of Embodiment 6 in the case where high-speed playback is conducted at the speed set for the respective record mode by using 4-times speed playback data will be decscribed with reference to FIGS. 46, 48, and 50. In high-speed playback using 4-times speed playback data, the running speed control of the magnetic tape, and the phase control of the rotary heads 126a and 126b are conducted.

FIG. 46 is a diagram showing scan paths of the rotary head 126b in the case where 4-times speed playback is conducted by using the magnetic tape on which recording has been done in the standard record mode. As shown in the figure, in the standard record mode, 4-times speed playback data are recorded in tracks of B channel as described above, and the same data are repeatedly recorded in 2 track format periods (the same data are recorded in 2 record areas) as described above. When the phase control of the rotary head is done so that the playback output of the rotary head 126b is maximum at the center of B0 area, therefore, it is possible to play back all the 4-times speed playback data as shown in FIG. 46. When the magnetic tape on which recording has been done in the standard record mode is played back at the 4-times speed, also data of the VAUX 1 area can be played back by the rotary head 126b as shown in FIG. 46. Furthermore, tracking also can be conducted in the ITI area.

FIG. 48 is a diagram showing scan paths of the rotary head 126b in the case where 4-times speed playback is conducted by using the magnetic tape on which recording has been done in the ½-times record mode. As shown in the figure, in the ½ times record mode, with respect to 4-times speed playback data, trick playback data are recorded in the unit of 1 track format as described above When the phase control of the rotary head is done so that the playback output of the rotary head 126b is maximum at the center of B0 area, therefore, it is possible to play back all the 4-times speed playback data as shown in FIG. 48. When the magnetic tape on which recording has been done in the ½-times record mode is played back at the 4-times speed, also data of the subcode area can be played back by the rotary head 126b as shown in FIG. 48.

FIG. 50 is a diagram showing scan paths of the rotary head 126b in the case where 8-times speed playback is conducted by using the magnetic tape on which recording has been done in the ¼-times record mode. As shown in the figure, in the ¼-times record mode, with respect to 4-times speed playback data, trick playback data are recorded in the unit of 1 track format as described above. When the phase control of the rotary head is done so that the playback output of the rotary head 126b is maximum at the center of B0 area, therefore, it is possible to play back all the 4-times speed playback data as shown in FIG. 50. When the magnetic tape on which recording has been done in the ¼-times record mode is played back at the 8-times speed, also data of the subcode area can be played back by the rotary head 126b as shown in FIG. 50.

The operation of the digital VTR of Embodiment 6 in the case where high-speed playback is conducted by using 18-times speed playback data will be described with reference to FIGS. 47, 49, and 51. Also in high-speed playback using 18-times speed playback data, the running speed control of the magnetic tape, and the phase control of the rotary heads 126a and 126b are conducted.

FIG. 47 is a diagram showing scan paths of the rotary head 126a in the case where 18-times speed playback is conducted by using the magnetic tape on which recording has been done in the standard record mode. As shown in the figure, in the standard record mode, 18-times speed playback data are recorded in tracks of A channel (A0 to A4 areas) as described above, and the same data are repeatedly recorded in 9 track format periods (the same data are recorded in 18 tracks) as described above. Therefore, it is possible to play back all the 18-times speed playback data as shown in FIG. 47. When the magnetic tape on which recording has been done in the standard record mode is played back at the 18-times speed, also data of the subcode area can be played back by the rotary head 126a as shown in FIG. 47. Furthermore, tracking also can be conducted in the ITI area.

FIG. 49 is a diagram showing scan paths of the rotary head 126a in the case where 9-times speed playback is conducted by using the magnetic tape on which recording has been done in the ½-times record mode. As shown in the firer in the ½-times record mode, 18-times speed playback data are recorded in tracks of A channel (A0 to A4 areas) as described above, and the same data are repeatedly recorded in 4.5 track format periods (the same data are recorded in 9 tracks) as described above. Therefore, it is possible to play back all the 18-times speed playback data as shown in FIG. 49. When the magnetic tape on which recording has been done in the ½-times record mode is played back at the 9-times speed, also data of the subcode area can be played back by the rotary head 126a as shown in FIG. 49.

FIG. 51 is a diagram showing scan paths of the rotary head 126a in the case where 18-times speed playback is conducted by using the magnetic tape on which recording has been done in the ¼-times record mode. As shown in the figure, in the ¼-times record mode, 18-times speed playback data are recorded in tracks of A channel (A0 to A4 areas) as described above, and the same data are repeatedly recorded in 4.5 track format periods (the same data are recorded in 9 tracks) as described above. Therefore, it is possible to play back all the 18-times speed playback data as shown in FIG. 51. When the magnetic tape on which recording has been done in the ¼-times record mode is played back at the 18-times speed, data of the subcode area can also be played back by the rotary head 126a as shown in FIG. 51.

In the standard record mode, the tracking in high-speed playback can be conducted in the ITI area. In 18-times speed playback, for example, the tracking phase may be detected in one data area of the trick playback data record area, and controlled. The tracking phase may be detected in a plurality of the trick playback data record areas, and controlled. With respect to 4-times speed playback, the tracking phase may be detected at a predetermined position of adjacent A track by the rotary head 126a, and controlled. The tracking phase may coarsely be adjusted in the ITI area and finely adjusted in the trick playback area. The tracking control method is effective particularly in the case where a track bent occurs in compatible playback or the like.

Next, the operation of the playback system in normal playback will be described. Data which are played back from the magnetic tape through the rotary heads 126a and 126b on the rotary drum 125 are amplified by the playback amplifiers 160a and 160b, and then inputted to the first and second digital demodulators 161a and 161b. The output of the playback amplifier 160a is outputted also to the capstan motor control circuit 129. The first and second digital demodulators 161a and 161b detect data from the input playback data, convert the detected data into playback digital data, and then conduct digital demodulation on the data. The ID signal appended to the top of each sync block is detected by the first and second digital demodulators 161a and 161b. The playback digital data which have undergone digital demodulation in the fifth memory 162 so that data for 1 track are collected, and the error correcting code block shown in FIG. 10 is configured. When the configuration of the error correcting code block shown in FIG. 10 is completed, the first ECC circuit 163 corrects and detects an error which may occur in the playback process, by using the C1 check code and the C2 check code.

The playback digital data which have undergone error correction in the first ECC circuit 163 are read out from the fifth memory 162, and then outputted to the sixth and seventh memories 164 and 165. At this time, trick playback data (4-times speed playback data and 18-times speed playback data) played back from the trick playback data record area are inputted to the seventh memory 165, and playback digital data for normal playback are inputted to the sixth memory 164. In accordance with the ECC3 mode data signal, the trick playback data inputted to the seventh memory 165 are subjected to error correction and detection by the third ECC circuit 172 in the case where trick playback error correcting coding has been conducted, and, in accordance with the ECC3 mode data signal, the normal playback data inputted to the sixth memory 164 are subjected to error correction and detection by the second ECC circuit 171 in the case where normal playback error correcting coding has been conducted.

On the other hand, the ID signal detected in the first and second digital demodulators 161a and 161b is inputted to the record mode detecting circuit 167. The record mode detecting circuit 167 detects the data record mode from the played back ID signal. The playback system control circuit 168 judges the playback mode of the digital VTR on the basis of the mode signal inputted from the input terminal 169. If the input mode signal indicates the normal playback mode, the playback system control circuit 168 outputs the reference signal of the rotation phase of the rotary drum 125 to the drum motor control circuit 127, and, on the basis of the judgment result of the record mode separated from the ID signal, outputs the tape running speed information to the capstan motor control circuit 129.

In accordance with selection data outputted from the playback system control circuit 168, the switch 166 selects the output of the sixth memory 164 in the case of normal playback. In the normal playback data stored in the sixth memory 164 in the sync block format shown in FIG. 15B, the H1 and H2 header data are deleted at the process of reading data, and the original transport packet is reconstructed. Then, the data are outputted to the switch 166. The normal playback data outputted from the sixth memory 164 are outputted from the output terminal 170 through the switch 166.

Next, the operation of the servo system in normal playback will be described. The playback system control circuit 168 outputs the tape running speed information of the capstan motor to the capstan motor control circuit 129 on the basis of the record mode detection result outputted from the record mode detecting circuit 167, and outputs a signal indicative of the requirement of the rotation phase control of the rotary drum 125 in accordance with the record mode detection result. It is a matter of course that, in normal playback, the phase control is required in each record mode. By contrast, the reference signal of the rotation phase of the rotary drum 125 outputted from the playback system control circuit 168 is inputted to the drum motor control circuit 127. The drum motor control circuit 127 controls the drum motor 128 at 9,000 rpm on the basis of the reference signal, and the rotation phase data of the rotary heads 196a and 129b outputted from the drum motor 128. The drum motor 128 is driven by the motor driving voltage outputted from the drum motor control circuit 127. The drum motor 128 outputs the rotation phase of the rotary drum 125 to the drum motor control circuit 127. In playback, the drum motor control circuit 127 outputs the rotation phase information of the rotary drum 125 to the capstan motor control circuit 129.

The capstan motor control circuit 129 controls the capstan motor 130, based on the rotation phase information of the rotary drum 125, the record mode, the tape running speed information, the playback signal outputted from the playback amplifier 160*a*, and the motor rotation information (information of the running speed of the magnetic tape) outputted from the capstan motor 130. The running speed of the magnetic tape in each record mode is controlled as follows. When the running speed in the standard record mode is 1 as shown in FIG. 38, the running speed is controlled to be ½ times in the ½-times record mode, and to be ¼ times in the ¼-times record mode. In normal playback, the capstan motor control circuit 129 controls the running speed of the magnetic tape, so that the tape running speed according to the record mode is attained, and detects the rotation phase of the rotary drum 125 by using the rotation phase information of the rotary drum 125 and ATF information recorded in the ITI area, thereby controlling also the phase. The capstan motor 130 outputs the rotation information of the capstan motor to the capstan motor control circuit 129.

Next, the operation in high-speed playback will be described. Data which are intermittently played back from the magnetic tape through the rotary heads 126*a* and 126*b* on the rotary drum 125 are amplified by the playback amplifiers 160*a* and 160*b*, and then inputted to the first and second digital demodulators 161*a* and 161*b*. The output of the playback amplifier 160*a* is outputted also to the capstan motor control circuit 129. The first and second digital demodulators 161*a* and 161*b* detect data from the inputted playback data, convert the detected data into playback digital data, and then conduct digital demodulation on the data. The ID signal appended to the top of each sync block is detected by the first and second digital demodulators 161*a* and 161*b*. The playback digital data which have undergone digital demodulation in the first and second digital demodulators 161*a* and 161*b* are inputted to the fifth memory 162.

When data are inputted, the fifth memory 162 separates the record area for high-speed playback on the basis of the ID signal outputted from the first and second digital demodulators 161*a* and 161*b*. Only trick playback data are temporarily stored in the fifth memory 162. In Embodiment 6, in the case of high-speed playback using data recorded in B0 area, various controls are conducted by using the data outputted from the playback amplifier 160*b* and the second digital demodulator 161*b*, and, in the case of high-speed playback using data recorded in A0 to A4 areas, various controls are conducted by using the data outputted from the playback amplifier 160*a* and the first digital demodulator 161*a*.

The trick playback data stored in the fifth memory 162 are subjected to error correction due to the C1 check code in the unit of 1 sync block by the first ECC circuit 163, so that an error which may occur in high-speed playback is corrected and detected. The data which have undergone the error correction in the first ECC circuit 163 are sequentially read out from the fifth memory 162, and then inputted to the seventh memory 165. The output of the fifth memory 162 is inputted also to the sixth memory 164, but data are not written in high-speed playback.

The seventh memory 165 records trick playback data played back based on the track number and the sync block number separated from ID data, and the H1 and H2 header data shown in FIG. 15 recorded in the inputted trick playback data, at a predetermined address in the seventh memory 165. The storage area of the seventh memory 165 for 1-frame trick playback data is determined on the basis of the record mode signal outputted from the record mode detecting circuit 167. The trick playback data stored in the seventh memory 165 in the sync block format shown in FIG. 15B are read out in data reading in the unit of 5 sync blocks, and the header data H1 and H2 are deleted. Then, the data are outputted in the state of a transport packet to the switch 166. The trick playback data outputted from the seventh memory 165 are outputted from the output terminal 170 through the switch 166.

Next, the operation of the servo system in high-speed playback will be described. The ID signal detected in the first and second digital demodulators 161*a* and 161*b* is inputted to the record mode detecting circuit 167. The record mode detecting circuit 167 detects the data record mode from the played back ID signal. The playback system control circuit 168 judges the playback mode of the digital VTR on the basis of the mode signal outputted through the input terminal 169. If the input mode signal indicates the trick playback mode, the playback system control circuit 168 outputs the control signal to the switch 166 so as to select the output of the seventh memory 165, and outputs various control signals to the servo system.

Hereinafter, the control method of the servo system in high-speed playback using B0 area (FIGS. 43 and 44) in the standard playback mode, the ½-times record mode, and the ¼-times record mode will be described. As described above, in high-speed playback which uses B0 in each record mode, the running of the magnetic tape is controlled for each record mode, and also the rotation phase of the rotary drum 125 is controlled. Therefore, the playback system control circuit 168 outputs the reference signal of the rotation phase of the rotary drum 125 to the drum motor control circuit 127, and, on the basis of the judgment result of the record mode separated from the ID signal, outputs the tape running speed information to the capstan motor control circuit 129.

The drum motor control circuit 127 controls the drum motor 128 at 9,000 rpm on the basis of the reference signal, and the rotation phase information of the rotary heads 126*a* and 126*b* outputted from the drum motor 128. The drum motor 128 is driven by the drum motor driving voltage outputted from the drum motor control circuit 127. The drum motor 128 outputs the rotation phase of the rotary drum 125 to the drum motor control circuit 127. In playback, the drum motor control circuit 127 outputs the rotation phase information of the rotary drum 125 to the capstan motor control circuit 129.

The capstan motor control circuit 129 controls the capstan motor 130, based on the rotation phase information of the rotary drum 125, the record mode, the tape running speed information, the playback signal outputted from the playback amplifier 160*b*, and the motor rotation information (information of the running speed of the magnetic tape) outputted from the capstan motor 130. The phase control in Embodiment 6 is done in the following manner. Namely, on the basis of the rotation phase information of the rotary drum 125 outputted from the drum motor control circuit 127, the tracking control is conducted so that the playback output is maximum at the center of B0 area on the magnetic tape. The capstan motor control circuit 129 controls the running speed of the magnetic tape in accordance with the tape running speed information, and controls the rotation phase of the rotary drum 125 in the manner described above. In the case of the standard record mode, the ITI area is scanned in 4-times speed playback as described above. Therefore, the rotation phase of the rotary drum 125 may be detected by using the ATF information recorded in the ITI area, and also the phase control may be conducted. The capstan motor 130 outputs the rotation information of the capstan motor 130 to the capstan motor control circuit 129.

Next, the operation of the servo system in high-speed playback using A0 to A4 areas (FIGS. 43 and 44) in the standard playback mode, the ½-times record mode, and the ¼-times record mode will be described. As shown in FIG. 47, record data are arranged so that, in the standard playback mode, an error in tracking phase is detected in the ITI area and the rotation phase of the rotary drum 125 is conducted. In other words, trick playback data are arranged on scan paths of the rotary head 126a in order to sufficiently attain the playback data rate of trick playback data in 18-times speed playback.

Hereinafter, the control method of the servo system in high-speed playback using 18-times speed playback data in various record modes will be described. As described above, in high-speed playback which uses A0 to A4 areas in the standard record mode, for each record mode, the running of the magnetic tape is controlled, and also the rotation phase of the rotary drum 125 is controlled. Therefore, the playback system control circuit 168 outputs the reference signal of the rotation phase of the rotary drum 125 to the drum motor control circuit 127, and, on the basis of the judgment result of the record mode separated from the ID signal, outputs the tape running speed information to the capstan motor control circuit 129.

The drum motor control circuit 127 controls the drum motor at 9,000 rpm on the basis of the reference signal, and the rotation phase information of the rotary heads 126a and 126b outputted from the drum motor 128. The drum motor 128 is driven by the drum motor driving voltage outputted from the drum motor control circuit 127. The drum motor 128 outputs the rotation phase of the rotary drum 125 to the drum motor control circuit 127. In playback, the drum motor control circuit 127 outputs the rotation phase information of the rotary drum 125 to the capstan motor control circuit 129.

The capstan motor control circuit 129 controls the capstan motor 130, based on the rotation phase information of the rotary drum 125, the record mode, the tape running speed information, the playback signal outputted from the playback amplifier 160b, and the motor rotation information (information of the running speed of the magnetic tape) outputted from the capstan motor 130. The phase control in standard record mode in Embodiment 6 is done in the following manner. On the basis of the rotation phase information of the rotary drum 125 outputted from the drum motor control circuit 127, the ITI area on the magnetic tape is detected, the tracking state in the ITI area is sampled, and an error in tracking phase is detected. The capstan motor control circuit 129 controls the running speed of the magnetic tape in accordance with the tape running speed information, and detects and controls the rotation phase of the rotary drum 125 in the manner described above. The capstan motor 130 outputs the rotation information of the capstan motor 130 to the capstan motor control circuit 129.

The digital VTR of Embodiment 6 is configured as described above, and hence can record signals of different record rates in the same record format (track format) for each record rate. In trick playback, moreover, the digital VTR can play back appended information such as time information, and music piece number information which are recorded in the subcode area or the VAUX1 area.

In Embodiment 6, furthermore, in order to sufficiently attain the playback data rate of trick playback data in each record mode, trick playback data record areas are arranged on scan paths of the rotary heads 126a and 126b. When the record areas of high-speed playback data are arranged on scan paths of the rotary heads 126a and 126b in high-speed playback, therefore, trick playback data can be arranged at the highest efficiency so that the playback data rate in high-speed playback is improved, thereby improving the picture quality of a playback image in high-speed playback.

In Embodiment 6, the tape running speeds are set to be 4-times speed and 18-times speed in the standard record mode, 4-times speed and 9-times speed in the ½-times record mode, and 8-times speed and 18-times speed in the ¼-times record mode, and high-speed playback data are arranged on scan paths of the rotary heads 126a and 126b in high-speed playback in the respective record mode. The speeds to be set are not restricted to those mentioned above.

In Embodiment 6, the system in which the record format shown in FIG. 43 is used has been described. The record format is not restricted to this format. In a digital signal record apparatus, a digital signal playback apparatus, and a digital signal record/playback apparatus (a digital VTR, a digital disk player, or the like) having a record format wherein trick playback data are separated from input data and then recorded in a predetermined area on a record medium, the record format of trick playback data may be made common in plural record rates as described above, or, in high-speed playback, the rotary heads 126a and 126b may scan the subcode area or the VAUX area (VAUX1 area or VAUX2 area). In this manner, trick playback data in high-speed playback can efficiently be recorded, and information of the subcode area or the VAUX area (VAUX1 area or VAUX2 area) can be played back in high-speed playback. Therefore, it is possible to obtain additional functions in high-speed playback.

The data to be recorded are not restricted to the ATV signal or the DVB signal. In Japan where a video signal is compressed on the basis of MPEG2, for example, it is a matter of course that the same effects can be attained also in the case where an ISDB signal or a signal which is compressed in accordance with MPEG1 is recorded.

In Embodiment 6, when data transmitted in a transport packet form which is represented by MPEG2 are to be recorded in a digital VTR which is represented by the above-mentioned the SD standard, 2 transport packets are converted into 5 sync block formats and then recorded. The invention is not restricted to the above. When a sync block format is to be generated, sync block data of n lines may be formed by using an m number of inputted transport packets (where m and n are positive numbers).

When data converted into the sync block format are to be recorded on a record medium, the record format of the record medium may be configured so that data of n sync blocks are arranged on the same track, whereby data of a transport packet can efficiently be converted into those of a sync block format.

Data of n sync blocks are completed within the same track. When data of the sync block format are to be converted into data of a transport packet in playback, therefore, the set of n sync block formats can easily be separated by using track data such as the track identification signal, and the sync block number. This can reduce particularly the circuit scale of the playback system.

Furthermore, identification signals of n sync blocks are not required to be recorded. This produces an effect that the data record area can be used efficiently. Moreover, the length of 1 sync block is not restricted to that shown in FIG. 11.

The arrangement of the 4-times speed playback data record area, the 18-times speed playback data record area, and the error correcting check code record area, and the number of the areas are not restricted to those described above. Also the track period is not restricted to the 4-track period.

In Embodiment 6, the high-speed playback speed in the standard record mode (standard mode) is set to be 4-times speed or 18-times speed. The invention is not restricted to the above. Even in the case where another speed is employed, the same effects can be attained as far as the trick playback data record area is disposed on the scan paths of the rotary heads 126*a* and 126*b* as described above.

Moreover, it is a matter of course that particularly the higher high-speed playback in the standard record mode may be set to be 8.5-times speed in the case of, for example, the record format shown in Embodiment 6, and realized only by the speed control. The high-speed playback speeds set in each record mode are not restricted those used in Embodiment 6.

The number of trick playback data areas is not restricted to those used in Embodiment 6 and may be set so that, in each record mode, trick playback data are arranged on scan paths along which the rotary heads 126*a* and 126*b* scan the subcode area or a VAUX area (VAUX1 area or VAUX2 area) in high-speed playback. The size of the trick playback data area is not restricted to that used in Embodiment 6.

In Embodiment 6, the 25-Mbps record mode is set as the standard record mode. The invention is not restricted to this. Also in the case where 50 Mbps or 12.5 Mbps is set as the standard record mode, when the same track format is used in all the record modes and only the number of repetition of trick playback data is switched corresponding to the respective record mode, trick playback data can efficiently be recorded so that the picture quality of a playback image in high-speed playback in each record mode is improved.

In Embodiment 6, the digital VTR having 3 kinds of record modes, i.e., the standard record mode, the ½-times record mode, and the ¼-times record mode which are shown in FIG. 38 has been described. The invention is not restricted to the above. It is a matter of course that also a digital VTR having 2 or 4 kinds of record modes can attain the same effects. The record modes are not restricted to those of the above-mentioned 3 kinds.

Embodiment 7

Embodiment 7 shows a method of using an area which is shown as the ECC3 area in Embodiment 6. In Embodiment 7, in addition to the C4 check code, normal playback data, trick playback data, or the C5 check code is recorded in accordance with the usage, in the ECC3 area indicated by D0 to D3 in FIG. 43 of Embodiment 6.

First, the case where the C4 check code is recorded in the ECC3 area will be described. In normal playback, all the C4 check codes recorded in the areas D0 to D3 are played back. In Embodiment 7, the C4 check code has a structure of (138, 128, 11) Reed-Solomon code in which interleave of 10 tracks is done.

An interleave system which is an embodiment of the invention will be described with reference to FIG. 53. When the track number is defined as Tn ($0 \leq Tn \leq 9$), the sync block number in the track is defined as SBn ($0 \leq SBn \leq 137$), and a data having the data number of Dn ($0 \leq Dn \leq 75$) in a sync block is defined as D[Dn, SBn, Tn], the following is attained:

(D[0, 0, 0], D[0, 1, 1], D[0, 2, 2], . . . , D[5×(j−(j mod 10))/10 mod 76, j, (j mod 10)], . . . , D[60, 126, 6], D[60, 127, 7], . . . , D[65, 136, 6], D[65, 137, 7])

In this case, the 128 bytes from D[0, 0, 0] to D[60, 126, 6] and D[60, 127, 7] constitute a data symbol, and the 10 bytes from D[60, 127, 7] to D[65, 136, 6] constitute the C4 check code. FIG. 53 diagrammatically shows the interleave operation. Interleave is conducted on the data (symbols) of 138 sync blocks in the direction of the arrow.

The above-mentioned operation is conducted on all data in the top sync block of each track. Specifically, when the C4 check code is to be formed starting from an i-th data from the top sync block of a k-th track, the following is attained:

(D[i, 0, k], D[i, 1, (k+1 mod 10)], . . . , D[(i+5×(j−(j mod 10))/10) mod 76, j, (k+j mod 10)], . . . , D[(i+60 mod 76), 127, (k+127 mod 10)], D[(i+60 mod 76), 128, (k+128 mod 10)], . . . , D[(i+65 mod 76), 138, (k+138 mod 10)]

Interleave is executed by changing i from 0 to 75 for 1 track and applying it to 10 tracks while changing k from 0 to 9, thereby forming the C4 check code. In the above expression, (X mod Y) means a remainder obtained when an integer X is divided by an integer Y. The data to which the interleave is conducted to form the C4 code are recorded in predetermined areas shown in FIG. 43 or 54.

Next, the burst error correcting ability of the C4 check code used in the embodiment will be described. As shown in FIG. 53, data interleave of a depth of 10 tracks is conducted on each track and coding is done. Since the C4 check code is a code of the minimum distance of 11, it is possible to conduct error correction on 10 missing data at the maximum. Unlike conventional interleave, according to Embodiment 7, the following can be attained. When the distance of the interleave data on the track of track number 0 shown in FIG. 53 is considered, all symbols can be arranged at equal intervals of 10 sync blocks +5 symbols. Even when a long drop-out occurs at any position (a long burst error occurs in 1 track) in normal playback, the error correcting ability according to the C4 check code can be made uniform irrespective of the burst error position.

Figure 53:
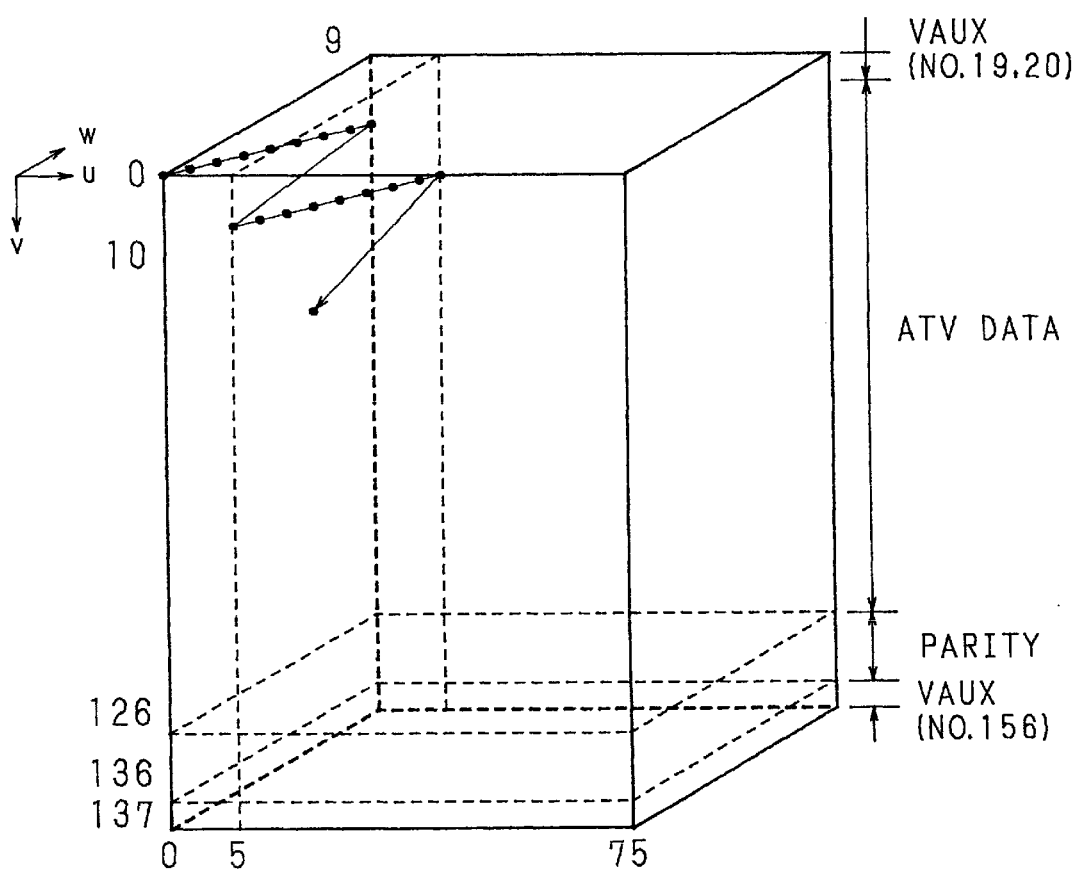
FIG. 53 is a diagram showing an interleaving method conducted when error correcting coding for normal playback in the invention is to be performed.

With respect to the C4 check code, as shown in FIG. 53, interleave of a depth of 10 tracks is conducted on data of 138 sync blocks, and a coded word is formed. Since the C4 check code is a code of the minimum distance of 11, it is possible to conduct error correction on 10 missing data at the maximum. Assuming that no error is detected in other tracks, therefore, the maximum burst error correcting ability is 10×10 =100 sync blocks. Consequently, even when 100 sync blocks in 1 track are not played back in normal playback because of, e.g., a drop-out, it is possible to reconstruct the data in accordance with the C4 check code.

In a digital VTR according to the SD standard, when the frame frequency is 30 Hz, digital video signals in 1 frame are recorded in 10 tracks. At this time, track numbers are appended into the ID signal in the sequence starting from the first one of the 10 tracks for recording the data of 1 frame. Specifically, the same number is appended to a pair of A and B tracks, and hence track numbers from Nos. 0 to 4 are appended. In the U.S.A., as well known, the frame frequency is 30 Hz, so that, in a digital VTR according to the SD standard, track numbers are appended in the manner described above. In the PAL/SECAM zone such as Europe, the frame frequency is 25 Hz. According to Embodiment 7, therefore, data of 1 frame are recorded in 12 tracks and track numbers from Nos. 0 to 5 are appended (the description is omitted). Consequently, it is a matter of course that the interleave may be conducted in the unit of 12 tracks.

The general expression of the data interleave method is shown below. When the number of data in the u-direction shown in FIG. 53 is n1, the number of effective samples of the w-direction is n3, the number of data symbols of the C4 check code is K2, and the minimum distance of the C4 check code is d3, a coded word V(Z) is indicated by the following polynomial:

$$V(Z) = \sum_{j=0}^{k2+d3-2} D(i + \alpha \times (j - (j \bmod n3))/n3)$$

$$\bmod n1, j, (k+j) \bmod n3) \times Z^{k2+d3-2-j}$$

where
- V(Z) is a polynomial representation of a coded word,
- D(u, v, w) is a symbol indicating that $0 \leq u < n1$, $0 \leq v < k2+d3-1$, and $0 \leq u < n3$, and
- $\alpha$ is $0 < \alpha \leq n1/(k2+d3-1) \times n3$.

In the above, α is a parameter for defining the length of interleave and determined so as to satisfy the above-mentioned conditions. In the determination of α, when the determination is performed so that error detection flags detected by the same C2 check code are not used in one coded word, it is possible to form a coded word which is very excellent in efficiency.

Next, the case where the ECC3 area is used as an area for recording trick playback data or the C5 check code will be described with using examples in which 18-times speed playback in the standard record mode shown in FIG. 47 in Embodiment 6, and 4-times speed playback in the standard record mode shown in FIG. 46 are conducted. As shown in FIG. 47, when 18-times speed playback is conducted in the standard record mode, the rotary head 126a traces the ECC3 area as a sixth burst. As shown in FIG. 46, when 4-times speed playback is conducted in the standard record mode, the rotary head 126b traces the 4-times speed playback area and the ECC3 area adjacent to the 4-times speed playback area.

Figure 54:
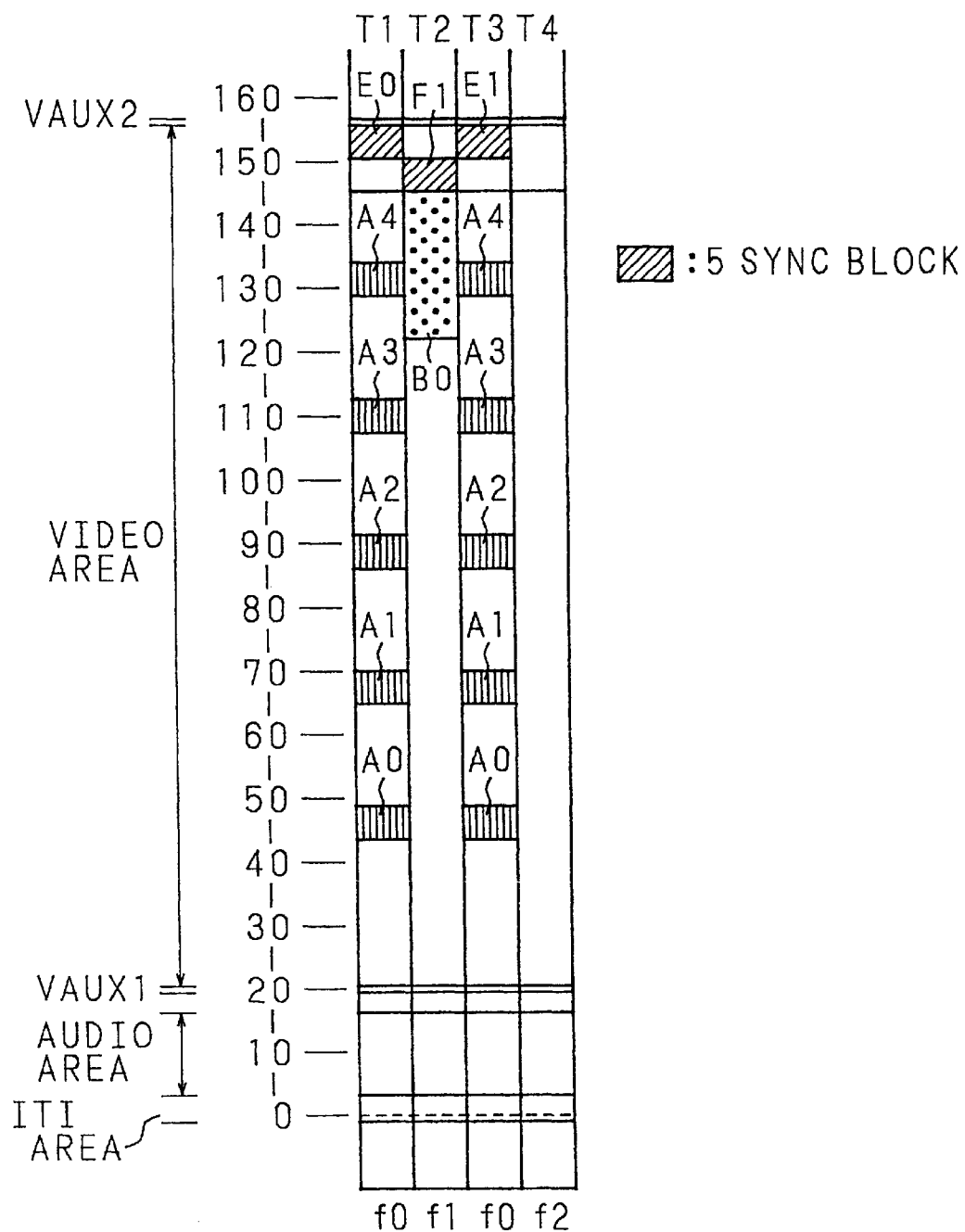
FIG. 54 is a diagram illustrating the contents of data to be recorded in an ECC3 area in the invention.

Hereinafter, a record area in the case where the ECC3 area is used as an area for recording the C5 check code will be described in detail. FIG. 54 is an enlarged view of FIG. 43, and shows the detail of the ECC3 area in the case where the ECC3 area is used as an area for recording trick playback data or the C5 check code. As illustrated, areas of 5 sync blocks in the ECC3 area which constitute a sixth burst following the five 18-times speed playback areas A0 to A4 disposed in tracks T1 and T3 are used as the 18-times speed playback area or an area for recording the C5 check code for 18-times speed playback, and disposed as E0 in track T1 and E1 in track T3, respectively. Furthermore, an area of 5 sync blocks in the ECCS area which is an area on track T2 and adjacent to 4-times speed playback area B0 is disposed as the 4-times speed playback area or area F1 for recording the C5 check code for 4-times speed playback. The number of sync blocks in each of areas E0, E1, and F1 is set in accordance with FIG. 42. In the embodiment, the code structure in the case where the C5 check code is recorded in the ECC3 area is of (30, 25, 6) Reed-Solomon code.

When the ECC3 area is disposed in the 10 sync blocks at the upper end of a video area and, in addition to the C4 check code, the C5 check code for 18-times speed playback or 18-times speed playback data are recorded in the ECC3 area as described above, 5 sync blocks in the ECC3 area can be played back as an area of a sixth burst following five areas A0 to A4 in 18-times speed playback in the standard record mode. Accordingly, when the data amount for 18-times speed playback is to be increased, 18-times speed playback data are recorded in areas E0 and E1, and, when the reliability of 18-times speed playback is to be increased, the C5 check code for 18-times speed playback is recorded in areas E0 and E1.

When the ECC3 area is disposed in the 10 sync blocks at the upper end of a video area and 4-times speed playback area B0 in the standard record mode is disposed at a position adjacent to the ECC3 area, 5 sync blocks in the ECC3 area which are adjacent to area B0 can be played back as one area continued from area B0. Accordingly, when the data amount for 4-times speed playback is to be increased, 4-times speed playback data are recorded in area F1, and, when the reliability of 4-times speed playback is to be increased, the C5 check code for 4-times speed playback is recorded in area F1.

As described above, according to the embodiment, the ECC3 area can be disposed in the 10 sync blocks at the upper end of a video area, and the C4 check code and either of the C5 check code or trick playback data can be recorded in the ECC3 area. In accordance with the usage, therefore, the picture quality of a playback image in high-speed playback, or the reliability of high-speed playback data can be improved.

The data to be recorded in the ECC3 area are not restricted to the C4 check code, the C5 check code, normal playback data, and trick playback data, and other appended information may be recorded in the area. The data structure of the ECC3 area is not restricted to that described above, and also the structure of the C5 check code is not restricted to that described above.

The embodiment has been described with using examples in which 18-times speed playback and 4-times speed playback are conducted in the standard record mode. The invention is not restricted to this. Even when 4-times speed playback and 9-times speed playback are conducted in the ½-times record mode or 8-times speed playback and 18-times speed playback are conducted in the ¼-times record mode as in Embodiment 6, the same effects can be attained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A digital signal playback apparatus which plays back a record medium which has plural record modes including a standard record mode, and in which trick playback data separated from record data are recorded in a predetermined area, said apparatus comprising:

record mode detecting means for detecting a record mode from a playback signal;

record medium running speed controlling means for controlling a tape running speed of the record medium on the basis of a detection result of said record mode detecting means; and tracking control means for controlling tracking so that a head scans a subcode area or a VAUX area in high-speed playback at a predetermined tape running speed in a detected record mode.

* * * * *